(12) United States Patent
Muniganti et al.

(10) Patent No.: US 7,613,626 B1
(45) Date of Patent: Nov. 3, 2009

(54) INTEGRATED PRICE MANAGEMENT SYSTEMS WITH FUTURE-PRICING AND METHODS THEREFOR

(75) Inventors: Vinay K. Muniganti, San Jose, CA (US); Sri Raghupathy, San Jose, CA (US); Simon C. Lee, Castro Valley, CA (US); Rafael A. Gonzalez-Caloni, Menlo Park, CA (US)

(73) Assignee: Vendavo, Inc., Palo Alto, CA (US)

( * ) Notice: Subject to any disclaimer, the term of this patent is extended or adjusted under 35 U.S.C. 154(b) by 846 days.

(21) Appl. No.: 11/193,314

(22) Filed: Jul. 30, 2005

Related U.S. Application Data

(63) Continuation-in-part of application No. 10/914,716, filed on Aug. 9, 2004.

(51) Int. Cl.
G06Q 50/00 (2006.01)
G06Q 90/00 (2006.01)
G06F 17/30 (2006.01)
G06F 17/00 (2006.01)

(52) U.S. Cl. .............................. 705/10; 705/7; 705/500

(58) Field of Classification Search ...................... 705/1, 705/7, 10, 500
See application file for complete search history.

(56) References Cited

U.S. PATENT DOCUMENTS

| 3,806,711 A | 4/1974 | Cousins, Jr. |
| 5,053,957 A | 10/1991 | Suzuki |
| 5,224,034 A | 6/1993 | Katz et al. |
| 5,461,708 A | 10/1995 | Kahn |
| 5,497,489 A | 3/1996 | Menne |
| 5,537,590 A | 7/1996 | Amado |
| 5,590,269 A | 12/1996 | Kruse et al. |
| 5,670,984 A | 9/1997 | Robertson et al. |
| 5,689,287 A | 11/1997 | Mackinlay et al. |
| 5,710,887 A | 1/1998 | Chelliah et al. |
| 5,740,448 A | 4/1998 | Gentry et al. |
| 5,758,327 A | 5/1998 | Gardner et al. |
| 5,808,894 A | 9/1998 | Wiens et al. |
| 5,870,717 A | 2/1999 | Wiecha |

(Continued)

FOREIGN PATENT DOCUMENTS

WO   WO 99/60486   11/1999

(Continued)

OTHER PUBLICATIONS

Keenan, F., "The Price Is Really Right," BusinessWeek, Mar. 31, 2003.*

(Continued)

*Primary Examiner*—Nicholas D Rosen
(74) *Attorney, Agent, or Firm*—Kang S. Lim

(57) ABSTRACT

The present invention presents systems and methods of future-pricing in an integrated price management system. The invention provides a method of maintaining at least one deal with a lowest price status for at least one product in the price management system by inputting a proposed price for product; searching the price management system for deals having the product with the lowest price status; defining a current lowest price as equal to the price of the product; and, if said proposed price is less than said current lowest price, then computing a potential revenue impact of lowering the price of said product to the proposed price.

15 Claims, 41 Drawing Sheets

U.S. PATENT DOCUMENTS

| | | | |
|---|---|---|---|
| 5,873,069 A * | 2/1999 | Reuhl et al. | 705/20 |
| 5,878,400 A | 3/1999 | Carter, III | |
| 5,946,666 A | 8/1999 | Nevo et al. | |
| 6,009,407 A | 12/1999 | Garg | |
| 6,075,530 A | 6/2000 | Lucas et al. | |
| 6,078,901 A | 6/2000 | Ching | |
| 6,151,031 A | 11/2000 | Atkins et al. | |
| 6,211,880 B1 | 4/2001 | Impink, Jr. | |
| 6,320,586 B1 | 11/2001 | Plattner et al. | |
| 6,434,533 B1 * | 8/2002 | Fitzgerald | 705/10 |
| 6,553,350 B2 | 4/2003 | Carter | |
| 6,665,577 B2 | 12/2003 | Onyshkevych et al. | |
| 6,678,695 B1 | 1/2004 | Bonneau et al. | |
| 6,785,664 B2 | 8/2004 | Jameson | |
| 6,801,201 B2 | 10/2004 | Escher | |
| 6,812,926 B1 | 11/2004 | Rugge | |
| 6,851,604 B2 | 2/2005 | Girotto et al. | |
| 6,856,967 B1 | 2/2005 | Woolston et al. | |
| 6,907,403 B1 | 6/2005 | Klein et al. | |
| 6,988,076 B2 | 1/2006 | Ouimet | |
| 7,015,912 B2 | 3/2006 | Marais | |
| 7,046,248 B1 | 5/2006 | Perttunen | |
| 7,076,463 B1 | 7/2006 | Boies et al. | |
| 7,080,026 B2 | 7/2006 | Singh et al. | |
| 7,092,929 B1 | 8/2006 | Dvorak et al. | |
| 7,133,848 B2 | 11/2006 | Phillips et al. | |
| 7,149,716 B2 | 12/2006 | Gatto | |
| 7,155,510 B1 | 12/2006 | Kaplan | |
| 7,218,325 B1 | 5/2007 | Buck | |
| 7,233,928 B2 | 6/2007 | Huerta et al. | |
| 7,254,584 B1 | 8/2007 | Addison, Jr. | |
| 7,308,421 B2 | 12/2007 | Raghupathy et al. | |
| 7,315,835 B1 | 1/2008 | Takayasu et al. | |
| 7,343,355 B2 | 3/2008 | Ivanov et al. | |
| 7,360,697 B1 | 4/2008 | Sarkar et al. | |
| 2001/0003814 A1 | 6/2001 | Hirayama et al. | |
| 2002/0007323 A1 | 1/2002 | Tamatsu | |
| 2002/0032610 A1 | 3/2002 | Gold et al. | |
| 2002/0042782 A1 | 4/2002 | Albazz et al. | |
| 2002/0052817 A1 | 5/2002 | Dines et al. | |
| 2002/0059229 A1 | 5/2002 | Natsumeda et al. | |
| 2002/0072993 A1 * | 6/2002 | Sandus et al. | 705/26 |
| 2002/0099596 A1 | 7/2002 | Geraghty | |
| 2002/0107819 A1 | 8/2002 | Ouimet | |
| 2002/0116348 A1 | 8/2002 | Phillips et al. | |
| 2002/0128953 A1 | 9/2002 | Quallen et al. | |
| 2002/0152133 A1 | 10/2002 | King et al. | |
| 2002/0152150 A1 | 10/2002 | Cooper et al. | |
| 2002/0156695 A1 | 10/2002 | Edwards | |
| 2002/0165726 A1 * | 11/2002 | Grundfest | 705/1 |
| 2002/0165760 A1 | 11/2002 | Delurgio et al. | |
| 2002/0178077 A1 | 11/2002 | Katz et al. | |
| 2002/0188576 A1 | 12/2002 | Peterson et al. | |
| 2002/0194051 A1 | 12/2002 | Hall et al. | |
| 2003/0028451 A1 | 2/2003 | Ananian | |
| 2003/0033240 A1 | 2/2003 | Balson et al. | |
| 2003/0095256 A1 | 5/2003 | Cargill et al. | |
| 2003/0110066 A1 | 6/2003 | Walser et al. | |
| 2003/0126053 A1 | 7/2003 | Boswell et al. | |
| 2003/0130883 A1 | 7/2003 | Schroeder et al. | |
| 2003/0167209 A1 | 9/2003 | Hsieh | |
| 2003/0191723 A1 | 10/2003 | Foretich et al. | |
| 2003/0195810 A1 | 10/2003 | Raghupathy et al. | |
| 2003/0200185 A1 | 10/2003 | Huerta et al. | |
| 2003/0225593 A1 | 12/2003 | Ternoey et al. | |
| 2003/0229552 A1 | 12/2003 | Lebaric et al. | |
| 2004/0024715 A1 | 2/2004 | Ouimet | |
| 2004/0049470 A1 | 3/2004 | Ouimet | |
| 2004/0078288 A1 | 4/2004 | Forbis et al. | |
| 2004/0117376 A1 | 6/2004 | Lavin et al. | |
| 2004/0128225 A1 | 7/2004 | Thompson et al. | |
| 2004/0133526 A1 | 7/2004 | Shmueli et al. | |
| 2004/0193442 A1 | 9/2004 | Kimata et al. | |
| 2004/0267674 A1 | 12/2004 | Feng et al. | |
| 2005/0004819 A1 | 1/2005 | Etzioni et al. | |
| 2005/0096963 A1 | 5/2005 | Myr et al. | |
| 2005/0197857 A1 | 9/2005 | Avery | |
| 2005/0197971 A1 | 9/2005 | Kettner et al. | |
| 2005/0256778 A1 | 11/2005 | Boyd et al. | |
| 2005/0267831 A1 | 12/2005 | Esary et al. | |
| 2005/0278227 A1 | 12/2005 | Esary et al. | |
| 2006/0004861 A1 | 1/2006 | Albanese et al. | |
| 2006/0031178 A1 | 2/2006 | Lehrman et al. | |
| 2006/0031179 A1 | 2/2006 | Lehrman | |
| 2006/0047574 A1 | 3/2006 | Sundaram et al. | |
| 2006/0069585 A1 | 3/2006 | Springfield et al. | |
| 2006/0241923 A1 | 10/2006 | Xu et al. | |

FOREIGN PATENT DOCUMENTS

| | | |
|---|---|---|
| WO | WO 00/29995 | 5/2000 |
| WO | WO 2005/1199500 | 12/2005 |

OTHER PUBLICATIONS

"PCT International Search Report", Application No. PCT/US07/10754, mailed Nov. 7, 2007.

"PCT International Search Report", Application No. PCT/US07/11571, mailed Jan. 7, 2008.

"PCT International Search Report", Application No. PCT/US05/14879, mailed Apr. 16, 2007.

"Written Opinion of the International Searching Authority", Application No. PCT/US05/14879, mailed Apr. 16, 2007.

"Written Opinion of the International Searching Authority", Application No. PCT/US05/14981, mailed Nov. 27, 2006.

"Written Opinion of the International Searching Authority", Application No. PCT/US05/14883, mailed Oct. 3, 2006.

"PCT International Search Report and the Written Opinion of the International Searching Authority", Application No. PCT/US07/23740, mailed Mar. 3, 2008.

Beidl, Richard et al., "The Coming of Risk-Based Pricing: Part Two", Oct. 2000, Mortgage Banking, Washington, vol. 61, Issue 1.

Kenton, Kenton B. et al., "Planning a Revenue Stream System in an E-Business Environment", 2001, Industrial Management—Data Systems, p. 406-413, 8/9;ABI/INFORM Global.

"eMerchant, magic Software's Powerful New Business-to-Business E-commerce Solution. Wins 'Best of Show' at Internet Commerce Expo", Apr. 1, 1999, Business Wire, (2 pages).

Bourne, Humphrey, "Pricing the Strategic Implications", Mar. 1999, Management Accounting. Magazine for Chartered Management Accountants; vol. 77, Issue 3.

"PCT International Search Report and the Written Opinion of the International Searching Authority", Application No. PCT/US07/18663, mailed Aug. 26, 2008.

Bhattacharya, Anindya et al. "Using 'smart' pricing to increase profits and maximize customer satisfaction", Aug. 2001, The National Public Accountant; vol. 25, Issue 6.

Kim, Byung-Do et al., "Modeling the Distribution of Price Sensitivity and Implications for Optimal Retail Pricing", Jul. 1995, Journal of Business & Economic Statistics; vol. 13, Issue 3.

Levy, Michael et al., "Emerging Trends in Retail Pricing Practice: Implications for Research", 2004, Journal of Retailing; vol. 80.

Hung, Chao-Shun, "Conjectural Variations and Market Performance in a Differentiated Product Industry", Dec. 1991, Atlantic Economic Journal; vol. 19, Issue 4.

Dawes, John, "Assessing the Impact of a Very Successful Price Promotion on Brand, Category and Competitor Sales", 2004, The Journal of Product and Brand Management; vol. 13, Issue 5.

Leeflang, Peter S. H. et al., "Marketing Decisions Based on Econometric Models", Spring 2002, Marketing Research; vol. 14, Issue 1.

Dawes, John, "Price Changes and Defection Levels in a Subscription-Type Market: Can An Estimation Model Really Predict Defecation Levels?", The Journal of Services Marketing; vol. 18, Issue 1.

Lucke, Dorothea et al., "A Note on R&D and Price Elasticity of Demand," Nov. 2005, Jahrbucher fur Nationalokonomie and Statistik; vol. 225, Issue 6.

Caru, Antonella et al. "Profitability and Customer Satisfaction in Services: An Integrated Perspective Between Marketing and Cost Management Analysis", 1999, International Journal of Service Industry Management; vol. 10, Issue 2.

Tollefson, John O. et al., "Aggregation Criteria in Normative Market Segmentation Theory", Aug. 1978, Journal of Marketing Research; vol. 15.

Coulter, Keith S., "Decreasing Price Sensitivity Involving Physical Product Inventory: A Yield Management Application", 2001, The Journal of Product and Brand Management; vol. 10, Issue 5.

Origin 7.0 Help (including 21 sheets of screen shots), 2000.

Microsoft Excel 2000, 1985-1999.

Marn, Michael V. and Robert L. Rosiello, "Managing Price, Gaining Profit," Harvard Business Review, pp. 84-93 (Sep.-Oct. 1992).

"Net Commerce Launches Its FastTrack Configurator and FasPac Catalog Utility", Apr. 17, 2001, Business Wire. New York. p. 1.

"SPEX Assesses B2C and B2B Electronic Commerce Software Maturity", PR Newswire. New York: p. 1.

Murphy, Diane R., "The Exciting Role of the Credit Manager in the Expanding E-Commerce Marketplace", Business Credit, vol. 10, No. 9, p. 64, Oct. 2000.

Spanbauer, Scott et al., "You've got E-mail", PC World, vol. 16, No. 6, p. 135, Jun. 1998.

Walker, Kenton B. et al., "Planning a Revenue Stream System in an E-Business Environment", 2001, Industrial Management—Data Systems, p. 406-413, 8/9;ABI/INFORM Global.

Mills, Don, "Oil Rises on Report Showing Gasoline Supply Decline", National Post, Ont; May 30, 2003.

Chan Choi, S., Desarbo, W. S., Harker, P. T. "Product Positioning under Price Competition." Feb. 1990. Management Science, vol. 36, Issue 2, pp. 175-199.

Kirschen, D. S., Strbac, G., Cumperayot, P., de Paiva Mendes, D. "Factoring the Elasticity of Demand in Electricity Prices." May 2000. IEEE Transactions on Power Systems, vol. 15, No. 2, pp. 612-617.

* cited by examiner

Volume Rebate

Tier Calculation Type: ● Point ○ Range

Tier Type: ● Quantity ○ Amount ○ Percentage
UOM: LB

Adjustment Type: ○ Percent ○ Money ● Unit Amount
Currency: USD
UOM: LB

Adjustment Value Type: ● Actual ○ Incremental

Add  Copy  Delete

| | Tier Value | Adjustment |
|---|---|---|
| > | 0 LB | 0.05 USD / LB |
| > | 1000 LB | 0.10 USD / LB |
| > | 2000 LB | 0.20 USD / LB |
| > | 5000 LB | 0.30 USD / LB |

Apply  Cancel

PRICING TIER DIALOG WINDOW – QUANTITY OPTION

FIG. 8

PRICING TIER DIALOG WINDOW – AMOUNT OPTION

CONTRACT/DEAL WINDOW

FIG. 10

PRICE NEGOTIATOR WINDOW

FIG. 11

POLICY MANAGER WINDOW – VOLUME REBATE

POLICY MANAGER WINDOW – POLICY RECORD

WINDOW SHOWING STORED MFN INFORMATION FOR APPROVED MFN CLAUSES

WINDOW SHOWING MFN IMPACT DETAILS

FIG. 19

FORMULA BUILDER WINDOW

WINDOW SHOWING EXAMPLE OF INDEX-BASED PRICING FORMULA

WINDOW SHOWING PRODUCTS WITH BOM

WINDOW SHOWING BOM MAKEUP

WINDOW SHOWING BOM-BASED FORMULA BUILDER

FIG. 28

WINDOW SHOWING CONTRACTS SUBJECT TO PERIODIC COMMODITY
INDEX-BASED RE-PRICING

WINDOW SHOWING PARAMETERS FOR PERIODIC COMMODITY INDEX-BASED RE-PRICING

WINDOW SHOWING PRICE PROTECTION TERMS

FIG. 33

Commitment

Start Date: 02/09/2005
End Date: 01/01/2006
Time Period Type: Month
Default Quantity per Period: 10.00 25 kg Bags

| Period | Quantity | TVA Volume | TVA Unit Amount | Starting Price | Price protection cost | Invoice Price |
|---|---|---|---|---|---|---|
| Feb 2005 | 10.0000 | 0.00 | 0.0000 USD 25 kg | 4.31 USD | 0.00 USD | 6.72 USD |
| Mar 2005 | 10.0000 | 0.00 | 0.0000 USD 25 kg | 4.31 USD | 0.00 USD | 6.72 USD |
| Apr 2005 | 10.0000 | 0.00 | 0.0000 USD 25 kg | 4.92 USD | -0.61 USD | 6.72 USD |
| May 2005 | 10.0000 | 0.00 | 0.0000 USD 25 kg | 4.92 USD | -0.61 USD | 6.72 USD |
| Jun 2005 | 10.0000 | 0.00 | 0.0000 USD 25 kg | 4.92 USD | 0.00 USD | 7.33 USD |
| Jul 2005 | 10.0000 | 0.00 | 0.0000 USD 25 kg | 5.95 USD | -1.03 USD | 7.33 USD |
| Aug 2005 | 10.0000 | 0.00 | 0.0000 USD 25 kg | 5.95 USD | -1.03 USD | 7.33 USD |
| Sep 2005 | 10.0000 | 0.00 | 0.0000 USD 25 kg | 5.95 USD | 0.00 USD | 8.36 USD |
| Oct 2005 | 10.0000 | 0.00 | 0.0000 USD 25 kg | 5.95 USD | 0.00 USD | 8.36 USD |
| Nov 2005 | 10.0000 | 0.00 | 0.0000 USD 25 kg | 5.95 USD | 0.00 USD | 8.36 USD |

First | Previous | 1 | 2 | Next | Last

Total Quantity: 120.00 25 kg Bags

WINDOW SHOWING PRICE PROTECTION CALCULATIONS

FIG. 34

INTEGRATED PRICE MANAGEMENT SYSTEMS WITH FUTURE-PRICING AND METHODS THEREFOR

RELATED APPLICATIONS

This application is a continuation-in-part of U.S. patent application Ser. No. 10/914,716 filed on Aug. 9, 2004 by Lehrman, entitled "SYSTEMS AND METHODS FOR FORCASTING DATA IN AN INTEGRATED PRICE MANAGEMENT SYSTEM". The content of that application is incorporated herein by reference.

This application related to U.S. patent application Ser. No. 11/194,070 filed on Jul. 30, 2005 by SUNDARAM ET AL, entitled "SYSTEMS AND METHODS FOR INDEX-BASED PRICING IN A PRICE MANAGEMENT SYSTEM". The content of that application is incorporated herein by reference.

This application related to U.S. patent application Ser. No. 11/193,313 filed on Jul. 30, 2005 by ZHANG ET AL, entitled "SYSTEMS AND METHODS FOR TIERED PRICING IN A PRICE MANAGEMENT SYSTEM". The content of that application is incorporated herein by reference.

BACKGROUND OF THE INVENTION

The present invention relates to price management systems. More particularly, the present invention relates to systems and methods for future-pricing in an integrated price management system.

It is often advantageous for a business enterprise to have a system whereby a sales force can offer existing and potential customers assurances with respect to pricing. In particular, a sales force may wish to guarantee a high volume customer that the proposed price for a particular product is, and will remain for the life of the deal, the lowest price offered to any customer. If, at any time during the life of the deal, the product in question is sold at a lower price to any customer, the guaranteed lowest price offered to the original customer will be changed to meet the current lowest price.

This type of lowest price guarantee status accorded to a particular product or set of products in a deal is called most favored nation (MFN) status. MFN status is established by the inclusion of an appropriate MFN clause in the deal. Customers offered MFN status are assured that the related product or set of products will be priced at a price lower than or equal to the lowest price offered for said product or product set. In effect, granting MFN status is a way of future-pricing a product to be the lowest offered going forward. In a particular business enterprise, there may be any number of MFN clauses in any number of deals.

Businesses employ a myriad of enterprise resource planning tools in order to manage and control business processes. For example, systems like SAP are employed to facilitate management by using objective data in order gain enterprise efficiencies. By manipulating objective data, these systems offer consistent metrics upon which business may make informed decisions and policies regarding the viability and direction of their products and services. However, in many cases, the decisions and policies may be difficult to procure as a result of the volume and organization of relevant data and may be difficult to administer as both temporal restraints and approval processes may inhibit rapid deployment of valuable information.

In particular, in the context of incorporating an MFN policy into an integrated price management system within the context of said enterprise resource planning system, information regarding MFN clauses throughout the system may be difficult to obtain. A sales force, however, in deciding whether or not to grant MFN status needs to have ready access to MFN information in order to determine the potential system-wide impact of so doing.

It is often the case that a sales force may need to obtain various levels of approval before offering a customer MFN status for a particular product. In order for management to make an informed decision on whether to grant MFN status in a particular case, they must have all relevant MFN impact information. An MFN clause violation may have potential impact across a number of deals and commitment periods. Of course, potential impact for future commitment periods may not be realized if, for example, a customer fails to meet a commitment volume. In any case, it is imperative for effective enterprise resource planning that all relevant MFN data be accessible.

As such, methods for generating and displaying MFN impact data across all impacted deals in a timely manner, as well as systems and methods for incorporating MFN clauses into deals in a manner guaranteeing their effectiveness may be desirable to achieve system-wide price management efficiency.

In view of the foregoing, Integrated Price Management Systems with Future-Pricing and Methods Therefor are disclosed.

SUMMARY OF THE INVENTION

In view of the foregoing, Integrated Price Management Systems with Future-Pricing and Methods Therefor are disclosed. The present invention presents systems and methods of future-pricing in an integrated price management system. In one embodiment, the invention provides a method of maintaining at least one deal with a lowest price status for at least one product in the price management system by inputting a proposed price for product; searching the price management system for deals having the product with the lowest price status; defining a current lowest price as equal to the price of the product; and, if said proposed price is less than said current lowest price, then computing a potential revenue impact of lowering the price of said product to the proposed price.

In some embodiments, said revenue impact is equal to the cumulative difference between said current lowest price of each said existing deal and said proposed price, and said impact is displayed. The impact may be computed for selected time intervals. The impact may also be computed and displayed as total revenue impact for each deal; and displayed as revenue impact for each selected time interval of each deal.

In other embodiments, an alert warning is triggered when said proposed price is less than said current lowest price. An approval may be required for said proposed price. The price may be proposed in the process of revising an existing deal or negotiating a new deal.

In still other embodiments, the invention provides a method for providing lowest price status for a product in the process of forming a new deal by selecting said a product to be assigned said lowest price status; searching said price management system for existing deals having said product with said lowest price status and a current lowest price; and assigning said lowest price status and said current lowest price to the product. The method may label said product as having said lowest price status in said price management system.

Note that the various features of the present invention described above can be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 8 through 13 are pricing tier related windows illustrating sample user interfaces in accordance with an embodiment of the invention.

FIGS. 18 and 19 are MFN related windows illustrating sample user interfaces in accordance with an embodiment of the invention.

FIGS. 26 through 28 are BOM index-based pricing related windows illustrating sample user interfaces in accordance with an embodiment of the invention.

FIGS. 33 and 34 are price protection related windows illustrating sample user interfaces in accordance with an embodiment of the invention.

DETAILED DESCRIPTION OF THE PREFERRED EMBODIMENTS

The present invention will now be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1:
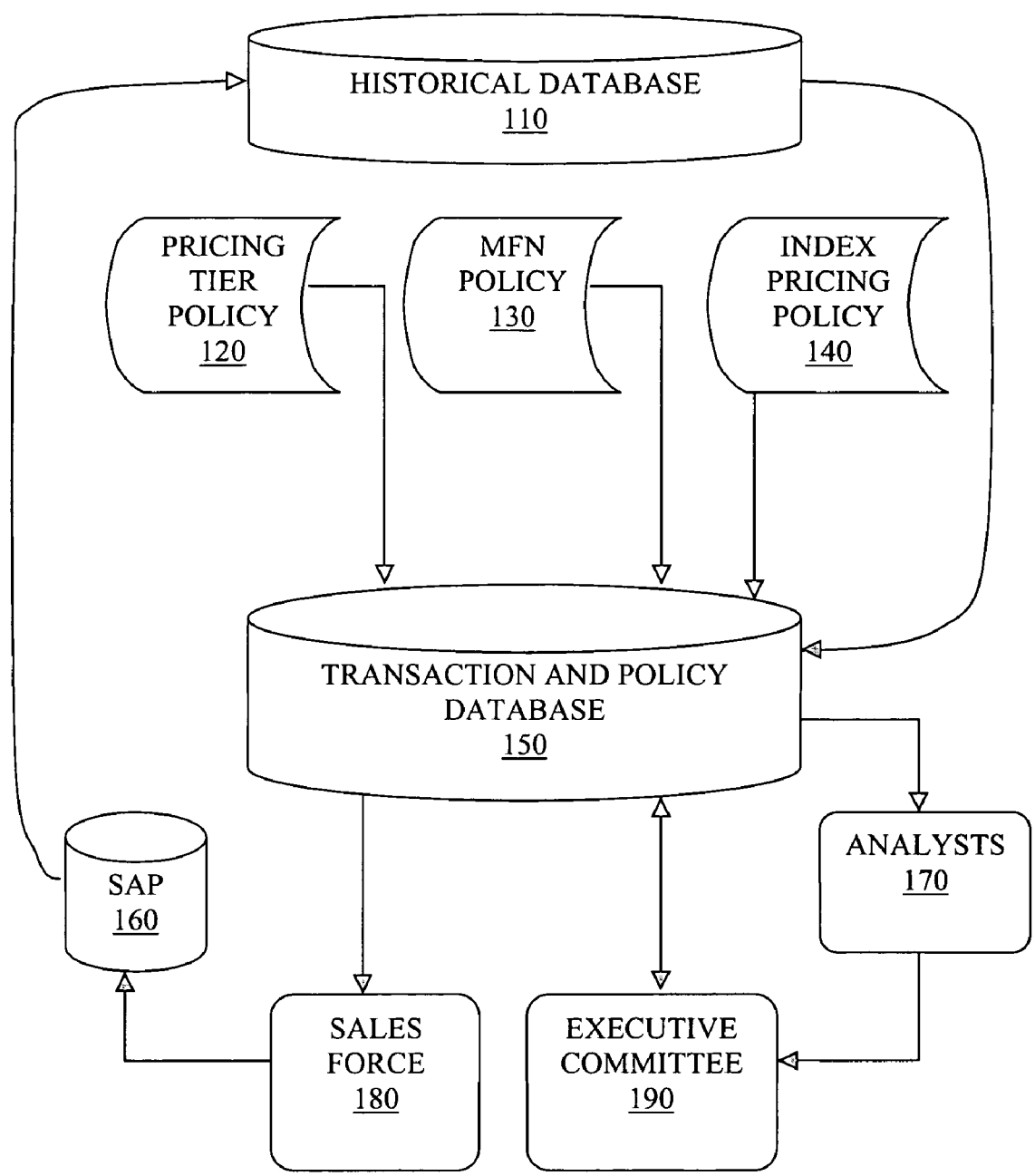
FIGS. 1 and 2 are simplified graphical representations of an enterprise pricing environment featuring tiered pricing, MFN pricing, and index pricing; and user accessible entry points to each.

FIG. 1 is a simplified graphical representation of an enterprise integrated price management system featuring Tiered pricing, MFN pricing and Index-Based pricing in accordance with an implementation of an embodiment of the present invention. A historical database 110 may contain any of a number of enterprise pricing environment related records. An analysis of said historical data may then be used to generate a transaction and policy database 150. Analysts 170 may use the stored data to formulate policies which may be approved and instituted by an executive committee 190. Said executive committee may monitor data stored and modify policy generated in response to changes in enterprise business objectives or external market conditions.

Policies generated by the executive committee 190 with feedback from the analysts 170 may be accessed by a sales force 180 from the transaction and policy database 150 in the course of negotiating a sales transaction. In this manner, sales negotiations and transactions may be conducted in accordance with enterprise business objectives on a real time basis. For example, analysis of a selected group of transactions residing in the historical database 110 may generate a policy that requires or suggests a volume discount for sales of a particular product above a selected threshold. In this example, historical sales transactions may have indicated that a volume discount for a particular product tends to stimulate sufficient additional sales to justify the discount. Thus, in this manner, a policy may both be generated and incorporated into the price management system. A policy may then be used to generate logic that may be used by the sales force 180 in generating a transaction item.

Policies may be derived form any combination of historical data, market indicators, common business custom and practice, or other external data. The executive committee 190 may manually enter any number of policies relevant to a going concern. For example, an executive committee 190 may use historical sales data in combination with external forecast data to formulate pricing tier policy 120. Forecast data may comprise, in some examples, forward looking price estimations for a product or product set, which may be stored in a transaction and policy database 150. Pricing tiers provide pricing adjustments for selected levels, or tiers, of product quantity or transaction currency amount in a given deal. Historical and forecast data may be utilized by an executive committee 190 to analyze a given market to determine whether a margin corresponding to a deal may be preserved or enhanced by virtue of implementing pricing tier policy at the transaction level.

In the same manner, the executive committee 190 may use relevant data to generate most favored nation (MFN) policy 130. In some embodiments, MFN policies may then be incorporated into the integrated price management system of the present invention. MFN is a status accorded a product or set of products in a deal such that said product or set of products in said deal for a defined time period will be guaranteed to be priced at or below the lowest price for said same product or set of products in any other valid deal in said integrated price management system over the same time period. MFN allows a vendor to assure a customer that the negotiated price is, and will remain for the agreed time period, the lowest price offered by the vendor to any customer. The Executive committee 190 may determine through analysis of historical and forecast data that a margin corresponding to a deal may be preserved or enhanced by virtue of offering MFN status for a given product or product set.

Index-based pricing may be formulated into index pricing policy 140 which may similarly be incorporated into some embodiments of the present integrated price management system. Indexes, which are generally known in the art, have been employed in a variety of manners. Stock markets, for example, often use indexes as a gauge of general market condition. Other indexes measure the movement in national and international prices for commodities and other items of trade. For instance, in the chemical industry, well known periodic indexes are used to establish the index price of various bulk chemicals. Said indexes may be published on a daily, weekly, monthly, quarterly or annual basis. In a preferred embodiment of the present invention, product pricing is tied to selected indexes within the context of the integrated price management system.

The executive committee 190 may manually enter any number of policies into the transaction and policy database 150 using historical data, forecast data, or other informed logical or best guess forecast information in accordance with the present invention. Said such data or information may also be used, in conjunction with input from analysts 170, to monitor and update policies as necessary. The executive committee 190 may grant the sales force 180 any amount of flexibility with respect to adhering to policy. For instance, in the context of setting pricing tiers, the pricing tier policy 120 may be configured such that, when accessed by the sales force 180, any number of pricing tier parameters may be set. On the other hand, the executive committee may wish to limit the number of parameters which the sales force may set in accordance with business strategy and objectives.

After transactions are generated based on policies, a transactional portion of the database may be used to generate sales quotes by a sales force 180 in SAP 160 or other appropriate enterprise resource planning system used to maintain and control business processes in order to gain enterprise efficiencies. SAP 160 may then generate a sales invoice which may then, in turn, be used to further populate a historical database 110.

Figure 2:
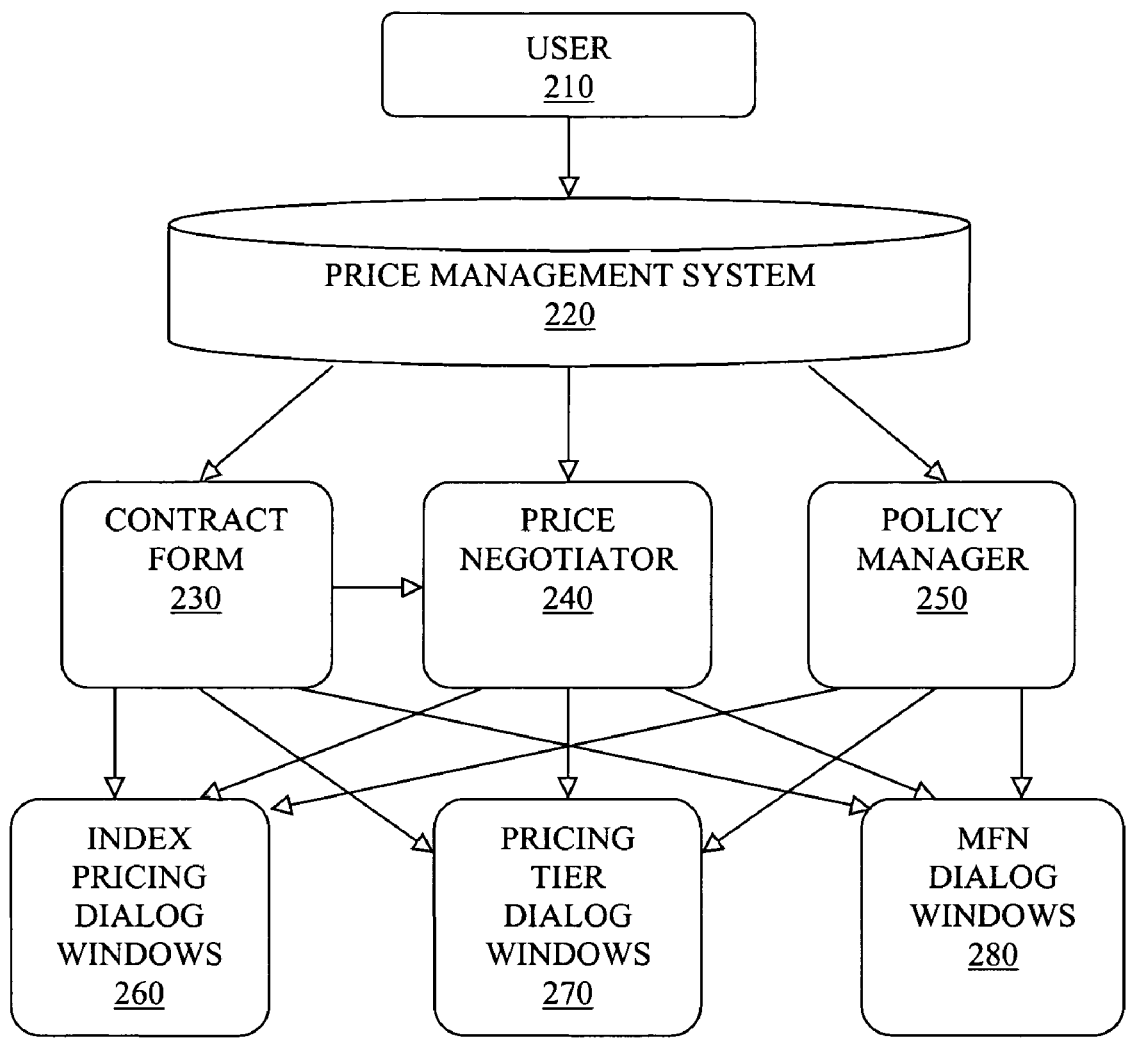

FIG. 2 is a simplified graphical representation of selected user accessible entry points to pricing features in accordance with an embodiment of the present invention. A user 210, preferably a sales user accesses the integrated price management system 220 in the course of proposing, negotiating, finalizing or revising a deal. In the case where a sales user is attempting to finalize a deal, the user may access the contract form 230 in said system. The contract form allows the user to set the various parameters necessary for structuring a contract. In the case where the user 210 wishes to include index pricing terms, the user may access the index pricing dialog windows 260 directly from said contract form 230. Preferably, the user accesses the price negotiator 240 initially, and subsequently brings up the index pricing dialog window 260 from the price negotiator 240.

In this manner, the user 210 may access any of the pricing tier dialog windows 270 and the most favored nation (MFN) dialog windows 280. The executive committee 190 may choose to allow the user 210 to access any of the aforementioned windows through the policy manager 250. Preferably, policy is set by the executive committee 190, stored in the transaction and policy database 150 and used to inform the price management system 220. In this manner, sales users may conduct transactions in accordance with policy through use of said price management system 220.

Figure 3:
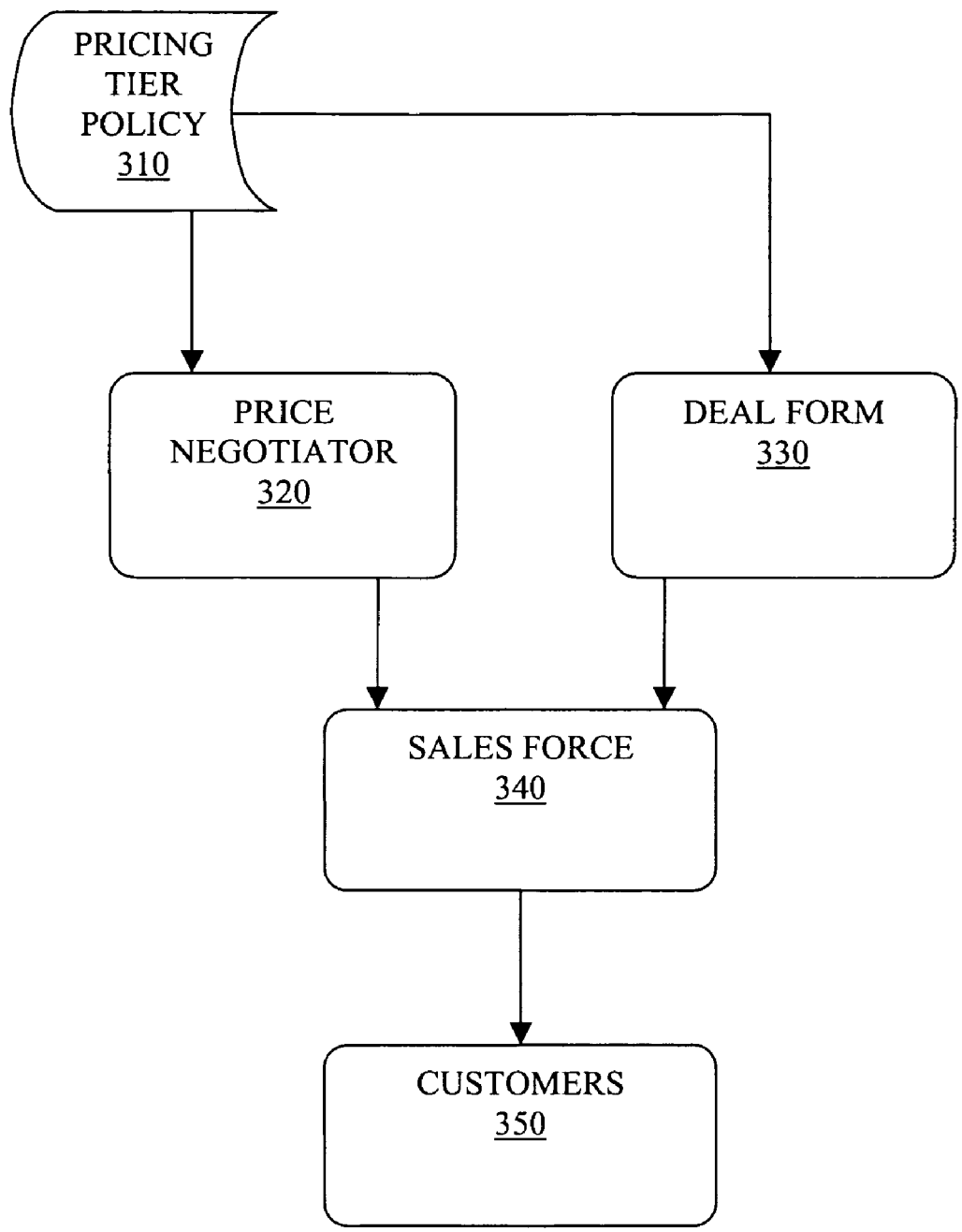
FIGS. 3 through 5 are simplified graphical representations of an enterprise pricing environment wherein tiered pricing logic, MFN logic, and index pricing logic are integrated into the price management system.

FIG. 3 is a simplified graphical representation of an enterprise pricing environment wherein pricing tier policy 310 is integrated into the price management system in an embodiment of the present invention. The system is structured so as to allow a sales force 340 to engage in various transactions with customers 350. In the course of their interaction with customers 350, the sales force 340 has the ability to access both the price negotiator 320 and the deal form 330. Pricing tier logic policy 310 is set so that the sales force 340 may set and modify pricing tiers in accordance with policy in the course of negotiations.

Figure 4:
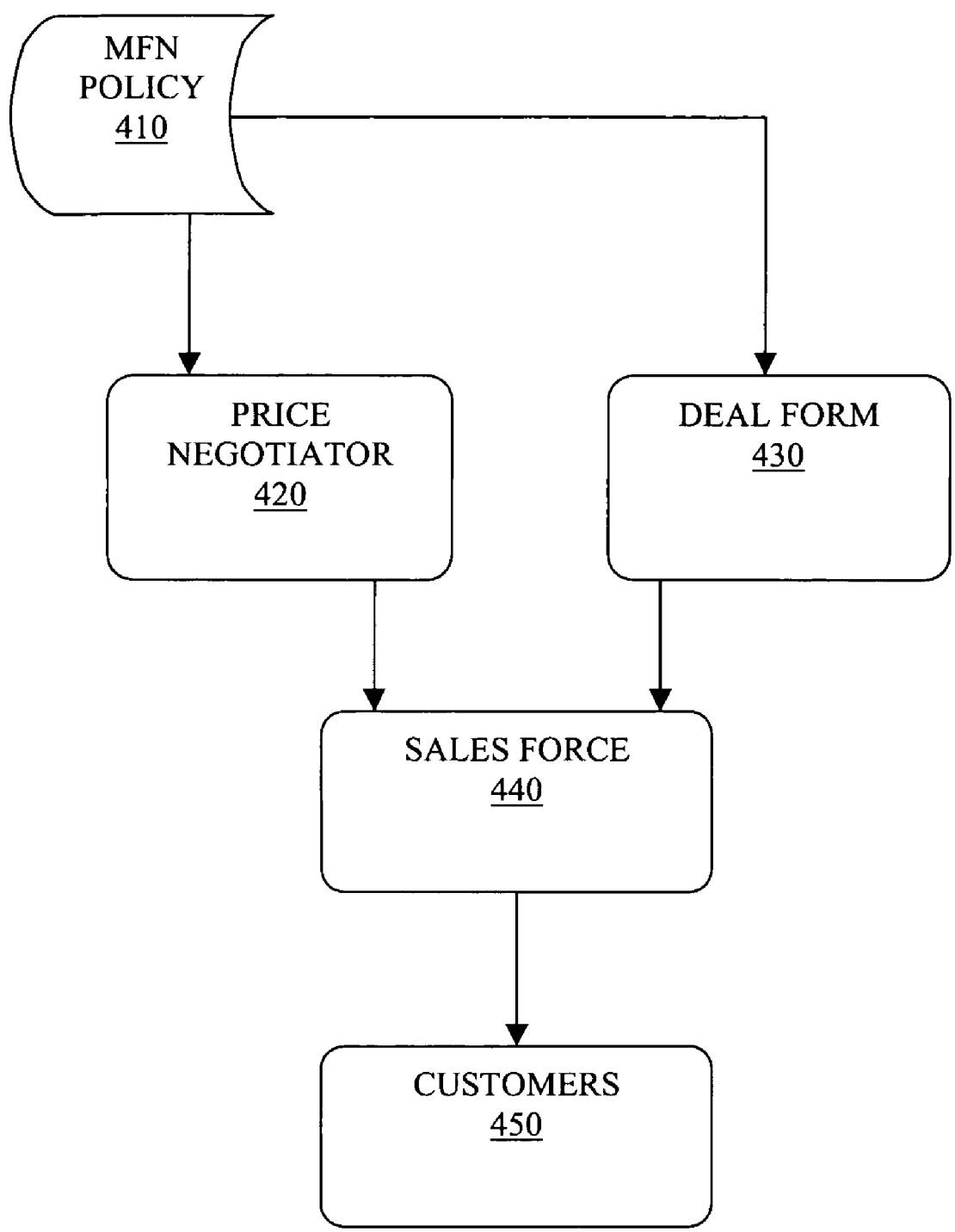

FIG. 4 is a simplified graphical representation of an enterprise pricing environment wherein most favored nation (MFN) policy 410 is integrated into the price management system in an embodiment of the present invention. Again, the system is structured so as to allow another sales force 440 to engage in various transactions with customers 450. In the course of their interaction with customers 450, the sales force 440 has the ability to access both the price negotiator 420 and the deal form 430. In some industries, it is advantageous for a sales force 440 to have the ability to guarantee a customer 450 that the negotiated price is, and will continue to be for the agreed upon time period, the lowest price offered to any customer. Most favored nation (MFN) policy 410 is set so that the sales force 440 may set and modify agreed upon most favored nation clauses in accordance with policy in the course of negotiations.

Figure 5:
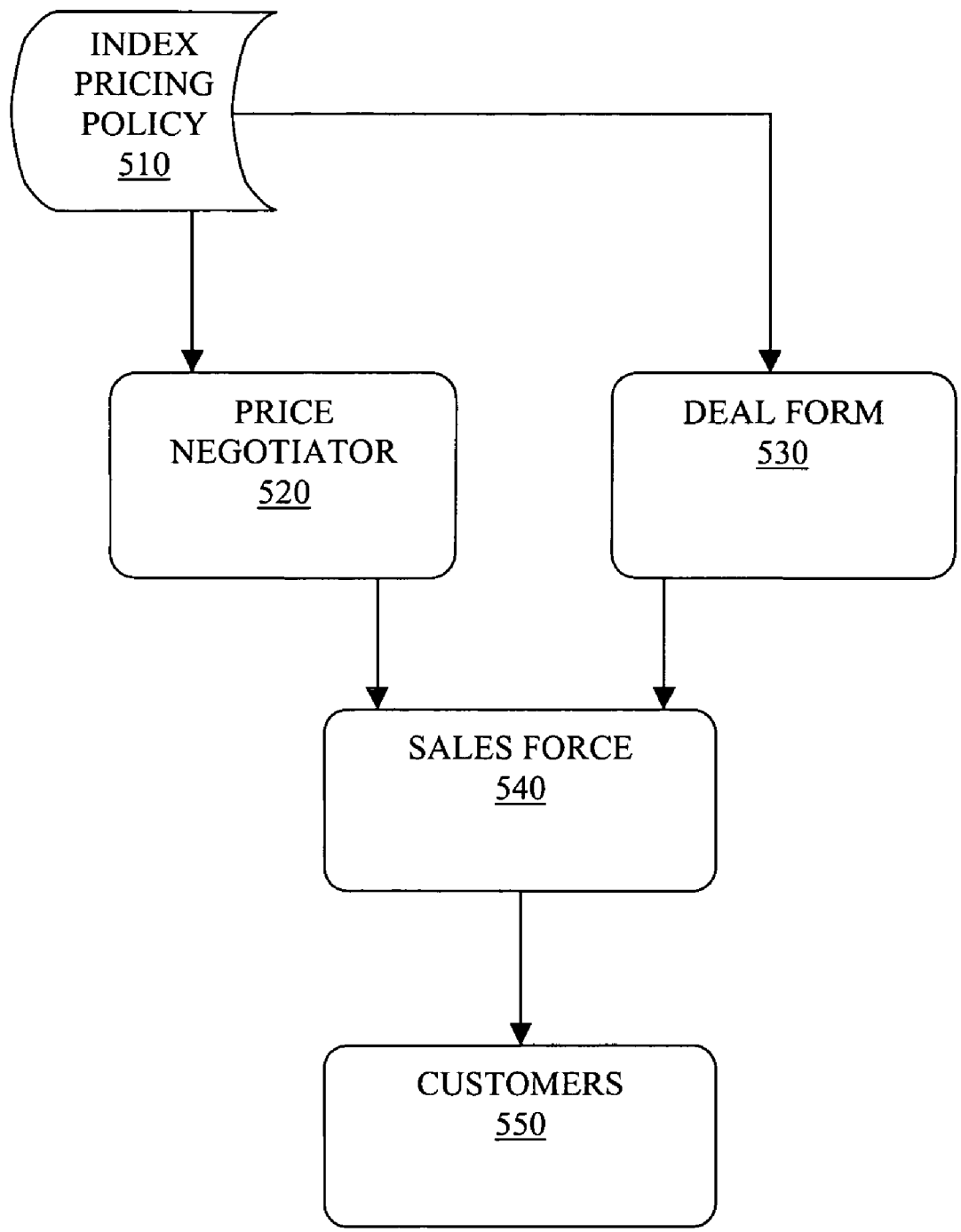

FIG. 5 is a simplified graphical representation of an enterprise pricing environment wherein index pricing policy logic 510 is integrated into the price management system in an embodiment of the present invention. The system is structured so as to allow yet another sales force 540 to engage in various transactions with still more customers 550. In the course of their interaction with customers 550, the sales force 540 has the ability to access both the price negotiator 520 and the deal form 530. Often, a sales force will be engaged in the sale of a commodity or other product which has a related index. Said index is typically published on a daily, weekly, monthly, quarterly or annual basis. Preferably, the index uses some combination of market sales history and forecast data to compute a pricing index which offers guidance to the industry as to the value of a particular commodity or other product. As such, a sales force 540 may wish to tie the price of a product to an index in order to account for changing market conditions. Index pricing policy 510 is set so that the sales force 540 may set and modify index pricing terms in accordance with policy in the course of negotiations.

Tier-Based Pricing

Figure 6:
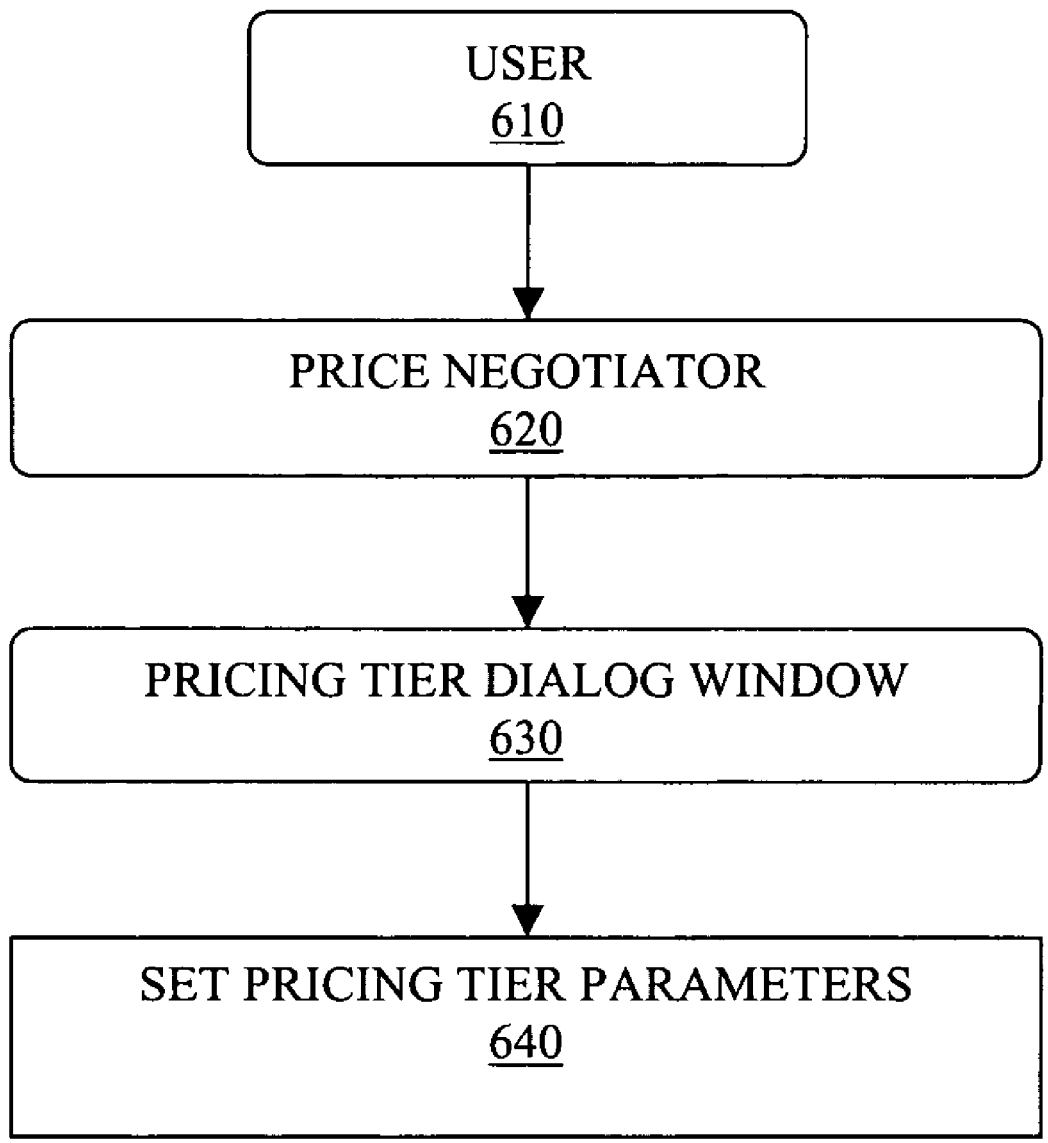
FIG. 6 is a simplified graphical representation of a path taken by a user in accessing pricing tier policy within the price management system.

FIG. 6 is a simplified graphical representation of a path taken by a user 610, preferably a sales user, when accessing and setting pricing tier policy within the context of an enterprise pricing environment in an embodiment of the present invention. At any point in the course of negotiations with a customer, a sales user 610 may utilize the integrated price management system of the present invention to access the price negotiator 620. At an appropriate time in the course of negotiations, the user 610 may wish to access a pricing tier dialog window 630. Once accessed, the pricing tier dialog window 630 gives the user 610 the option to set any of a number of pricing tier parameters 640. Setting pricing tier parameters is discussed in more detail below. In this manner, sales users may advantageously incorporate pricing tier terms into the negotiation process on a real time basis. The system assures that said terms will be incorporated in a manner consistent with policy set by, for instance, an executive committee.

Figure 7:
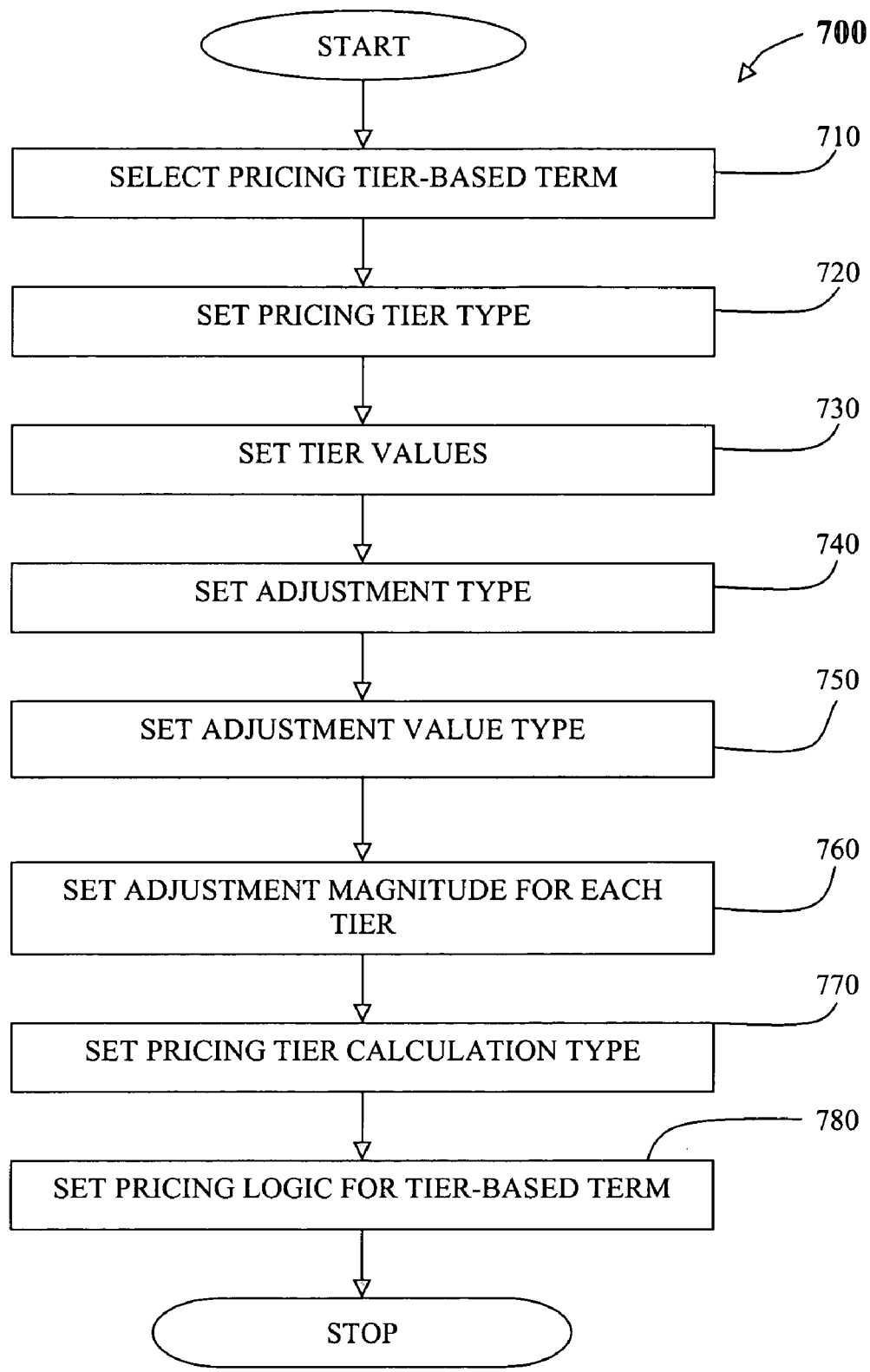
FIGS. 7 and 7A-7C are flowcharts illustrating a process for calculating pricing tier-based terms in an embodiment of the invention.

FIG. 7 is a flowchart illustrating a method for calculating pricing tier-based terms in accordance with an embodiment of the present invention. A pricing tier-based term is a type of pricing term that is set during or after price negotiations. It allows the sales user to provide pricing adjustment values for selected levels, or tiers, of product quantity or total price achieved. For instance, the sales user may choose to set quantity tiers whereby a different adjustment value is applied for each quantity tier set. If the quantity in question is above a certain threshold, the adjustment value for that tier is applied. Generally, as the quantity increases, and higher tiers are reached, greater adjustment values are applied. Tiers may also be based on total dollar amount for a particular term. The method provides a means of allowing sales users to negotiate and to capture theses various pricing tier-based terms.

For a particular transaction, sales users are able to capture all pricing terms which are based on tiers and use the information from the captured terms to apply adjustments for the entire transaction across different products. On the other hand, where pricing tier-based terms apply only to a particular line item within a transaction, sales users are able to negotiate and capture said pricing tiers and use the information to apply adjustments for that line item only.

FIG. 7 shows a flowchart 700 illustrating a method of calculating pricing tier-based terms in accordance with an embodiment of the present invention. A user first selects a pricing tier-based term at step 710.

The user then sets the pricing tier type at step 720. The type can either be Amount, Quantity or Percentage. When Amount is selected, that means the tier adjustment will be based on some money value, i.e., total sales price of a line item or total sales price of an entire transaction. If Quantity is selected, that means the tier adjustment will be based on the quantity value of a line item or the quantity value of an entire transaction. If Percentage is selected, the tier adjustment preferably will be based on the net margin percent of the transaction.

Figure 7A:
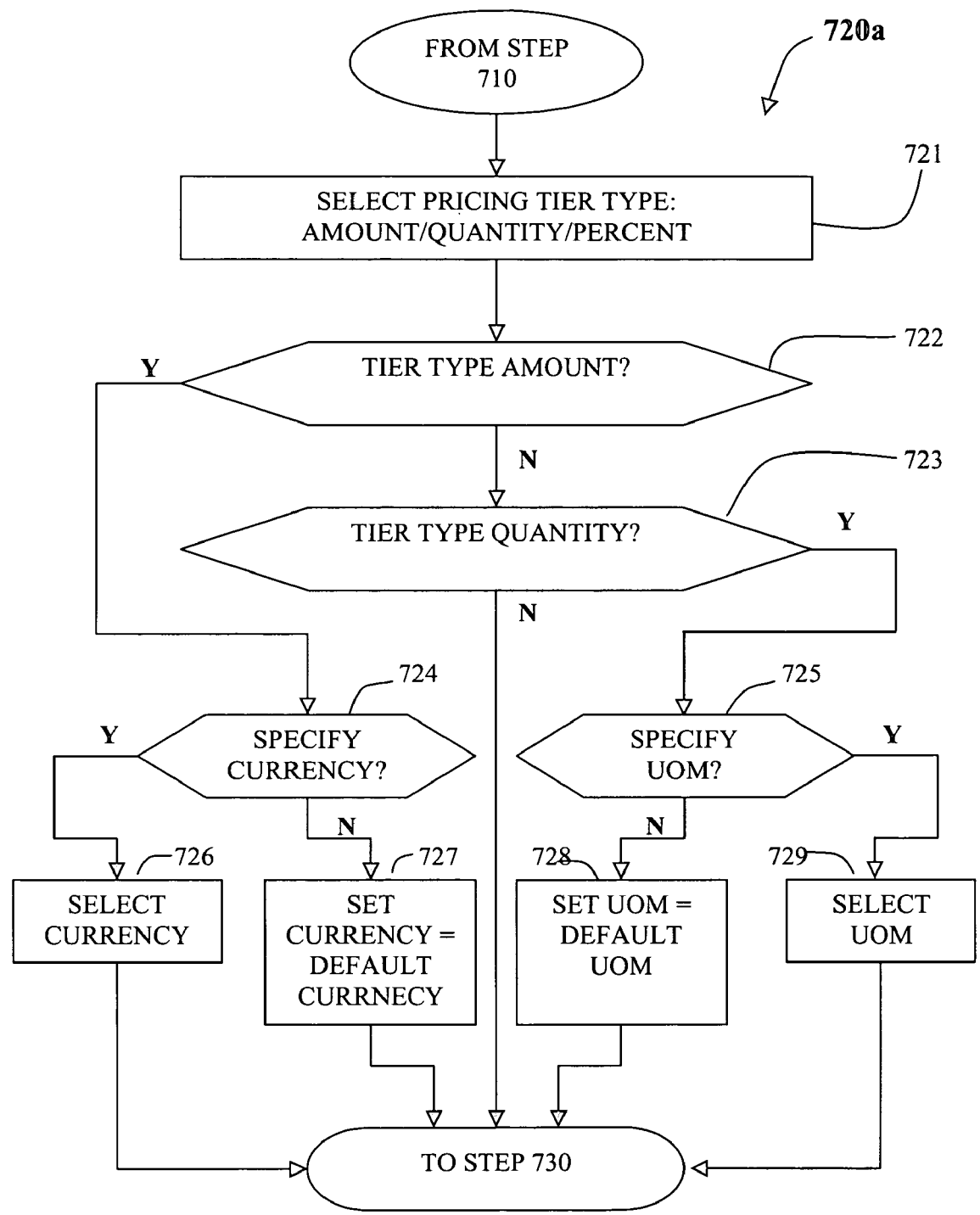

FIG. 7A shows a flowchart 720a illustrating a method for selecting a pricing tier type in accordance with an embodiment of the present invention. In particular, FIG. 7A is further illustrative of step 720 of FIG. 7. At step 721, a user sets the pricing tier type as either Amount or Quantity or Percent. As discussed above, Amount designates a tier type based upon the total sales price of the line item or transaction in question. Quantity designates a tier type based upon the total quantity of product contemplated in a particular line item or transaction. Percent designates a tier type based upon net margin.

The method then determines, at step 722, whether the user has set the tier type to Amount. If so, the user is prompted to specify a currency at step 723. The user may either select a currency at step 725, or a default currency will be set at step 726. If the user chooses not to select a currency, the currency previously set on the line item or in the transaction will be used as the default currency value for the currency field on the pricing tier. Once it is set, any changes on the form or line item will not affect the currency field on the pricing tier.

If, on the other hand, the user selects Quantity as the tier type at step 723, the method prompts the user to specify a unit of measurement (UOM) at step 724. The user may either specify a UOM at step 728 or allow the method to set a default UOM at step 727. As in the case above, if the user chooses not to select a UOM, the UOM previously set on the line item or in the transaction will be used as the default UOM value for the UOM field on pricing tier. Once it is set, any changes on the form or line item will not affect the UOM field on the pricing tier.

If the user selects Percentage as the tier type, no further selections need be made to further define said tier type.

Referring once again to FIG. 7, once the user has set the pricing tier type at step 720, the user may then set the actual tiers at step 730. For instance, the user may select to set the pricing tier type to Quantity. The user may then set cut-off values to delineate a group of tiers. As such, the user may negotiate a volume based rebate where, for instance, in a preferred embodiment, pricing adjustment values are assigned for a first tier of greater than zero units; a second tier of greater than 1000 units; a third tier of greater than 2000 units; and so on.

Various ranges may be used to define the tier levels as dictated by business objectives. For example, tiers may be set as greater than or equal to 1 unit; greater than or equal to 1000 units; greater than or equal to 2000 units, and so on. Similarly, tiers may be defined as 1-1000 units; 1001-2000 units; 2001-3000 units, and so on.

The units for each tier may vary to meet current business objectives. Preferably, units correspond to units of currency, units of measure, or percentage units. Said preferred types of units may best be used with tire types of Amount, Quantity, and Percentage, respectively.

Figure 7B:
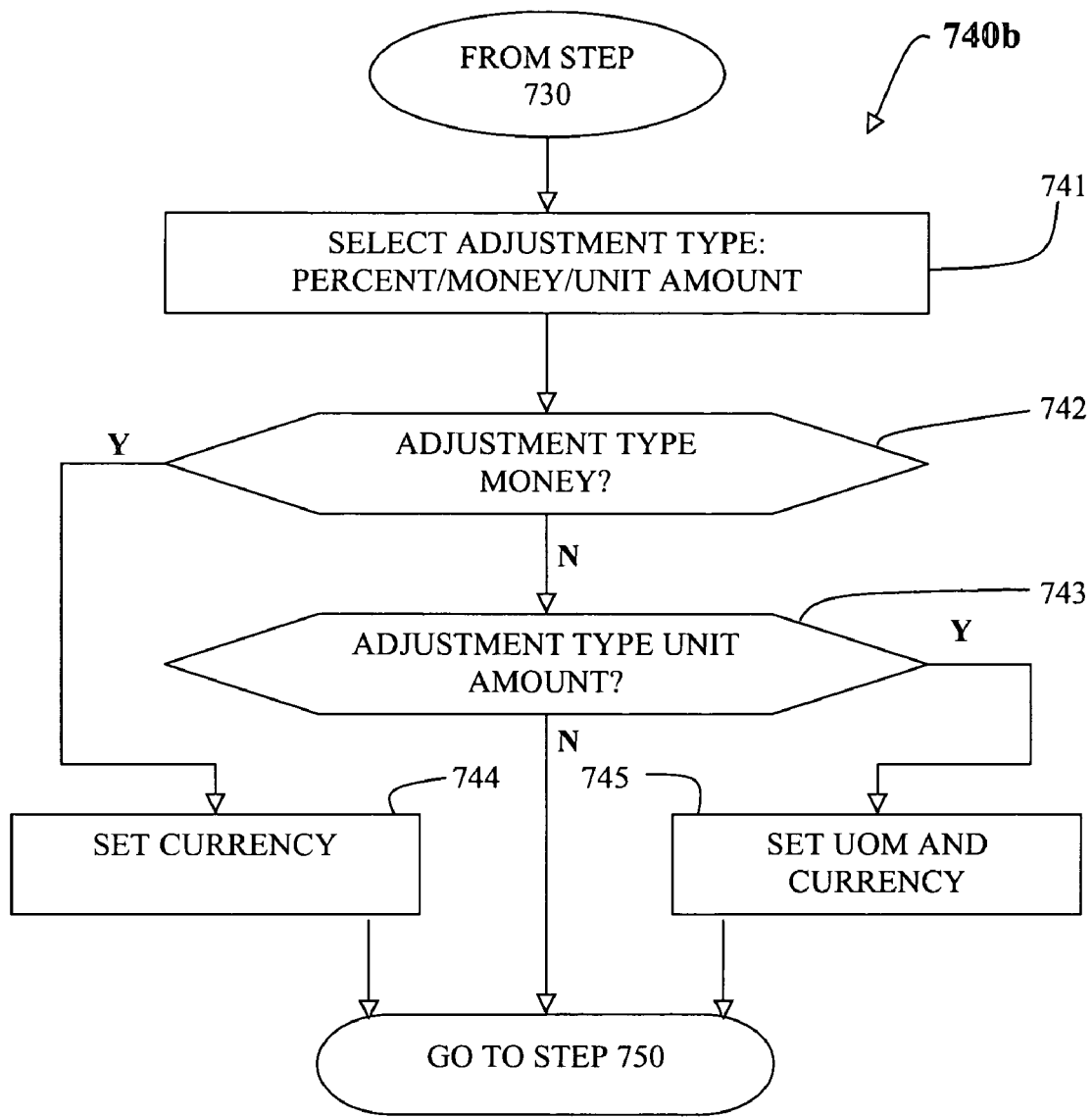

In step 740, the user sets an adjustment type. FIG. 7B shows a flowchart 740b illustrating a method for selecting an adjustment type in accordance with an embodiment of the present invention. In particular, FIG. 7B is further illustrative of step 740 of FIG. 7. At step 741, the user may select Percent, Money, or Unit Amount as an adjustment type.

If the user sets the adjustment type to Money in step 742, the user is then prompted in step 744 to specify a currency for the Money adjustment type. For example, the user may choose to set the currency to U.S. dollars. Then, using the tiers set out in the example above, an adjustment value of $3 may be assigned to the first tier of 1-1000; $4 may be assigned to the second tier of 1001-2000; $5 may be assigned to the third tier of 2001-3000; and so on.

If, on the other hand, the user sets the adjustment type to Unit Amount in step 743, the method then prompts the user in step 745 to specify both a currency and UOM. For example, the user may choose to set the currency to U.S. dollars and set the UOM to pounds. Then, using the tiers set out in the example above, an adjustment value of $3/lb may be assigned to the first tier of 1-1000; $4/lb may be assigned to the second tier of 1001-2000; $5/lb may be assigned to the third tier of 2001-3000; and so on.

Finally, the user may set the adjustment type to Percent in step 741. In this case, the user need not set a currency or UOM to further define the adjustment type. The user need only set the value of the percent adjustment for each tier. For example, using the tiers set out in the example above, an adjustment value of 3% may be assigned to the first tier of 1-1000; 4% may be assigned to the second tier of 1001-2000; 5% may be assigned to the third tier of 2001-3000; and so on. As such, a discount of 3%, 4%, and 5% is applied to each tier, respectively.

Referring again to FIG. 7, once the adjustment type is set in step 740, the user may set an adjustment value type in step 750. An adjustment value type of actual or incremental may be set. If the adjustment value type is set to actual, then the specific discount for the implicated tier is applied. If, however, the adjustment value type is set to incremental, then the cumulative value of all the discounts in tiers up to and including the implicated tier is applied.

For example, using the tiers set out in the example above, an adjustment value of 3% may be assigned to the first tier of 1-1000; 4% may be assigned to the second tier of 1001-2000; 5% may be assigned to the third tier of 2001-3000; and so on. As such, a discount of 3%, 4%, and 5% is applied to each tier, respectively, in the case where the adjustment value type is set to actual. On the other hand, a discount of 3% for tier one, 7% for tier two, and 12% for tier 3 is applied in the case where the adjustment value is set to incremental.

Referring once again to FIG. 7, once the adjustment value type is set in step 750, the user may select the magnitude of the adjustment for each tier in step 760. For example, once the adjustment type is set to Percent, the user must choose what percent discount to give for each tier. Normally, the discount increases as the tiers progress towards greater volumes of product.

Figure 7C:
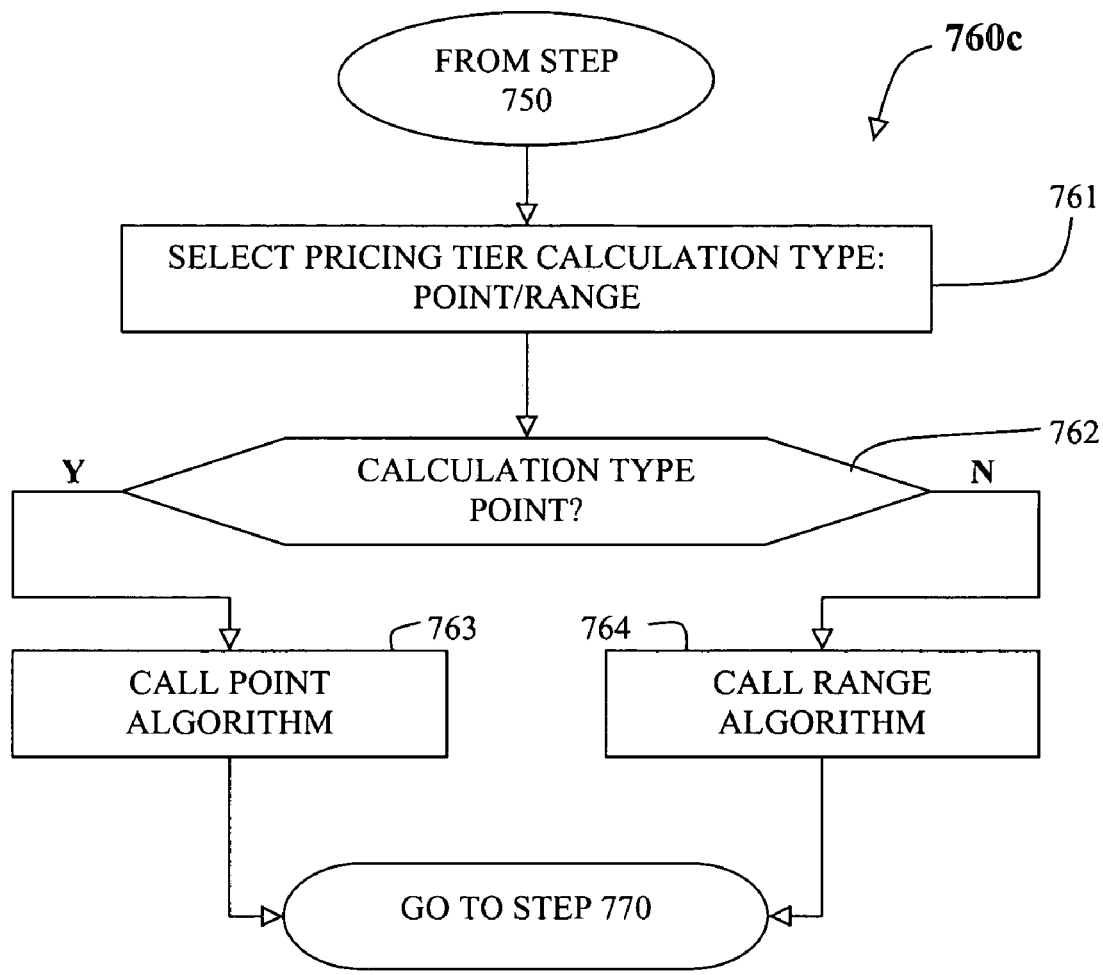

Once the magnitude of the adjustment value for each tier has been set, the user may set the pricing tier calculation type in step 770. FIG. 7C shows a flowchart 760c illustrating a method for selecting a pricing tier calculation type in accordance with an embodiment of the present invention. In particular, FIG. 7C is further illustrative of step 770 of FIG. 7. At step 761, the user selects a pricing tier calculation type. The pricing tier calculation type may be either Point or Range. If the calculation type has been set to Point at step 762, the method calls the Point algorithm at step 763. If the calculation type has been set to Range, the method calls the Range algorithm at step 764.

Point vs. Range calculation is best illustrated by the following example: The user negotiates a Quantity based rebate that has the following tiers: 3% for 1 to 1000 units, 4% for 1001 to 2000 units, and 5% for 2001 units and above. If the calculation type is designated Range, and the actual purchase resulted in 1500 units, the first 1000 units purchased will yield a rebate of 3% and the remaining 500 units will yield a rebate of 4%. If the calculation type is designated as a Point calculation, the rebate amount will always use the highest tier reached; in this example, the rebate would be 4% on the entire 1500 units.

Referring once again to FIG. 7, once the calculation type has been set in step 770, the logic for calculating the actual adjustment value for the pricing tier-based term is set in step 780. This adjustment value is used to adjust the price of the item in question according to the foregoing method. Any number of pricing tier-based terms may be set in a particular deal. Said terms are recognized and said tier-based pricing logic is called to compute product prices based on tier levels.

FIG. 8 shows a pricing tier dialog window illustrating a user interface in accordance with an embodiment of the present invention. The sales user is allowed to input desired parameters while negotiating a deal. The user may designate a tier calculation type which is shown at as having been designated Point. FIG. 8 further illustrates the tier type having been designated as Quantity; the adjustment type designated as Unit Amount; and the adjustment value type designated as Actual. It should also be noted that, in accordance with the process outlined above, the user, having designated the tier type as Quantity, must also designate a UOM. In this particular embodiment, the user is allowed to select a UOM from a pull down menu activated by the selection of Quantity as the tier type. Furthermore, since the user designated Unit Amount for adjustment type, both a unit of measure and a currency must be defined for adjustment type. Once the user has designated the above parameters, an adjustment value may be calculated.

Figure 9:
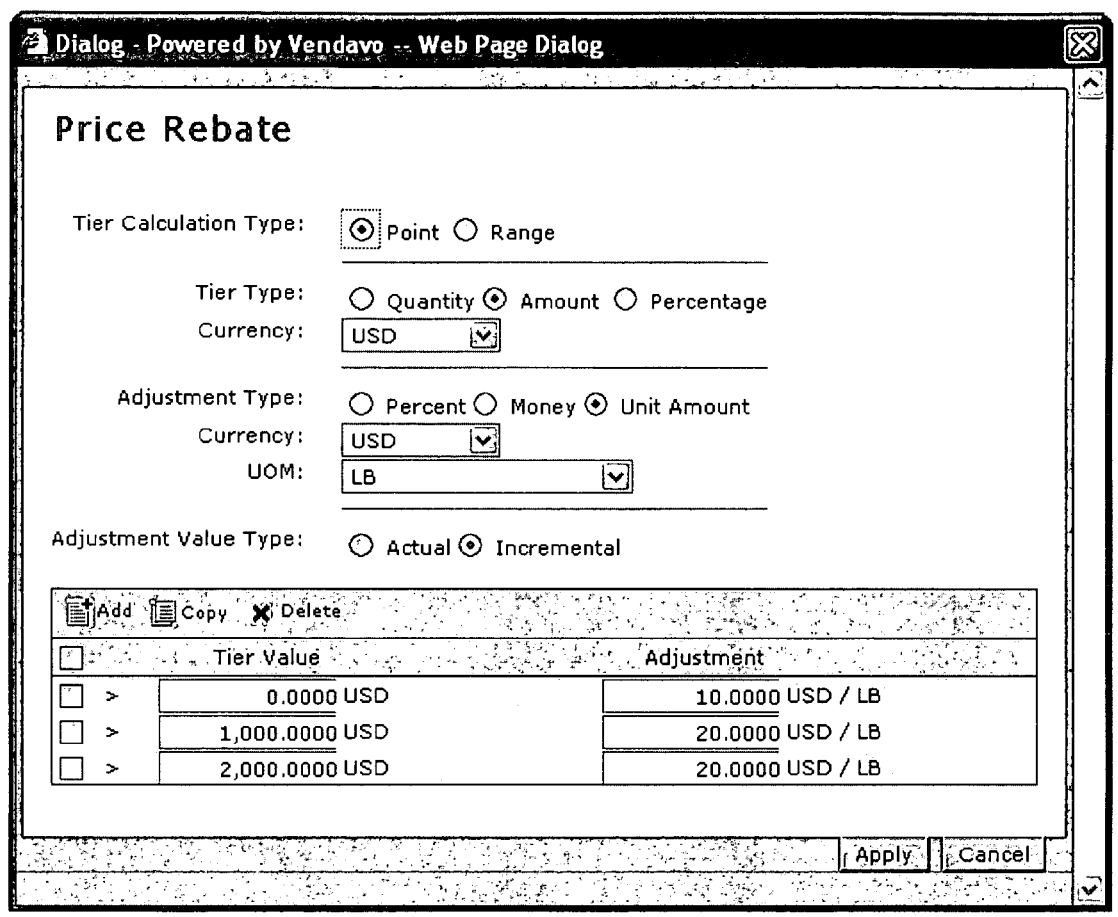

FIG. 9 shows a pricing tier dialog window illustrating a user interface in accordance with an embodiment of the present invention. In this example, the user has designated a tier calculation type as Point. FIG. 9 further illustrates the tier type having been designated as Amount; the adjustment type designated as Unit Amount; and the adjustment value type designated as Incremental. It should also be noted that, in accordance with the process outlined above, the user, having designated the tier type as Amount, must also designate a currency. In this particular embodiment, the user is allowed to select a currency from a pull down menu activated by the selection of Amount as the tier type. Furthermore, since the user designated Unit Amount for adjustment type, both currency and UOM must also be designated. Once the user has designated the above parameters, an adjustment value may be calculated.

Figure 10:
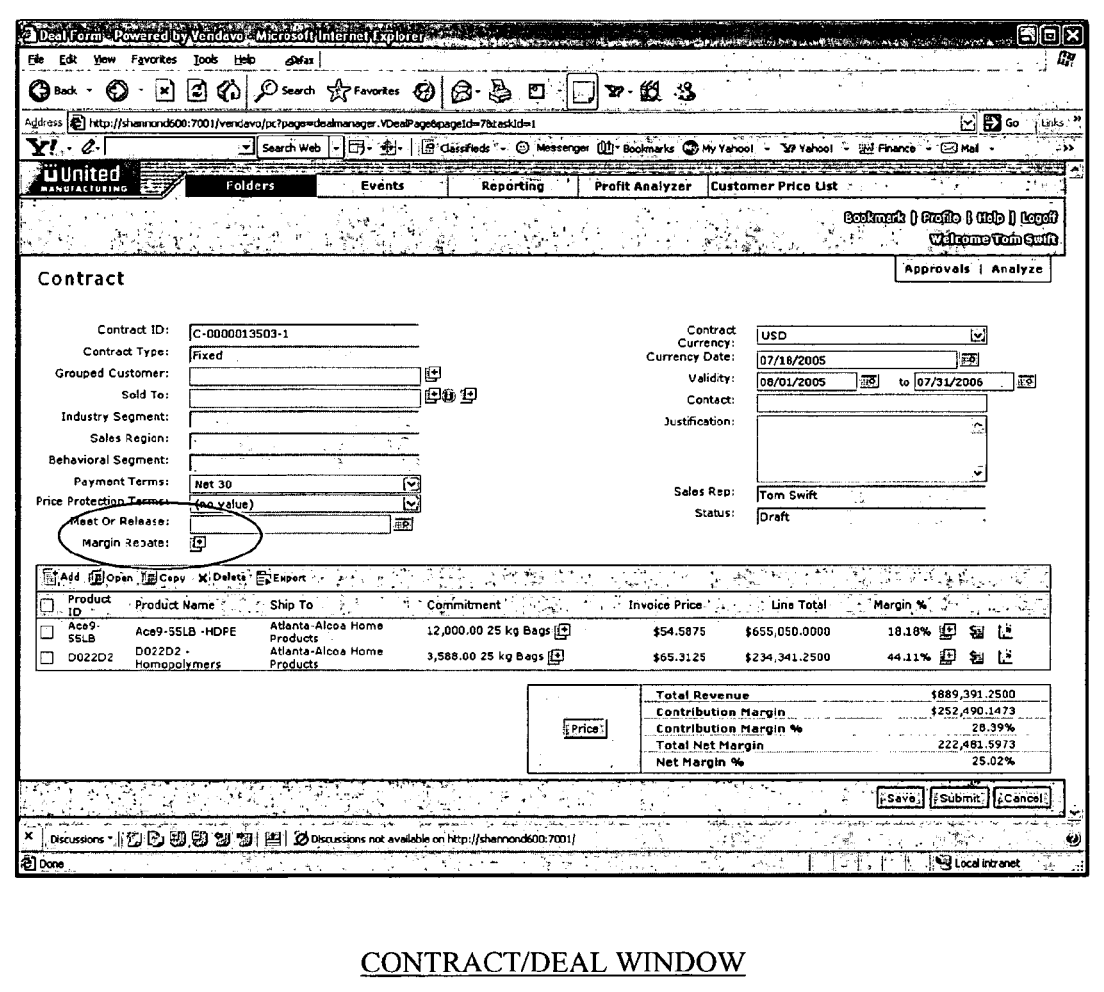

FIG. 10 shows a contract/deal window illustrating a user interface in accordance with an embodiment of the present invention. In this example, the user has the option of clicking on the margin rebate button in the highlighted area in order to bring up the pricing tier dialog window. Normally, this is done in the context of a deal-level tier-based pricing term and the margin applies to the entire deal.

Figure 11:
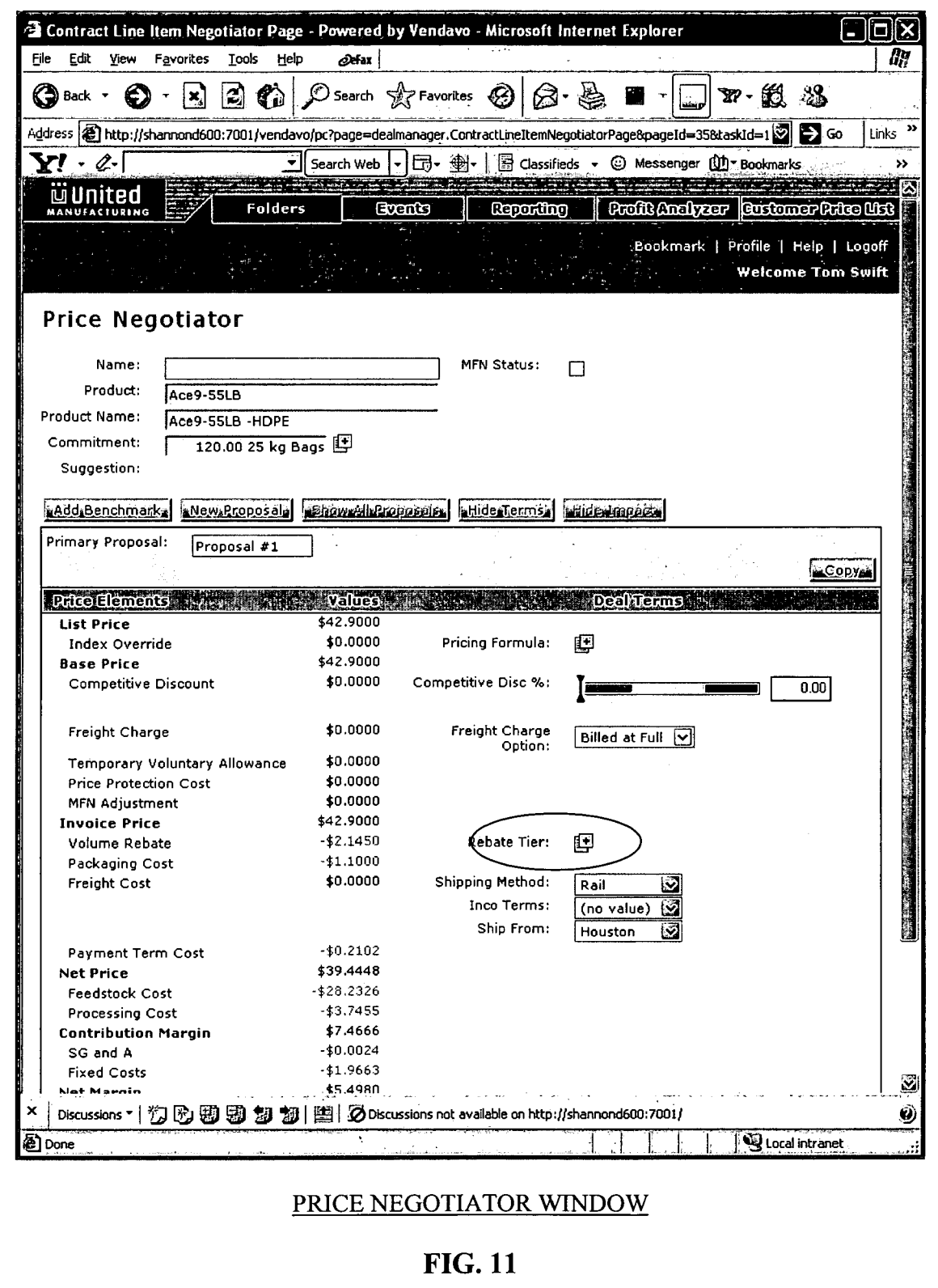

FIG. 11 shows a price negotiator window illustrating a user interface in accordance with an embodiment of the present invention. In this example, the user has the option of clicking on the rebate tier button in the highlighted area in order to bring up the pricing tier dialog window. Normally, this is done in the context of a line-item tier-based pricing term as a volume rebate adjustment.

Figure 12:
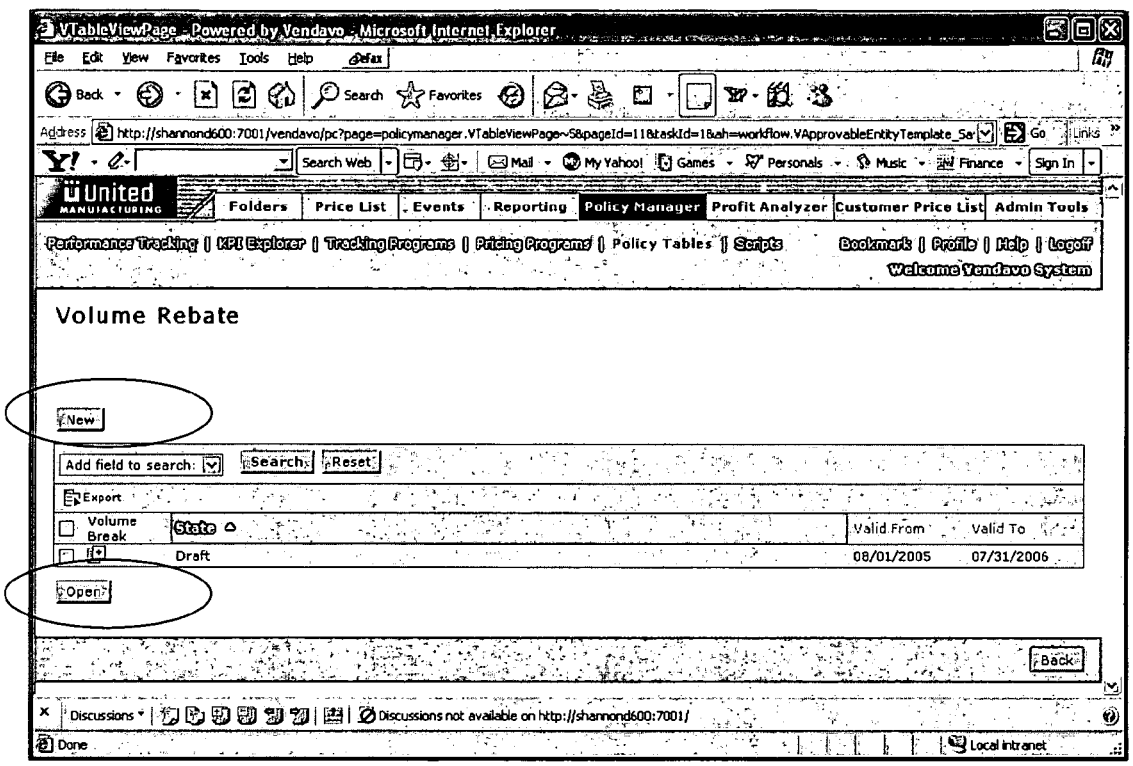

FIG. 12 shows a policy manager window illustrating a user interface in accordance with an embodiment of the present invention. Preferably, pricing tier terms are used within the volume rebate policy table included in the Policy Manager policy tables. The user may click on the New button or select a row in the table and click on Open to bring up the policy record details page.

Figure 13:
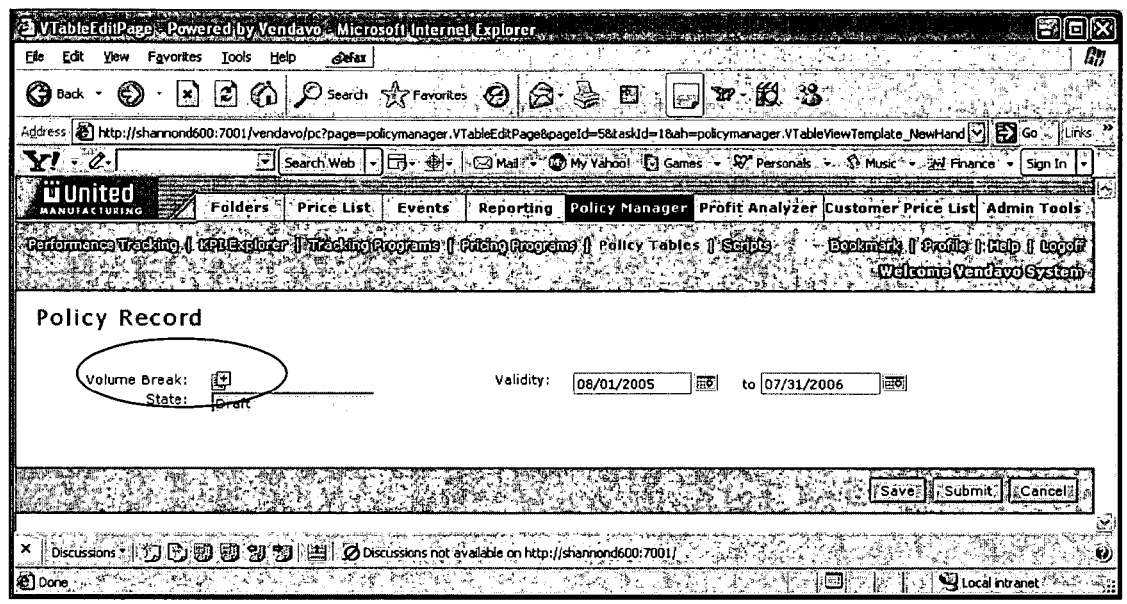

FIG. 13 shows a policy maker window illustrating a user interface in accordance with an embodiment of the present invention. In this example, the user has the option of clicking on the Volume Break button in the highlighted area in order to bring up the pricing tier dialog window.

The following table shows selected example combinations of input and output values that may be generated when utilizing the method of the present invention. This provides detailed examples to illustrate how pricing tier calculations are performed in accordance with an embodiment of the present invention. The table shows combinations of input and output value types that make sense for tier calculation. All comments refer to the following table, with the value of 2010 as the input for either Quantity, Amount or Percentage.

| Tier Type Quantity | Tier Type Amount | Tier Type Percentage | Adjustment Type Percent | Adjustment Type Money | Adjustment Type UnitAmount |
|---|---|---|---|---|---|
| >0 lb | >$0 | >0% | 3% | $3 | 3 cent/lb |
| >1000 lb | >$1000 | >1000% | 4% | $4 | 4 cent/lb |
| >2000 lb | >$2000 | >2000% | 5% | $5 | 5 cent/lb |

TABLE 1

| Calculation Type | Tier Type | Adjustment Type | Adjustment Value Type | Explanation |
|---|---|---|---|---|
| Point | Qty | Percent | Actual | Discount is 5% |
| Point | Qty | Percent | Incremental | Discount is 3% + 4% + 5% = 12% |
| Point | Qty | Money | Actual | Discount is $5 |
| Point | Qty | Money | Incremental | Discount is $3 + $4 + $5 = $12 |
| Point | Qty | UnitAmount | Actual | Discount is 5 cent/lb |
| Point | Qty | UnitAmount | Incremental | Discount is 3 cent/lb + 4 cent/lb + 5 cent/lb = 12 cent/lb |
| Point | Amount | Percent | Actual | Discount is 5% |
| Point | Amount | Percent | Incremental | Discount is 3% + 4% + 5% = 12% |
| Point | Amount | Money | Actual | Discount is $5 |
| Point | Amount | Money | Incremental | Discount is $3 + $4 + $5 = $12 |
| Point | Amount | UnitAmount | Actual | Discount is 5 cent/lb |
| Point | Amount | UnitAmount | Incremental | Discount is 3 cent/lb + 4 cent/lb + 5 cent/lb = 12 cent/lb |
| Point | Percentage | Percent | Actual | Discount is 5% |
| Point | Percentage | Percent | Incremental | Discount is 3% + 4% + 5% = 12% |
| Point | Percentage | Money | Actual | Discount is $5 |
| Point | Percentage | Money | Incremental | Discount is $3 + $4 + $5 = $12 |
| Point | Percentage | UnitAmount | Actual | Discount is 5 cent/lb |
| Point | Percentage | UnitAmount | Incremental | Discount is 3 cent/lb + 4 cent/lb + 5 cent/lb = 12 cent/lb |
| Range | Qty | Percent | Actual | For the 1$^{st}$ 1000 lb, give 3% discount. For the 2$^{nd}$ 1000 lb, give 4% discount. For the next 10 lb, give 5% discount. Discount total is 1000 lb * 3% + 1000 lb * 4% + 10 lb * 5% = 30 lb + 40 lb + .5 lb = 70.5 lb/ 2010 lb = 3.48% as the return discount value. |
| Range | Qty | Percent | Incremental | For the 1$^{st}$ 1000 lb, give 3% discount. For the 2$^{nd}$ 1000 lb, give 3% + 4% = 7% discount. For the next 10 lb, give 3% + 4% + 5% = 12% discount. Discount total is 1000 lb * 3% + 1000 lb * 7% + 10 lb * 12% = 30 lb + 70 lb + 1.2 lb = 101.2 lb/ 2010 lb = 5.03% as the return discount value |
| Range | Qty | Money | Actual | Invalid combination |
| Range | Qty | Money | Incremental | Invalid combination |
| Range | Qty | UnitAmount | Actual | For the 1$^{st}$ 1000 lb, give 3 cent/lb discount. For the 2$^{nd}$ 1000 lb, give 4 cent/lb discount. For the next 10 lb, give 5 cent/lb discount. Discount total is 1000 lb * 3 cent/lb + 1000 lb * 4 cent/lb + 10 lb * 5 cent/lb = $30 + $40 + $0.5 = $70.5/ 2010 lb = 3.48 cent/lb as the return discount value. |
| Range | Qty | UnitAmount | Incremental | For the 1$^{st}$ 1000 lb, give 3 cent/lb discount. For the 2$^{nd}$ 1000 lb, |

TABLE 1-continued

| Calculation Type | Tier Type | Adjustment Type | Adjustment Value Type | Explanation |
|---|---|---|---|---|
| | | | | give 3 cent/lb + 4 cent/lb = 7 cent/lb discount. For the next 10 lb, give 3 cent/lb + 4 cent/lb + 5 cent/lb = 12 cent/lb discount. Discount total is 1000 lb * 3 cent/lb + 1000 lb * 7 cent/lb + 10 lb * 12 cent/lb = 30 cent + 70 cent + 1.2 cent = 101.2 cent/ 2010 lb = 5.03 cent/lb as the return discount value |
| Range | Amount | Percent | Actual | For the $1^{st}$ $1000, give 3% discount. For the $2^{nd}$ $1000, give 4% discount. For the next $10, give 5% discount. Discount total is $1000 * 3% + $1000 * 4% + $10 * 5% = $30 + $40 + $0.5 = $70.5/ $2010 = 3.48% as the return discount value. |
| Range | Amount | Percent | Incremental | For the $1^{st}$ $1000, give 3% discount. For the $2^{nd}$ $1000, give 3% + 4% = 7% discount. For the next $10, give 3% + 4% + 5% = 12% discount. Discount total is $1000 * 3% + $1000 * 7% + $10 * 12% = $30 + $70 + $1.2 = $101.2/ $2010 = 5.03% as the return discount value |
| Range | Amount | Money | Actual | Invalid Combination |
| Range | Amount | Money | Incremental | Invalid Combination |
| Range | Amount | UnitAmount | Actual | Invalid Combination |
| Range | Amount | UnitAmount | Incremental | Invalid Combination |
| Range | Percentage | Percent | Actual | For the $1^{st}$ 1000%, give 3% discount. For the $2^{nd}$ 1000%, give 4% discount. For the next 10%, give 5% discount. Discount total is 1000% * 3% + 1000% * 4% + 10% * 5% = 30 + 40 + 0.5 = 70.5/ 2010 = 3.48% as the return discount value. NOTE: The calculation is done by treating the tier type Percentage value as a regular number without the percent sign |
| Range | Percentage | Percent | Incremental | For the $1^{st}$ 1000%, give 3% discount. For the $2^{nd}$ 1000%, give 3% + 4% = 7% discount. For the next 10%, give 3% + 4% + 5% = 12% discount. Discount total is 1000% * 3% + 1000% * 7% + 10% * 12% = 30 + 70 + 1.2 = 101.2/ 2010 = 5.03% as the return discount value NOTE: The calculation is done by treating the tier type Percentage value as a regular |

TABLE 1-continued

| Calculation Type | Tier Type | Adjustment Type | Adjustment Value Type | Explanation |
|---|---|---|---|---|
| | | | | number without the percent sign |
| Range | Percentage | Money | Actual | Invalid Combination |
| Range | Percentage | Money | Incremental | Invalid Combination |
| Range | Percentage | UnitAmount | Actual | Invalid Combination |
| Range | Percentage | UnitAmount | Incremental | Invalid Combination |

As can be seen from the above table, the method of the present invention allows the sales user to negotiate, capture and calculate pricing terms based on tiers. Depending upon the business objectives, the user may provide adjustments based on total purchase Quantity, total dollar or other currency value of the purchase, or net margin percentage.

Depending upon business structure and objectives, pricing tier parameters may be set at any stage throughout the life of a particular deal. Pre-set pricing tier policy can be set in place before the deal is negotiated. For example, a tiered set of margin discounts may be established as policy to affect deals globally. On the other hand, volume discounts may be either pre-set or entered on an ad hoc basis by the sales user as a line item.

MFN Features

Figure 14:
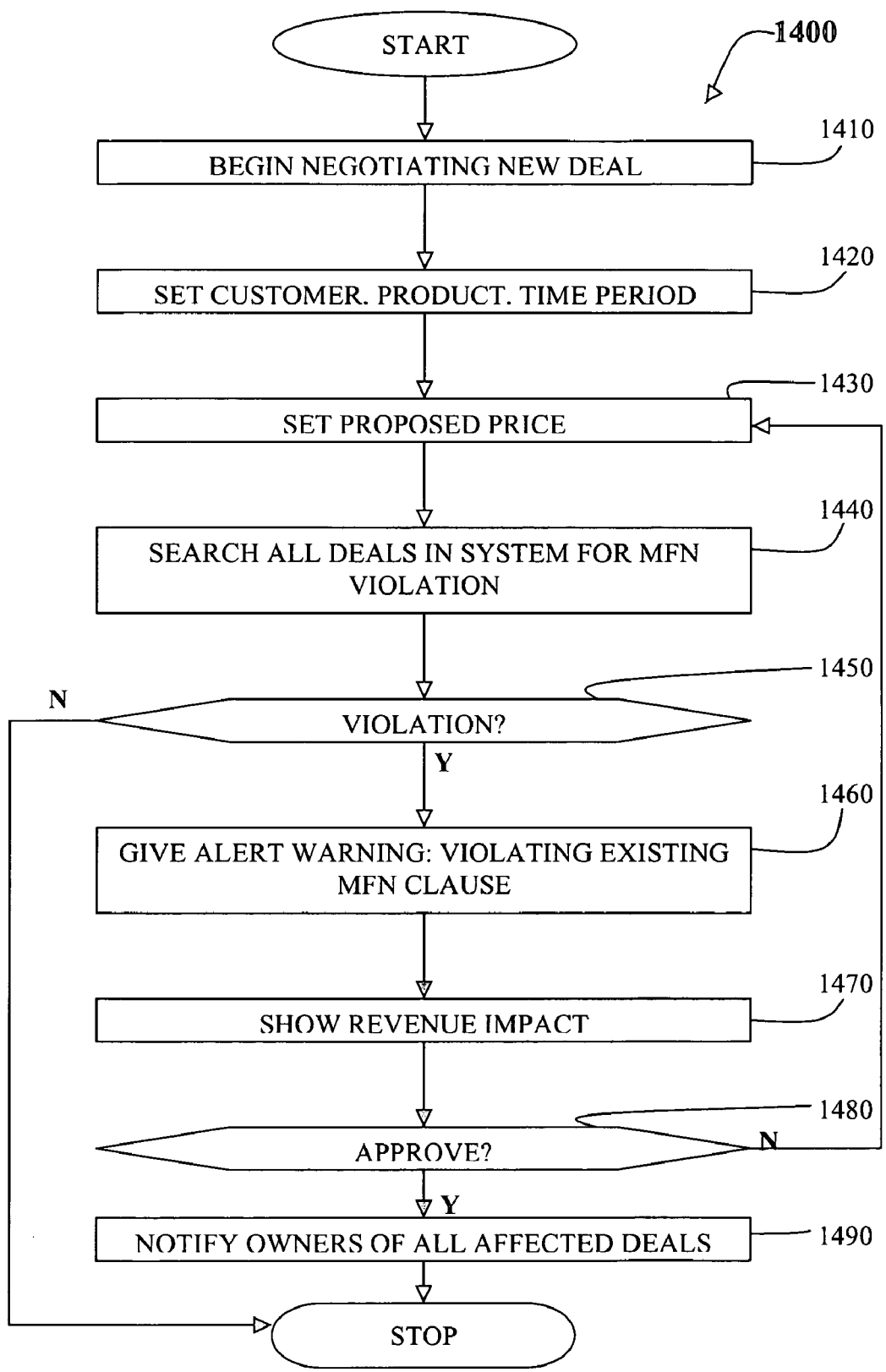
FIGS. 14 and 14A are flowcharts illustrating a process for calculating potential MFN impact in accordance with an embodiment of the invention.

FIG. 14 is a flowchart illustrating a process for calculating potential Most Favored Nation (MFN) impact for a proposed price in any new deal. MFN is a status accorded a product or set of products in a deal such that said product or set of products in said deal for a defined time period will be guaranteed to be priced at or below the lowest price for said same product or set of products in any other valid deal in said integrated price management system over the same time period. MFN allows a vendor to assure a customer that the negotiated price is, and will remain for the agreed time period, the lowest price offered by the vendor to any customer and, as such, the lowest price for said product or set of products in said price management system. Said lowest price is the MFN price.

FIG. 14 is a flowchart 1400 illustrating a process for calculating potential MFN impact for a given proposed price in any new deal in accordance with an embodiment of the present invention. Every time a new deal is reached, or an existing deal is revised, there is a potential MFN impact across all existing deals in the price management system having products or product sets with MFN status. For instance, as a new deal is being negotiated, or an existing deal is being revised, any proposed price for a product or set of products may trigger an automatic MFN adjustment in existing deals having the same products or product sets with MFN status in the system. In particular, if the proposed price is lower than the MFN price, it represents a potential MFN violation. If the proposed price for a particular product or product set is approved, thereby setting a new MFN price, all existing deals having the same product or product set with MFN status in the system must be revised so that said product or product set is priced at the new MFN price.

Referring again to FIG. 14, negotiations for a new deal begin in step 1410. The customer, product and time period for the new deal are set in step 1420. Once a proposed price is set in step 1430, all existing deals in the price management system are searched for potential MFN violations in step 1440. If a violation is not found at step 1450, the method ends and the new deal can be finalized. If, however, a violation is found at step 1450, the user is given an alert warning at step 1460 indicating violation of an existing MFN clause. The method then displays, at step 1470, the total revenue impact which would result from the proposed MFN violation. After the total revenue impact is displayed, the user may approve or disapprove of the proposed price in the new deal at step 1480. If the proposed new price is not approved, the method returns to step 1430 and a new price is proposed or negotiations end. If the proposed price is approved, owners of all affected deals are notified at step 1490 so that appropriate MFN adjustments can be made. The method guarantees that all products or product sets with MFN status in the system with continue to be priced at the lowest price offered in the system for the duration of the time period for which MFN status had been guaranteed. It also allows a user, while negotiating a new deal, to see the total revenue impact of any MFN violation resulting from a proposed price during the negotiation process.

Figure 14A:
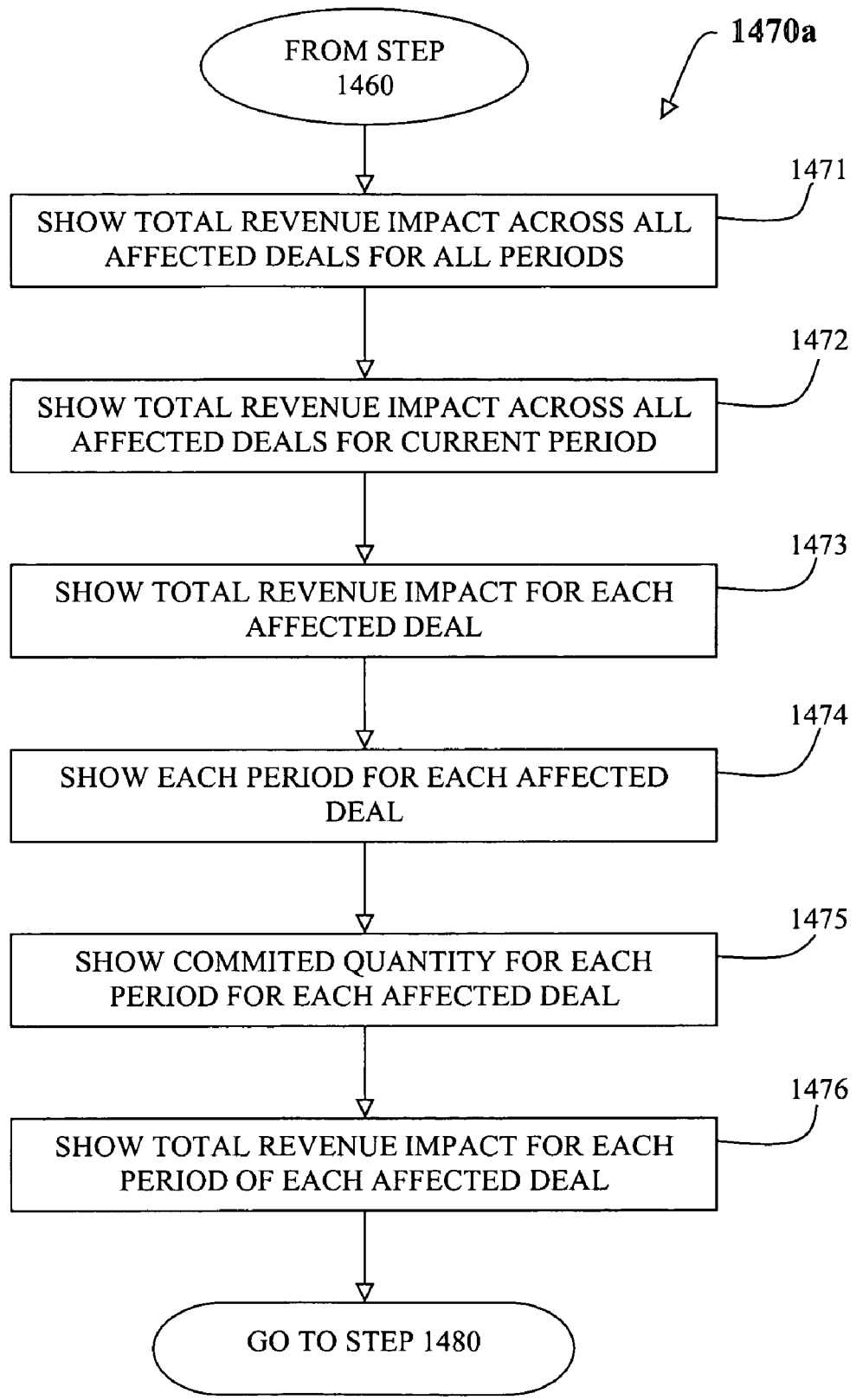

FIG. 14A is a flowchart 1470a which further illustrates step 1470 of FIG. 14, discussed above. Once an MFN violation alert is given, the user is shown, at step 1471, the total revenue impact, over the entire implicated time period, across all affected deals in the system. The user is also shown, at step 1472, the total revenue impact across all affected deals in the system for the current time period only. The method also displays, at step 1473, the total revenue impact for each affected deal individually. Each affected deal is further broken out, at step 1474, to display each implicated time period in each deal. The committed quantity of product for each implicated time period in each affected deal is displayed at step 1475, and the total revenue impact for each implicated time period in each affected deal is displayed at step 1476. In this manner, the method allows the user, during the negotiation process, to see with fine granularity the potential MFN impact of a proposed price, before offering said price to a potential buyer. This allows the user to make an informed decision in real time during negotiations.

The level of approval necessary for approving a MFN violation may vary according to business structure and objectives. Preferably, a sales manager must approve said violation. More preferably, said approval must go through a number of stages up to and including the executive committee.

Figure 15:
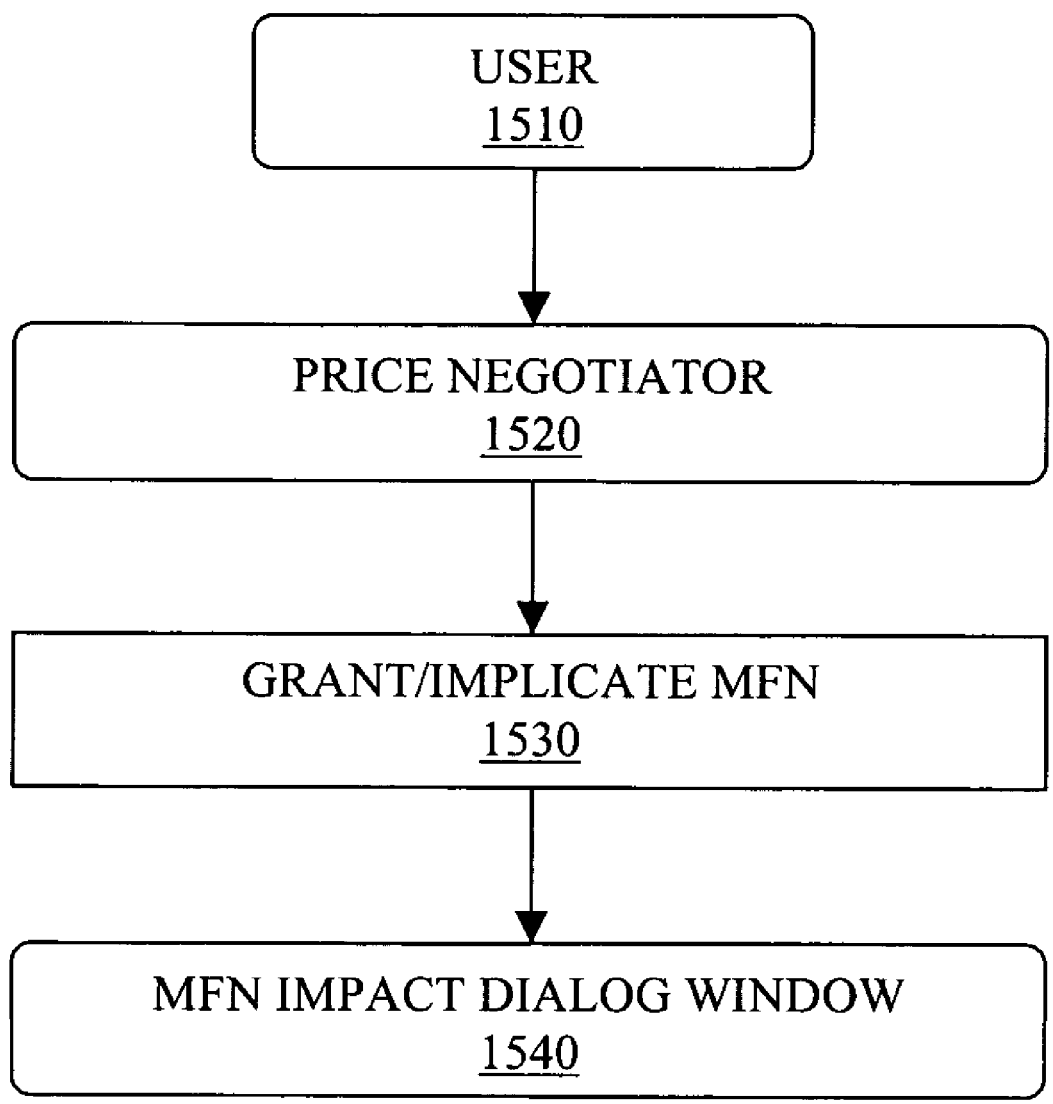
FIG. 15 is a simplified graphical representation of a path taken by a user in accessing MFN information within the price management system.

FIG. 15 is a simplified graphical representation of the path followed by a sales user when accessing an MFN dialog window in accordance with and embodiment of the present invention. Preferably, the user 1510 accesses the price negotiator 1520 in the course of negotiating a deal. If the user chooses to propose granting MFN status 1530, or implicate an existing MFN clause by offering a price lower that the current MFN price, the MFN impact dialog window 1540 is invoked. There, a user may analyze the impact of a MFN violation, as discussed above.

Figure 16:
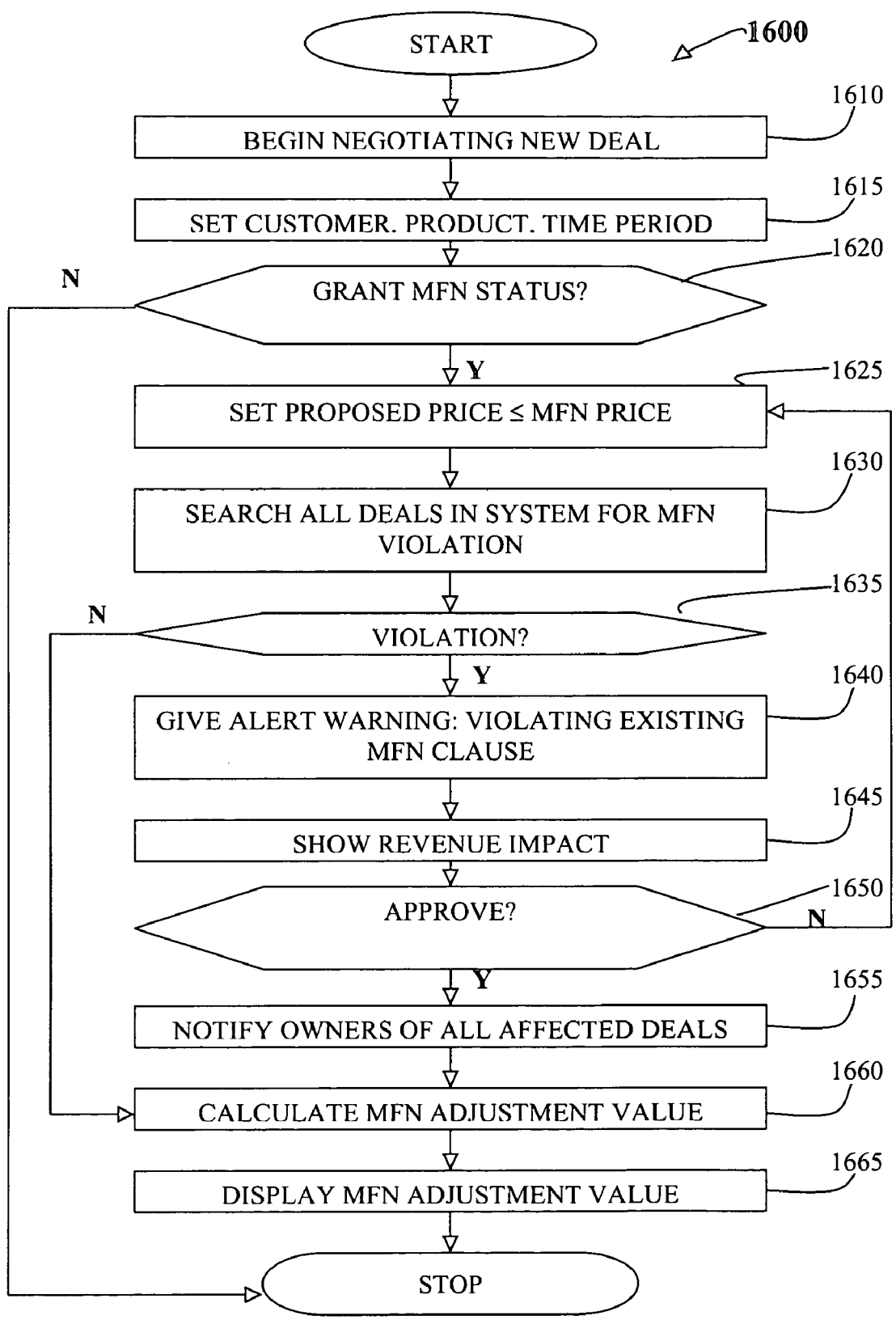
FIGS. 16 and 17 are flowcharts illustrating a process for calculating MFN adjustment value and MFN impact in accordance with an embodiment of the invention.

FIG. 16 is a flowchart 1600 illustrating a process for calculating an MFN adjustment value for a new deal in accordance with an embodiment of the present invention. Negotiations begin at step 1610. The customer, product and time period are set at step 1615. The user must then decide whether or not to grant MFN status for said product at step 1620. If the user chooses not to grant MFN status, the method ends. If, however, the user grants MFN status, the proposed price must be set at or below the current MFN price at step 1625. Once the proposed price is set, all existing deals in the price management system are searched for any MFN violation at step 1630. If the proposed price is set at the current MFN price, there is no MFN violation and the method goes to step 1660 discussed below. If, however, the proposed price is set below the current MFN price, a violation will be found at step 1635 and an MFN violation alert warning is given at step 1640. The revenue impact of the proposed MFN violation is displayed at step 1645. The details of the revenue impact are displayed as discussed above. The user must decide at step 1650 whether or not to approve the proposed price. If the proposed price is not approved, the method returns to step 1625 and a new price is proposed or negotiations end. If the proposed price is approved, the owners of all affected deals in the system are notified at step 1655 so that appropriate adjustments can be made. Next, the MFN adjustment value for the new deal is calculated at step 1660. The MFN adjustment value is the difference between the invoice price and the MFN price offered. The MFN adjustment value is displayed at step 1665.

Figure 17:
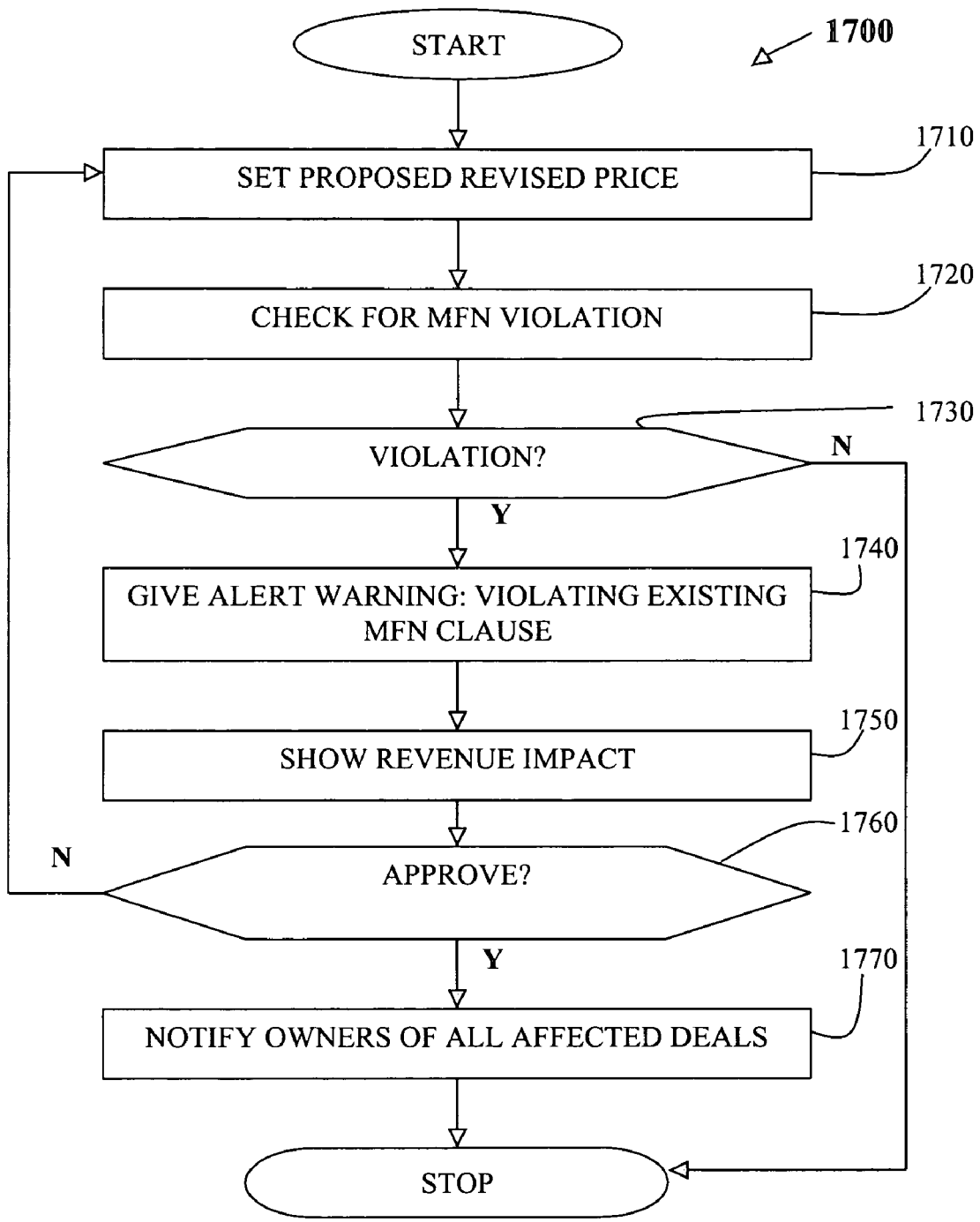

FIG. 17 is a flowchart 1700 illustrating a process for calculating the MFN impact of revised deals. A proposed revised price is set at step 1710. Once a proposed price is set in step 1710, all existing deals in the price management system are searched for potential MFN violations in step 1720. If a violation is not found at step 1730, the method ends and the deal can be revised. If, however, a violation is found at step 1730, the user is given an alert warning at step 640 indicating violation of an existing MFN clause. The method then displays, at step 1750, the total revenue impact which would result from the proposed MFN violation. After the total revenue impact is displayed, the user may approve or disapprove of the proposed revised price at step 1760. If the proposed new price is not approved, the method returns to step 1710 and a new revised price is proposed. If the proposed price is approved, owners of all affected deals are notified at step 1770 so that appropriate MFN adjustments can be made.

Preferably, all deals which are being revised or re-priced are checked for MFN violations.

Figure 18:
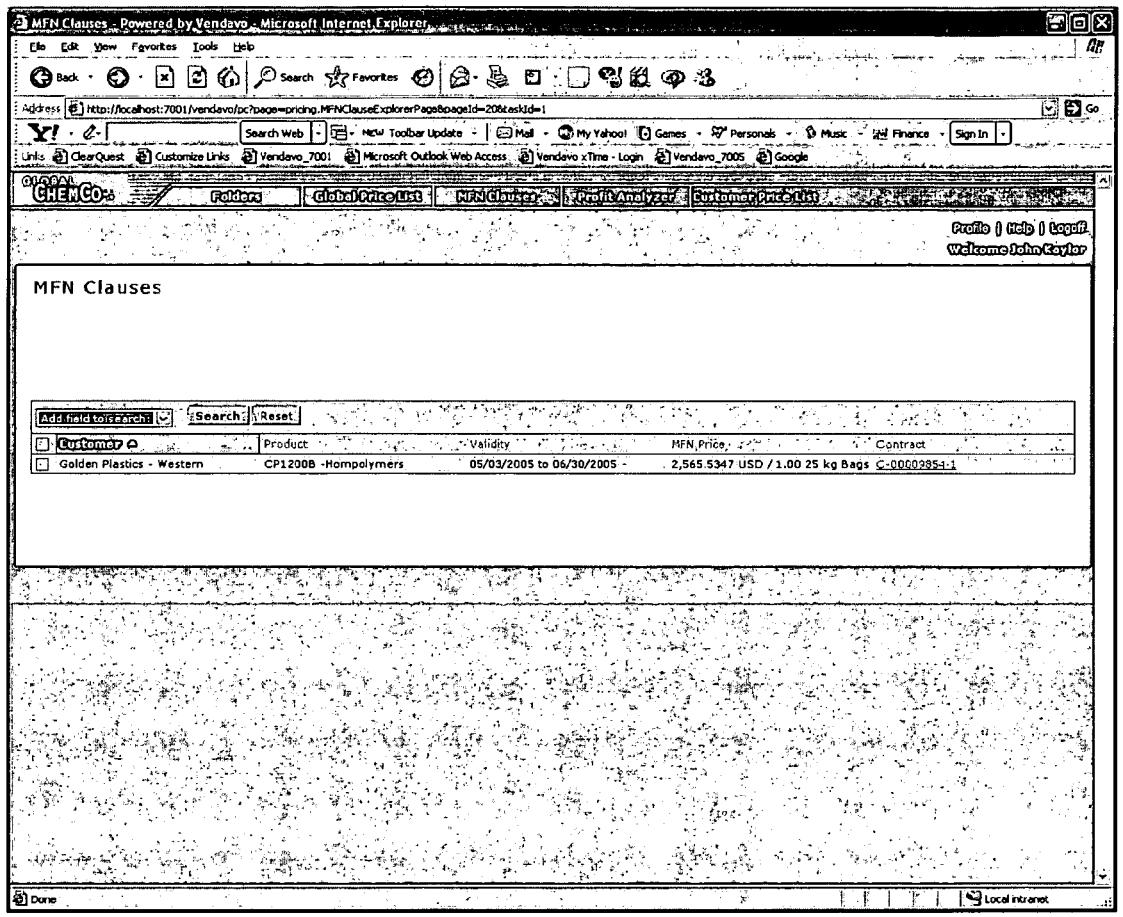

FIG. 18 shows a stored MFN information window illustrating a user interface in accordance with an embodiment of the present invention. The example user interface illustrates a window where the user can access all deals in the price management system which contain MFN clauses. The user may input pertinent information such as product, price and time period in order to retrieve only those deals affected by the proposed price.

Figure 19:
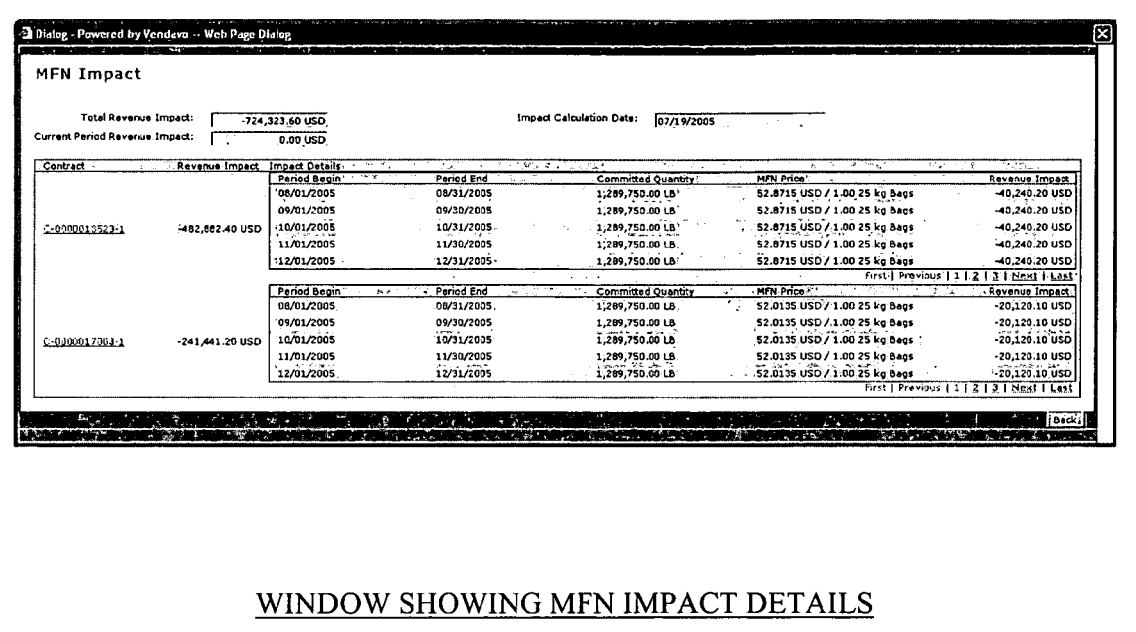

FIG. 19 shows an MFN impact window illustrating a user interface in accordance with an embodiment of the present invention. While negotiating a new deal using the Price Negotiator, the method allows the user to bring up a screen which displays the total MFN revenue impact of the proposed new deal. The revenue impact can be displayed, for example, in terms of overall impact; impact for the current period; total impact for each affected deal; impact for each period of each affected deal; and total impact by commitment period. In this way, the user may make a fully informed decision as to whether or not to approve of the proposed price in question. Of course, any impact beyond the current period is only potential impact. If, for example, buyer does not meet commitment volume, or future indexes change, there may be no MFN impact.

Index-Based Pricing

Figure 20:
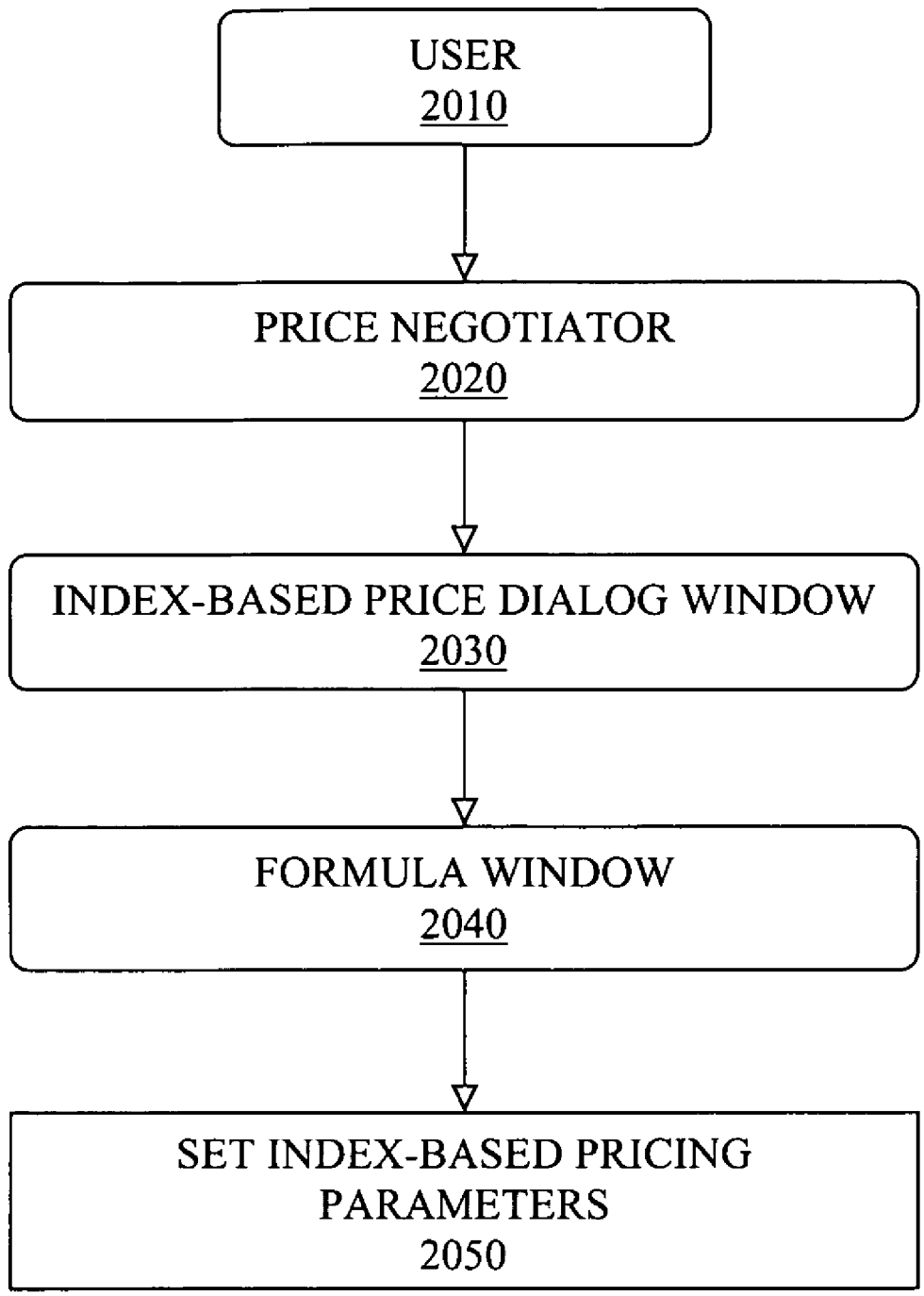
FIG. 20 is a simplified graphical representation of a path taken by a user when establishing index-based pricing terms within the price management system.

FIG. 20 is a simplified graphical representation of a path taken by a user to access index-based pricing dialog windows in accordance with an embodiment of the present invention. Preferably, a user 2010 accesses the price negotiator 2020 in the course of negotiating a deal. If appropriate, the user may access the index-based price dialog window 2040. The user may set various parameters for calculating an index-based price by bringing up the formula window 2040 wherein the user will be able to set index-based pricing parameters 2050.

Temporary Voluntary Allowance

A temporary voluntary allowance (TVA) is a time and volume limited discount on an existing product price. For example, a TVA may grant a discount in currency per unit volume for product purchased above a designated threshold volume. The TVA may be initially set up in a new deal, or may be incorporated as a revision into an existing deal. Preferably, the deal is structured to allow for multiple temporary voluntary allowances over the life of the contract.

It is often advantageous to offer a buyer a discount for purchasing additional product above some set baseline amount. A vendor may have excess inventory on hand with a limited shelf life. Often, moving a larger volume of product, even at a reduced margin, is beneficial to the vendor. The method of the instant invention allows a vendor to set temporary volume allowances on an ad hoc basis as determined by business objectives. The method allows the user to flexibly set desired TVA parameters and immediately see the fiscal impact application of the TVA will have over the life of the deal. In this way, the instant invention allows the user to make informed, timely business decisions regarding the efficacy of volume discount. In effect, the user sets an index on an ad hoc basis in response to business needs. Product above the selected threshold is priced using said as hoc index.

The user may input into the price management system desired parameters for the TVA as dictated by the particular deal. Preferably, the user will set a time limit (effective from-effective to); a maximum volume subject to the temporary allowance; and a TVA Amount which defines the discount in terms of price per unit of measure.

Figure 21:
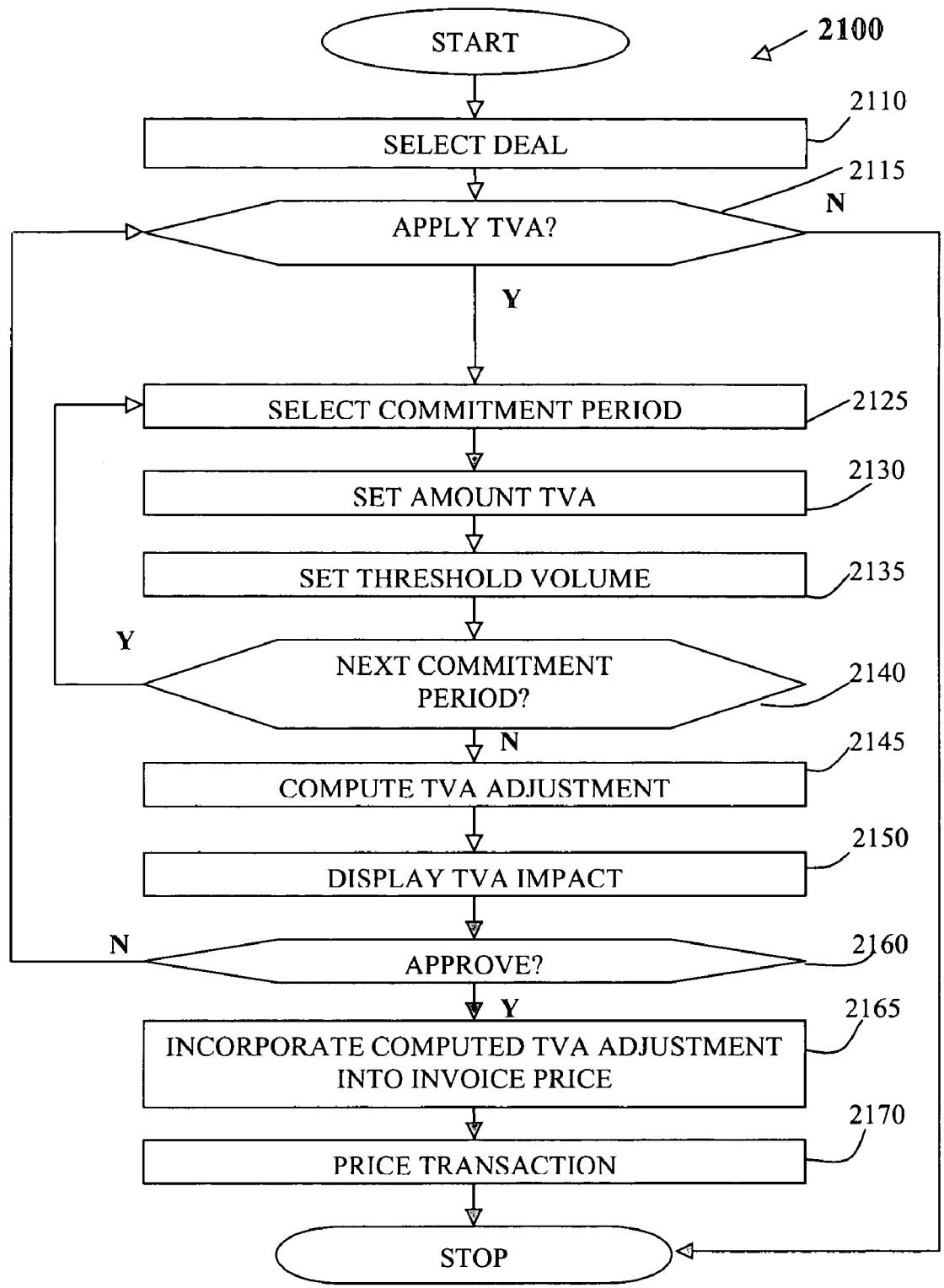
FIGS. 21 and 21A are flowcharts illustrating a process for making a temporary voluntary allowance in accordance with an embodiment of the invention.

FIG. 21 is a flowchart 2100 illustrating a process for making a temporary voluntary allowance in a deal in accordance with an embodiment of the present invention. The process, within the context of the integrated price management system, enables the user to include a TVA in any deal in the system. The user may advantageously define the parameters of the TVA so as to meet the specific business objectives of the particular deal.

Referring again to FIG. 21, at step 2110, the user selects a new or existing deal. The user must choose whether to include or add a TVA to the selected deal at step 2115. If the user chooses not to include a TVA in the deal, the method ends. If the user chooses to include a TVA, the user may choose the commitment periods for which the TVA will be effective at step 2125. The user may also set the TVA Amount at step 2130. TVA Amount defines the discount in terms of price per unit of measure. For instance, for a product sold by the pound using the dollar as the exchange currency, a TVA Amount could be set in terms of $/lb or ¢/lb. In particular, a user may set a TVA discount of 2¢/lb. The user may then set a TVA Volume at step 2135. The TVA volume represents a threshold volume above which the TVA discount applies. The user may then decide whether to set a TVA for the next commitment period at step 2140. Once all TVAs are set, the method then computes TVA adjustment at step 2145. The TVA adjustment is the total amount of discount granted given the parameters set out above and the actual commitment volume of the deal.

This TVA adjustment value is displayed at step 2150. Various aspects of the impact of including the TVA in the deal are displayed and are discussed in further detail below. The user may use the information displayed to make an informed business decision as to whether or not to grant the TVA at step 2160. If, based on this information, the user chooses not to approve the deal with the TVA as defined, the method returns to step 2115 allowing the user to set new TVA parameters. Iterations of the above process continue until the user either approves of the specified TVA or chooses not to include a TVA in the deal. If the user chooses not to include a TVA, the method is terminated. Once the user approves of a specified TVA, the computed TVA Adjustment is incorporated into the invoice price at step 2165. The transaction may then be priced at step 2170 wherein the TVA Adjustment is included.

Figure 21A:
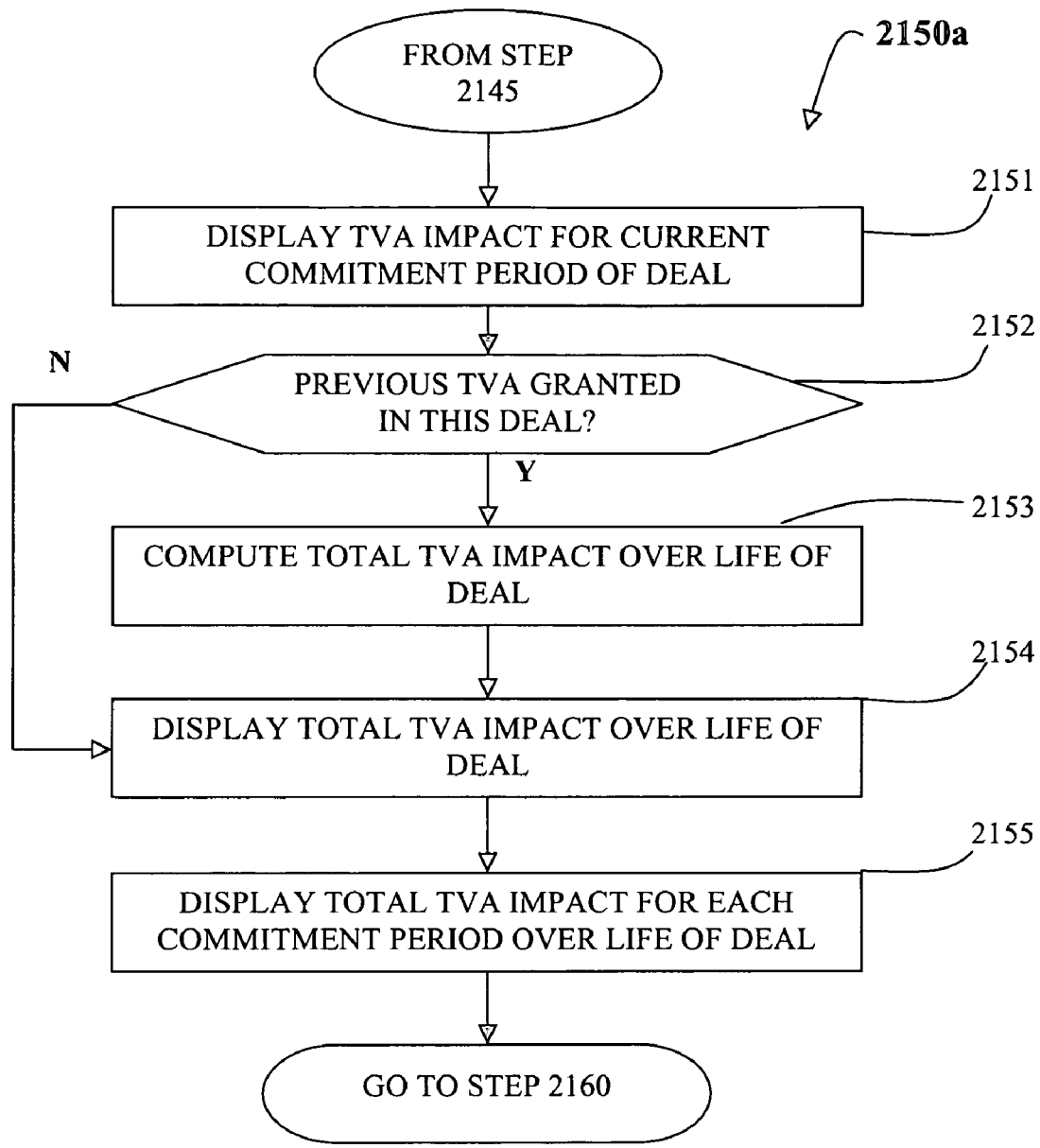

FIG. 21A is a flowchart 2150*a* illustrating a process for computing and displaying various aspects of the impact of including a TVA in a deal in accordance with an embodiment of the present invention. Once the TVA parameters, such as Volume, Amount and time limit, are set, the method displays the impact of applying the TVA adjustment to the deal for the set time period at step 2151. The method then determines whether a previous TVA had been granted in the deal at step 2152. With this information, the method computes the total TVA impact over the life of the deal at step 2153. The method then displays the total TVA impact over the life of the deal at step 2154, and breaks out the total TVA impact for each commitment period over the life of the deal at step 2155.

Index Pricing

Indexes, which are generally known in the art, have been employed in a variety of manners. Stock markets, for example, often use indexes as a gauge of general market condition. Other indexes measure the movement in national and international prices for commodities and other items of trade. For instance, in the chemical industry, well known periodic indexes are used to establish the index price of various bulk chemicals. Said indexes may be published on a daily, weekly, monthly, quarterly or annual basis.

Given the potential volatility in the future price of a particular commodity, it is often to the advantage of both buyer and seller to tie the price of a particular product to an agreed upon index or indexes. The customer's choice of indexes will vary depending upon industry segment for which they buy, the region where they are located, as well as the major commodity categories they buy in volume quantities. Customers must focus upon commodity-specific questions pertaining to product delivery speeds (leadtimes) and price trend expectations.

An index publication determines marketplace transaction prices based on data collected via surveys and interviews with buyers, sellers, distributors, other market insiders, and through data-collection arrangements with other news-analysis agencies and research groups.

Index prices do not necessarily represent levels at which transactions have actually occurred. They are designed to show monthly spot market purchase order averages and are intended primarily to indicate month-to-month trends. Specific prices any buyer pays will vary widely depending on volume, market factors, distribution issues, specification variances, surcharges, packaging fees and other factors.

Price index numbers measure relative price changes from one time period to another. They are so widely used that discussions related to index numbers in contract pricing normally refers to price indexes. However, other index numbers could be used in contract pricing, particularly indexes that measure productivity.

Simple index numbers calculate price changes for a single item over time. Index numbers are more accurate if they are constructed using actual prices paid for a single commodity, product or service rather than the more general aggregated index.

Aggregate index numbers calculate price changes for a group of related items over time. Aggregate indexes permit analysis of price changes for the group of related products, such as price changes for apples, oranges, plywood, or nails. An example of an aggregate price index is the Producer Price Index (Bureau of Labor Statistics) that provides information the changes in the wholesale price of products sold in the United States over a given period of time.

Data sources used in formulating indexes include:
Bureau of Labor Statistics;
Other Government agencies;
Government contracting organizations;
Commercial forecasting firms;
Industry or trade publications; and
Newspapers.

Indexes are often published in a manner which gives one the ability to choose a particular index position from various positions offered for the same time period. For instance, over a given three month period, an index may report a high, middle and low index position. There may also be reported a three month rolling average. Any or all of these indexes may be utilized by a sales force as dictated by business policies and objectives in accordance with the present invention.

The method of the instant invention allows the user to advantageously incorporate desired indexes into the pricing process within the context of the integrated price management system. The user is able to choose the index or combination of indexes which integrate best with the user's overall business objectives. The user chooses the index and the selected reference period. The user may also select the index position for the selected index. The present method allows the user to combine all of the index data through a user defined formula to calculate an index-based price.

Figure 22:
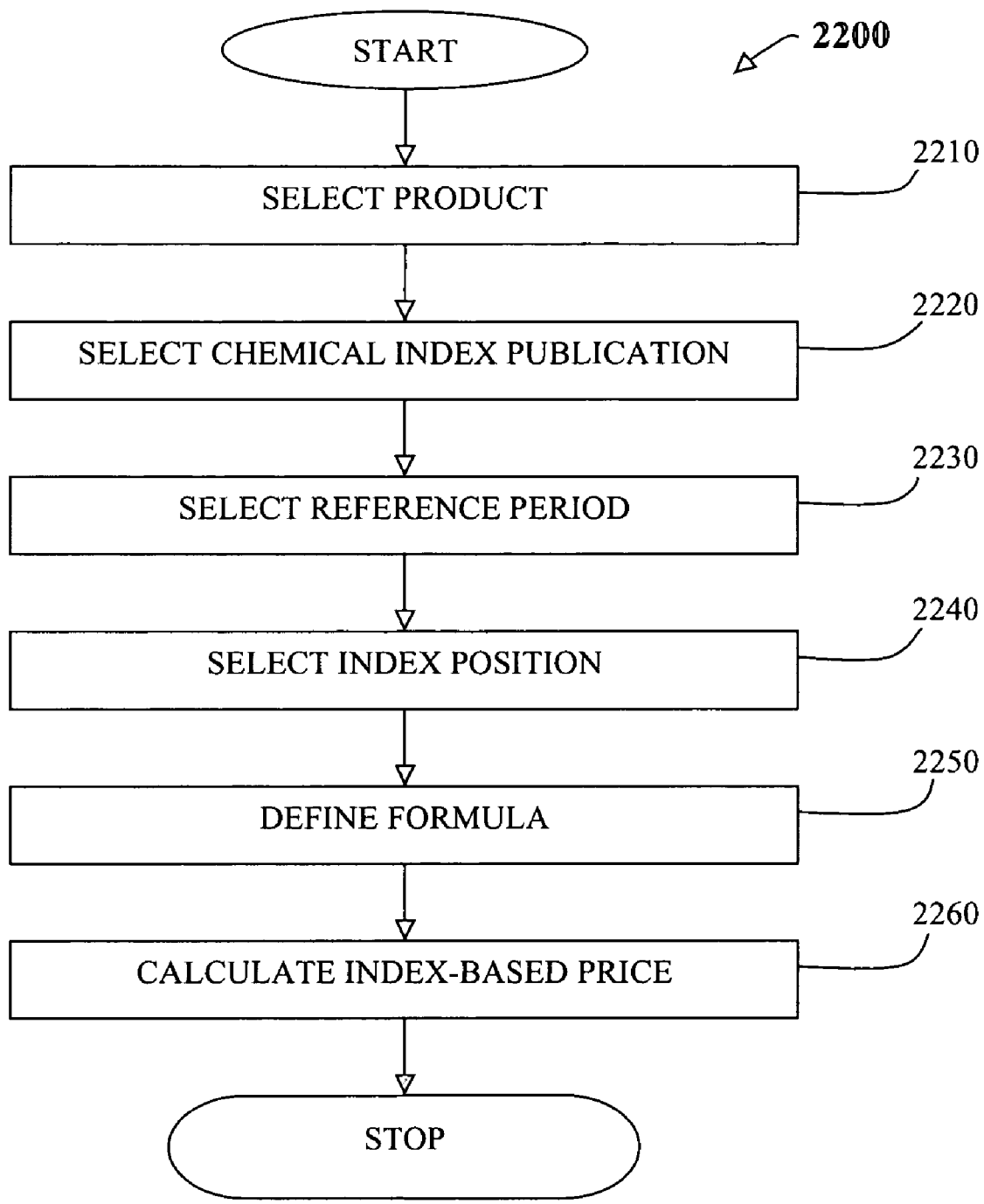
FIGS. 22 and 22A are flowcharts illustrating a process for calculating a chemical index-based price in accordance with an embodiment of the invention.

FIG. 22 is a flowchart 2200 illustrating a process for calculating an index-based price in accordance with an embodiment of the present invention. The flowchart 2200 shows, as an example, a process for calculating an index-based price using a chemical index publication. At step 2210, the user selects a product to be priced. The user then selects the desired chemical index publication upon which to base the price calculation at step 2220. The user may also select the reference period at step 2230. For example, the user may choose to base the index-based price calculation on the three month rolling average of the chosen index. The user may also select an index position at step 2240. Indexes afford the user the ability to choose a price position within the index depending upon user preferences. For example, over a chosen time period, an index may have a high price, an average price, and a low price. The user may select which price position within the chosen index should be used to calculate the index-based price. The user then defines a formula at step 2250. The formula makes use of the selected index information to calculate the index based price at step 2260. The user may define the formula by advantageously setting the index offsets and choosing the proper weighting for each chosen index. The process of defining the index-based formula is discussed in more detail below.

Figure 22A:
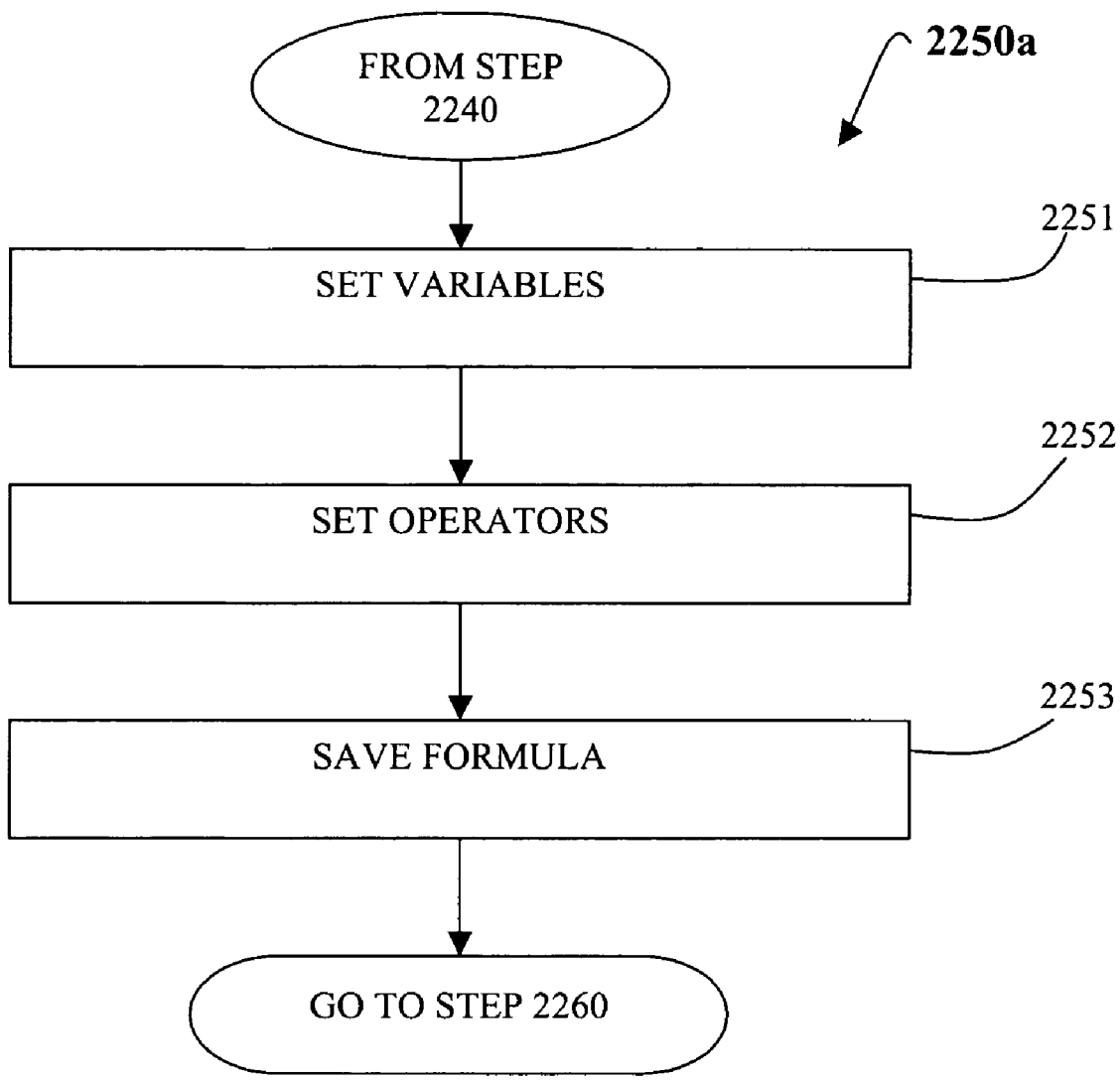

FIG. 22A is further illustrative of step 2250 discussed above. In particular, FIG. 22A is a flowchart 2250*a* illustrating a process for defining a formula for calculating an index-based price in accordance with an embodiment of the present invention. Once the user has selected a product, an appropriate index publication, a reference period, and an index position during said selected period, the user may define a formula to calculate an index price. The method plugs the above chosen parameters into the user defined formula to calculate the index price. In this way, the user may flexibly define both the parameters and the formula used to calculate the index-based price. In accordance with the method of the present invention, the user may, in real time, access and manipulate index price information to develop a pricing strategy that best suits the user's business objectives.

Referring again to FIG. 22A, once the user has defined the most advantageous index-price parameters, the user may define a formula to calculate an index-based price. The user sets variables at step 2251. The variables may include, for example, an offset adjustment from the chosen index. For instance, the user may set variables such that the price used in the index-based price calculation is equal to the chosen index price plus or minus an offset adjustment value. The user may also set operators to be used in the calculation of the index-based price at step 2252. Operators may be defined to give appropriate weight to each of the chosen indexes in the actual calculation. For instance, the selected product may consist of a number of component raw materials. Each raw material may have an individual commodity index price. Each component price may be assigned a weighted percentage factor to be used in the calculation of the product's index-based price. For instance, a component whose price is particularly volatile, or a component which makes up a large percentage of the product, may be given more or less weight in the calculation of the product index-based price depending upon businesses objectives. Once a formula is defined, it may be saved at step 2253. The method then returns to step 2260 in FIG. 22 where the index-based price is calculated.

Figure 23:
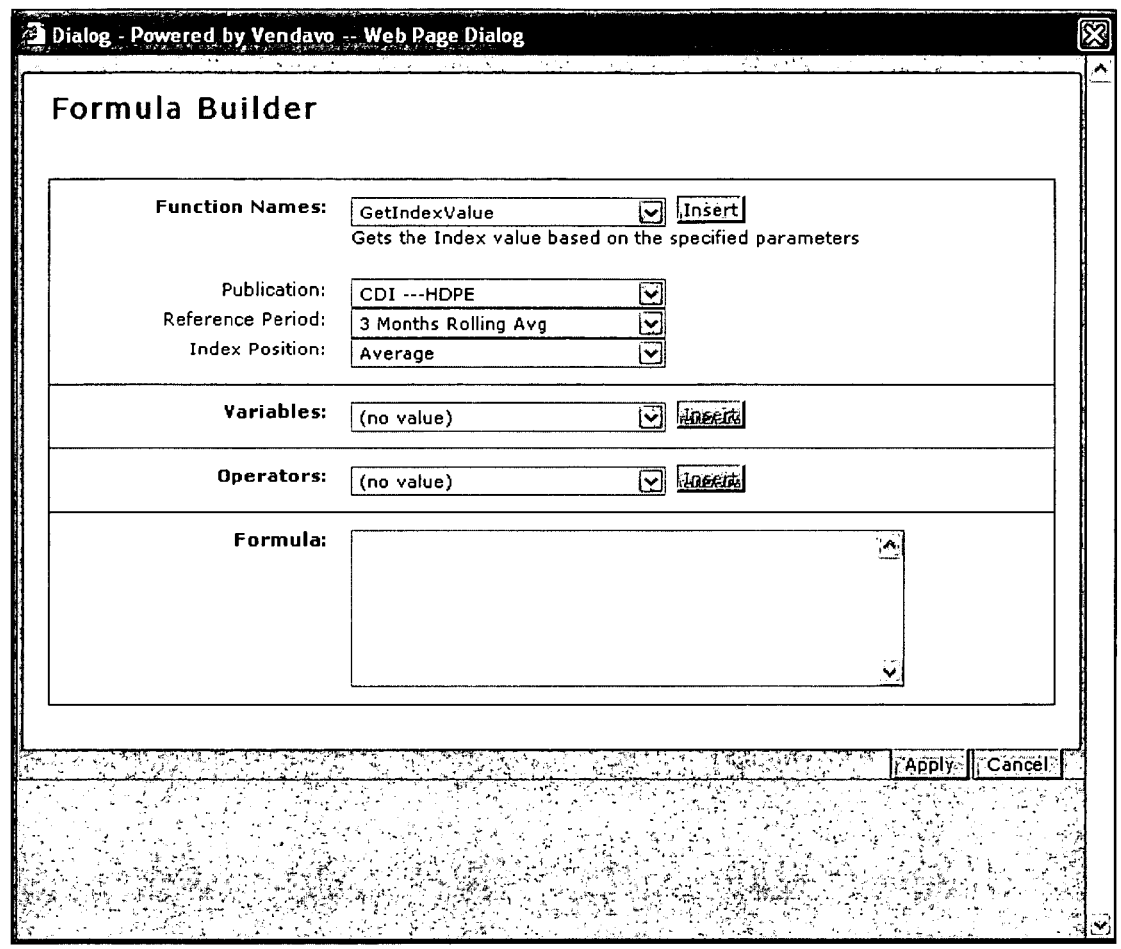
FIGS. 23 and 24 are index-based pricing related windows illustrating sample user interfaces in accordance with an embodiment of the invention.

FIG. 23 shows an index-based formula window illustrating a user interface in accordance with an embodiment of the present invention. The user may select the parameters to be used in calculating an index-based price as discussed above. In particular, the user chooses a useful function name into which chosen parameters are plugged. The user sets the parameters to be used in the calculation. For instance, the user chooses the index publication to be used for calculating the index-based price. The user may also select a reference period used to define the time window from which the index price is taken. The user may also define an index position within said reference period whereby a high, low or average index price over the defined time window is selected.

The user utilizes the parameters selected above in a user-defined formula to calculate the index-based price. In building the formula, the user may define both variables and operators so as to achieve the desired index-based price in accordance with business objectives. As noted above, variables may be used to define an offset adjustment to give an adjusted price above, below or equal to the selected index price. Operators may be used to select the appropriate weight to be assigned to each said adjusted price in the calculation of the index-based price. Any combination of indexes, variables and operators may be used to create the desired formula.

Figure 24:
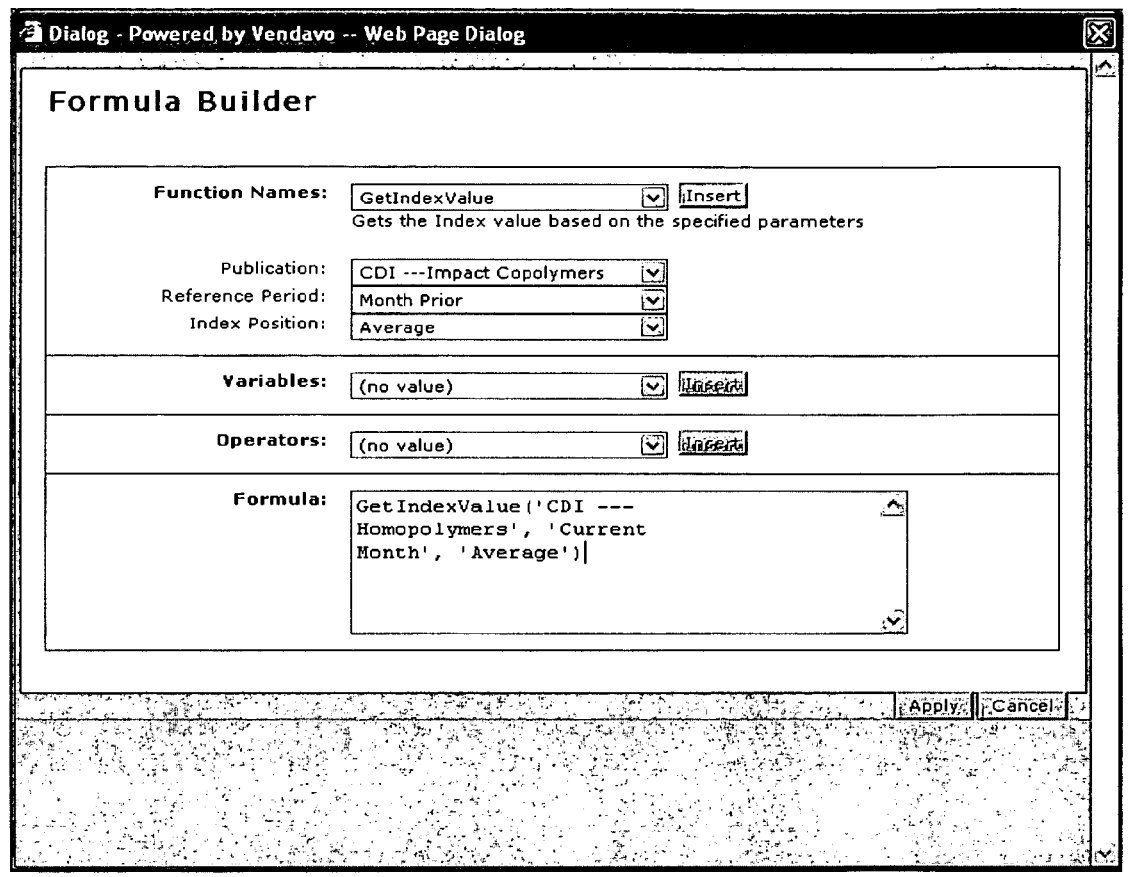

FIG. 24 shows an index-based formula window illustrating a user interface wherein an index-based formula has been selected in accordance with an embodiment of the present invention. The user sets the formula name, index parameters, variables and operators as discussed above. Once the above parameters have been selected, the method creates a formula used to calculate an index-based price.

BOM-Based Index Pricing

Figure 25:
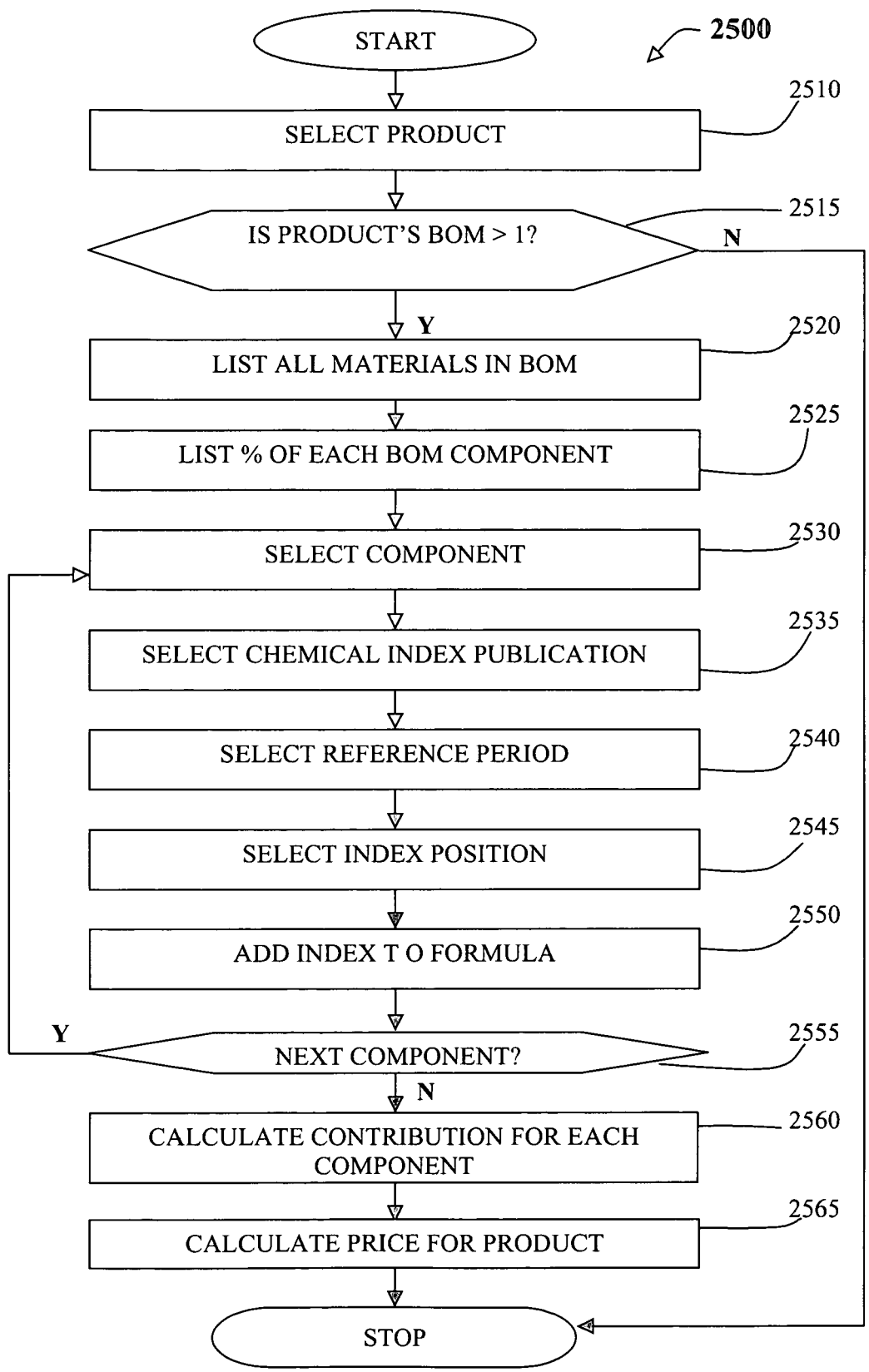
FIG. 25 is a flowchart illustrating a process for calculating an index-based price with BOM in accordance with an embodiment of the invention.

FIG. 25 is a flowchart 2500 illustrating a process for calculating an index-based price wherein the selected product may be made up of a defined bill of materials (BOM) in accordance with an embodiment of the present invention. The flowchart 2500 shows, as an example, a process for calculating an index-based using a chemical index publication. At step 2510, the user selects a product to be priced wherein said product may be made up of a set of components which make up the product's BOM. The method then determines if the product's BOM is greater than one at step 2515. A BOM greater than one indicates that the product is made up of more than one component. If the BOM is not greater than one, the method ends. If the BOM is greater than one, the method lists all components in the BOM at step 2520. The percentage of each component in the product is listed at step 2525. The user then selects a component from the BOM list at step 2530. A suitable chemical index publication is selected at step 2535. The user sets the desired reference period from which to take the index price at step 2540. An index position is selected at step 2545. The user may then add said index parameters to a formula at step 2550 which may be used to calculate an index-based price for the product at step 2565. The user may set variables and operators to be used in the formula as discussed above. Once a component index has been added to said formula, the user may decide to add another component at step 2555. Once all components have been added, the user may calculate the contribution to the product price of each component at step 2560. Once the user indicates that all desired component index-based prices have been calculated, the method calculates the index-based price for the product at step 2565.

In a preferred embodiment, the user selects a product to be priced wherein said product may be made up of a set of components which make up the product's BOM. The method then determines if the product's BOM is greater than one. If the BOM is greater than one, the method lists all components in the BOM. The percentage of each component in the product is also listed. The user then selects a component from the BOM list. A suitable chemical index publication is selected. The user sets the desired reference period from which to take the index price. An index position of high, low or average price is then selected. At this point, all of the necessary parameters for the component have been set. Once a component's parameters have been set, the user may indicate whether a subsequent component's parameters are to be set. If so, the method returns to begin the next iteration of setting component parameters. Once the user indicates that all desired component parameters have been set, the user may define a formula to calculate an index-based price for the selected product. The user may set variables and operators to be used in the formula as discussed above. The formula is then used to calculate the index-based price for the selected product.

The method allows the user to structure the index-based price calculation flexibly, as dictated by business needs. For instance, a formula may be defined for each component and used to calculate an individual index-based price for each. Said individual index-based prices may then be used to calculate an overall index-based price for the selected product as discussed above. In another embodiment, said individual index-based prices may be plugged into a final formula defined to use said individual index-based prices to calculate the overall index-based price for the selected product. In yet another embodiment, parameters for each component are set and a single formula is defined by the user to calculate an index-based price for the selected product using said parameters. Advantageously, the user may use any combination of individually calculated index-based component prices and selected component parameters to be plugged into a user defined formula for calculating the overall index-based price of the selected product.

Figure 26:
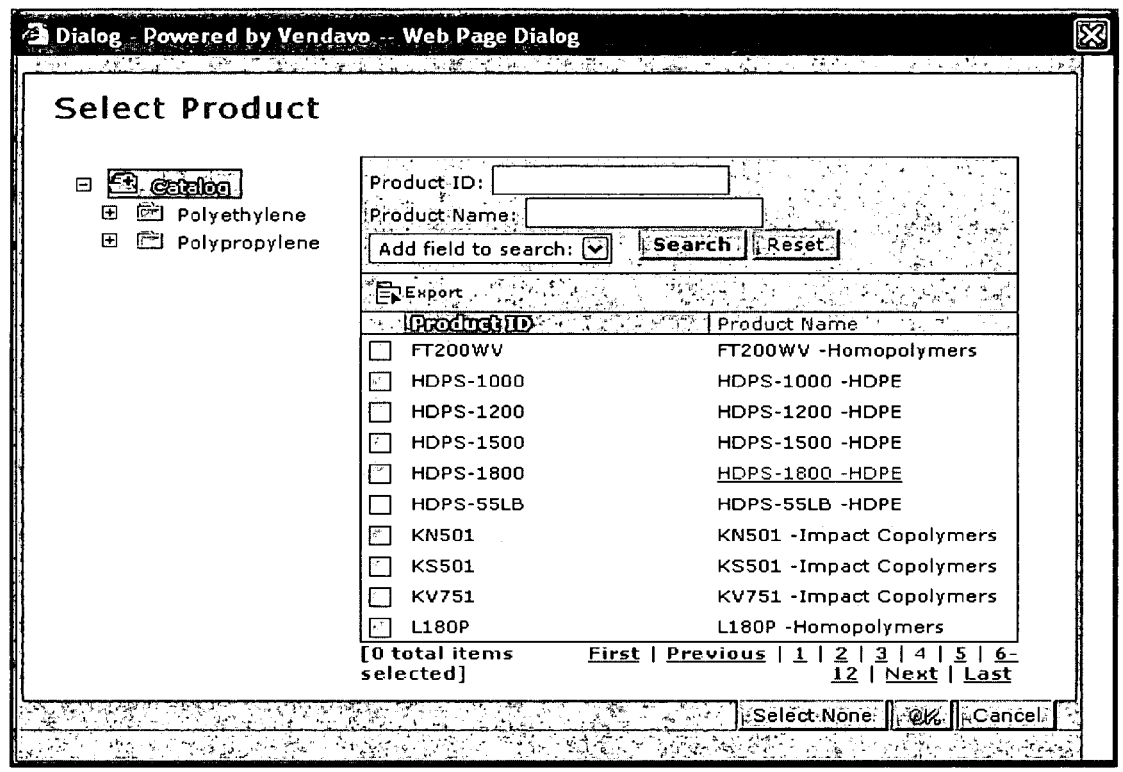

FIG. 26 shows a product selection window illustrating a user interface in accordance with an embodiment of the present invention. The user may select a catalog to display a list of related products. Products with a BOM with more than one component are indicated by a highlighted product name. By clicking on the highlighted product name, the user can bring up a screen showing the product BOM.

Figure 27:
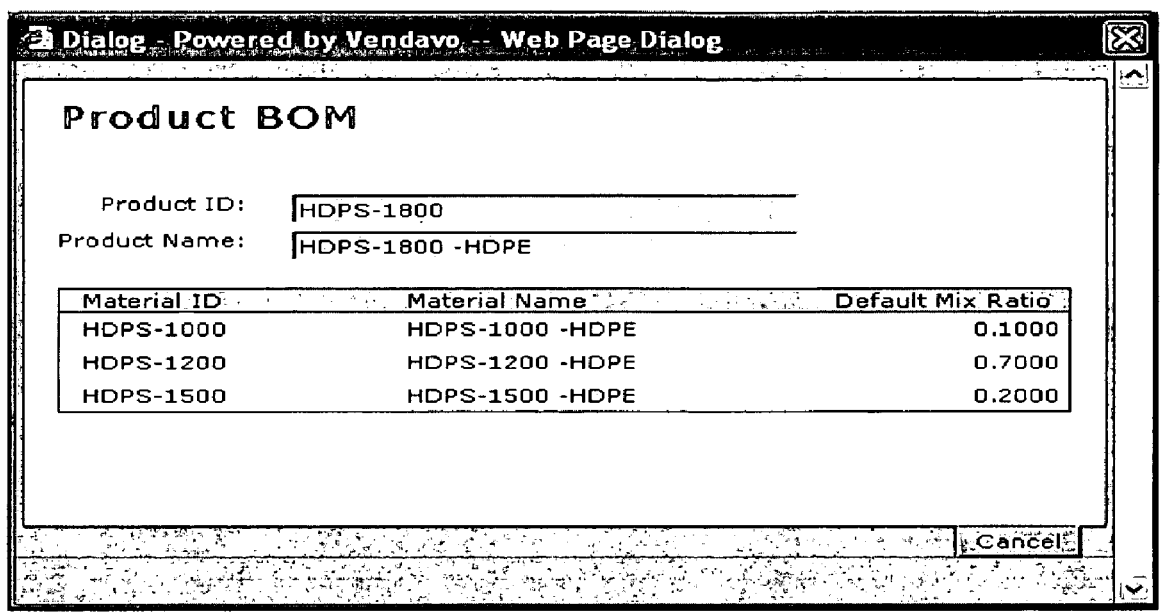

FIG. 27 shows a product BOM window illustrating a user interface wherein a selected product's BOM is displayed in accordance with an embodiment of the present invention. The product ID and product name are displayed above the listing of the product BOM. The product BOM listing contains each component's name and the default mix ratio of the amount of each component in the product.

Figure 28:
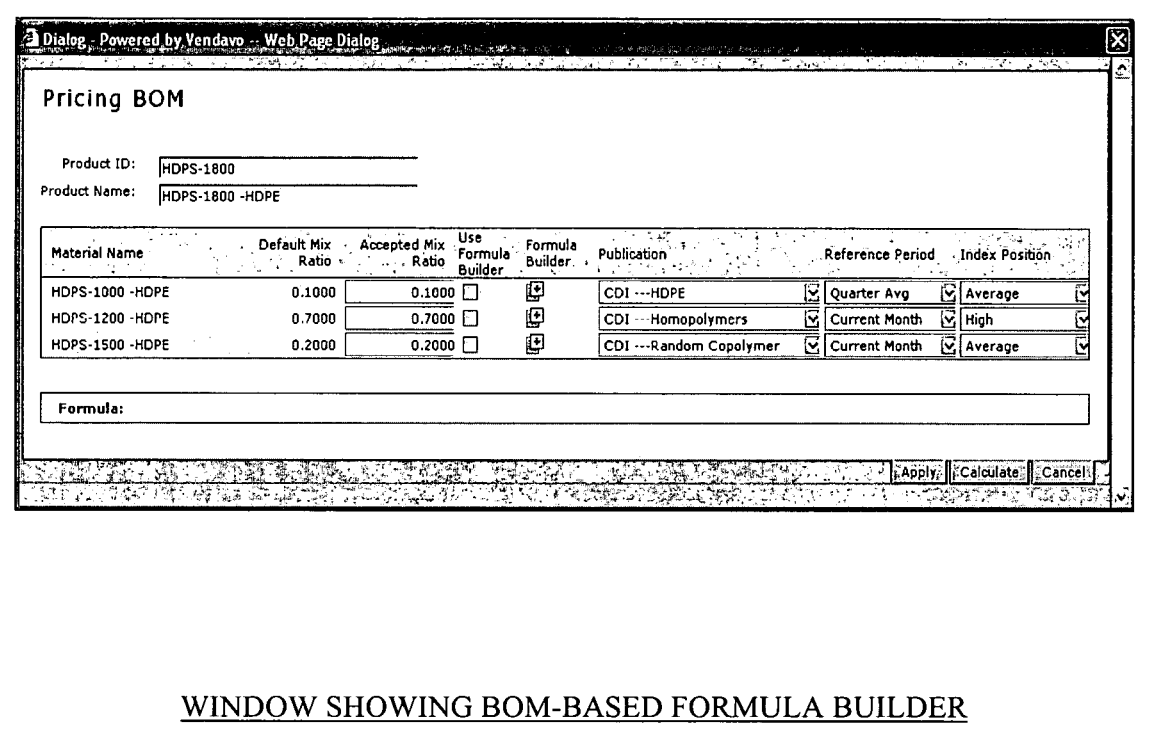

FIG. 28 shows an index-based formula window illustrating a user interface wherein the selected product has a BOM greater than one in accordance with an embodiment of the present invention. The window illustrates a pricing BOM which may be used in calculating an index-based price for the selected product. The window shows each BOM component and the default mix ratio of each component in the selected product. The user may select an index publication, a reference period and an index position for each of the components. The user may select to accept the default mix ratio, or may use the formula builder to set a chosen weighted ratio to be used in calculating the index-based price for the selected product. All of the above selected parameters are incorporated into a user defined formula used to calculate the index-based price for the selected product.

Index-Based Periodic Re-Pricing

Since indexes are published periodically, they may be used advantageously to periodically re-price existing deals in the integrated price management system in accordance with an embodiment of the present invention. By tying a product's price to selected indexes in an original deal, vendors may incorporate future price fluctuations in product components into the invoice price of the product. It is often advantageous for both vendors and buyers to structure a deal so as to allow a product's invoice price to track fluctuations in the index prices of the various product components. This is particularly useful when one or more of a product's components is prone to large price fluctuations due to changing market conditions. The method of the present invention allows vendors and buyers to account for future fluctuations as a deal is being formulated.

As noted above, there are several index publications that are commonly referred to in industry as guideposts for pricing. In the chemical industry, for example, there are several well known indexes (e.g. CMAI, ICIS, DeWitt) which publish weekly or monthly. Each index publishes several index numbers for each product (e.g. average price, high price, low price and spot deal price). For those deals in the system with products that are tied to an index, the method of the instant invention periodically re-prices said products in conjunction with changes in the index price.

The method of the instant invention selects existing deals in the price management system which are still valid and have products tied to an index. Said selected deals are revised and re-priced according to parameters set out in the original deal or parameters agreed upon at the time of revision. Once the deal has been revised and re-priced, it is submitted for approval. If approved, new price records are generated for each remaining commitment period.

Figure 29:
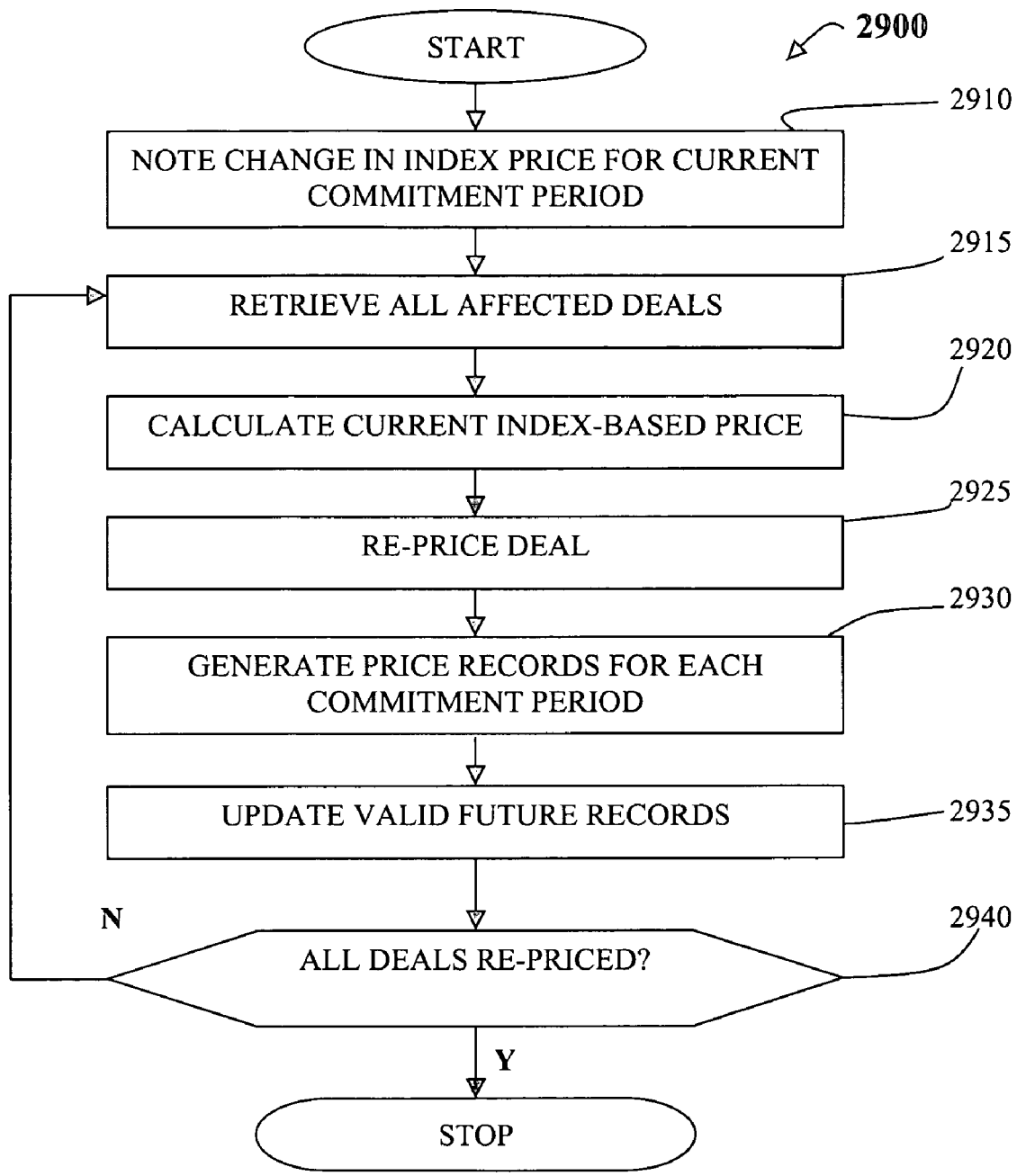
FIG. 29 is a flowchart illustrating a process for performing chemical index-based periodic re-pricing in accordance with an embodiment of the invention.

FIG. 29 is a flowchart 2900 illustrating a process for establishing periodic re-pricing for a selected deal in accordance with an embodiment of the present invention. In a preferred embodiment, the system monitors and notes changes in selected indexes each commitment period at step 2910. All deals with products tied to said indexes are retrieved at step 2915. The current index-based price is then computed as step 2920. All affected deals are subsequently re-priced at step 2925, and new price records for each commitment period are generated at step 2930. All valid future records are updated at step 2935. The process continues until all affected deals have been re-priced at step 2940.

In a preferred embodiment, the product price is tied to a selected index. The deal is structured such that each time the selected index is published, the product is re-priced. The product is given an index-based price according to the method discussed above. If approved, the product is re-priced accordingly for each subsequent commitment period. In another embodiment, the deal is structured such that the product is re-priced quarterly, using a three month rolling average of a selected index to set the revised price. In yet another embodiment, the deal is structured such that each time the selected index is published, and the difference between the current product price and the selected index is greater than a selected threshold value, the product is re-priced.

Referring again to FIG. 29, once the deal is re-priced at 2925, the new price records are saved in the integrated price management system.

In an alternative embodiment, a process for performing periodic index-based re-pricing in the context of an integrated price management system may be triggered by an alert. The system alerts the user when a revision has been triggered. A revision may be triggered, for example, when an index to which the price of a selected product has been tied is published. The publication of the selected index would trigger the system to prompt the user to decide whether or not to revise the implicated deal. If the user chooses not to revise the deal, the method ends. If the user chooses to revise the deal, a revised index-based price is calculated according to the parameters set in the deal. The user is then prompted to approve of the revised price. Often, the deal is structured as a floating contract based on the selected index and revision is approved automatically. If not, the user must approve the revision before proceeding to the next step. Revised price records for each commitment period are generated. All valid future records are updated at step 1960. The method then determines whether all deals in which a revision has been triggered have been re-priced. If so, the method ends. If not, the method returns and performs a new iteration of the above process. The method continues in this manner until all implicated deals are re-priced.

Figure 30:
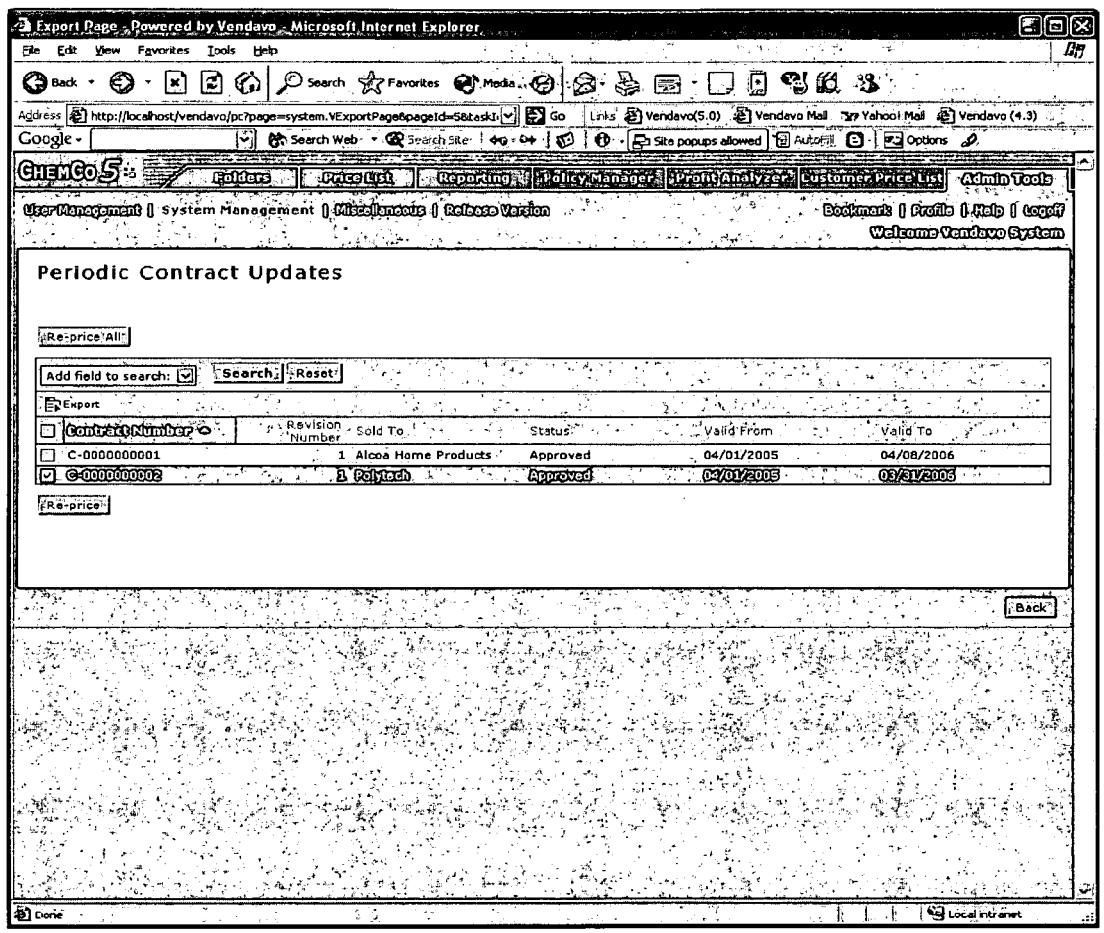
FIGS. 30 and 31 are index-based periodic re-pricing related windows illustrating sample user interfaces in accordance with an embodiment of the invention.

FIG. 30 shows a periodic contract update window illustrating a user interface in accordance with an embodiment of the present invention. The screen prompts the user when contracts subject to periodic updates have triggered in response to having had the selected re-pricing parameters met. The user is shown a list of the contracts to be re-priced. In a preferred embodiment, the user is shown the contract number, revision number, customer, contract revision status, and current commitment period. The user is given the option whether to re-price the displayed contracts as prompted.

Figure 31:
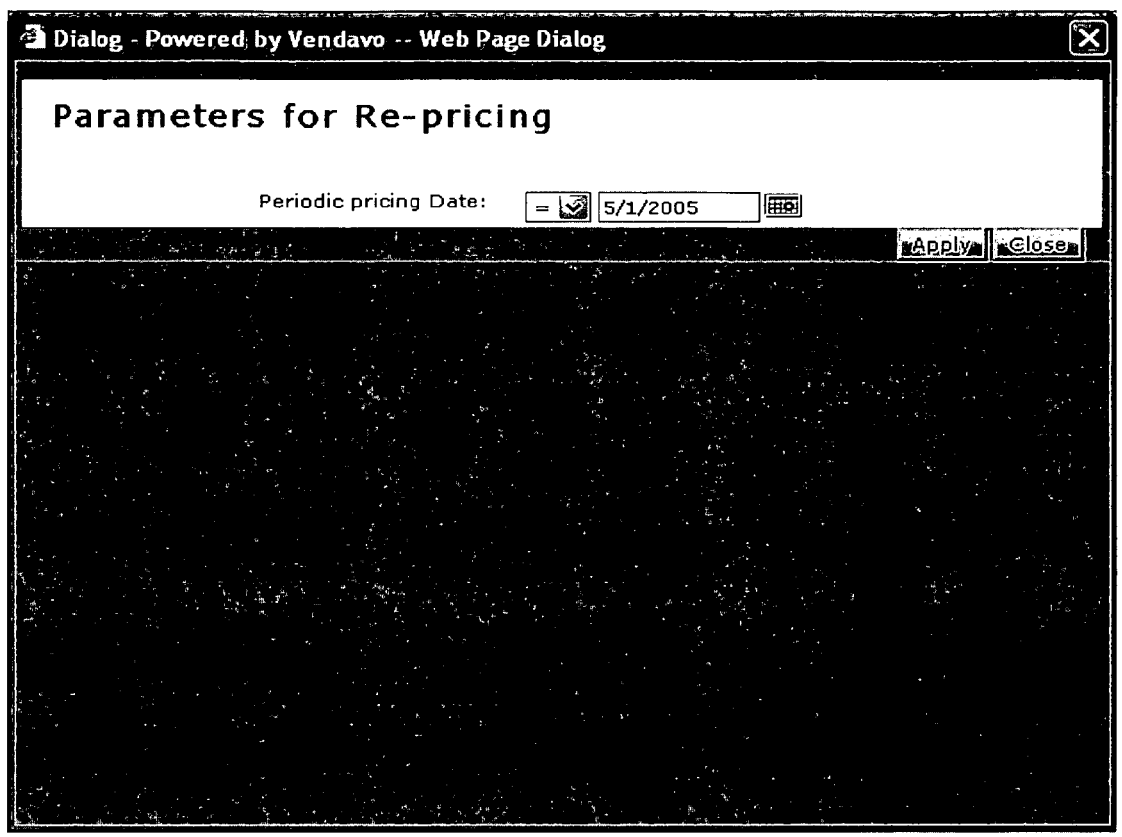

FIG. 31 shows a periodic re-pricing parameter window illustrating a user interface in accordance with an embodiment of the present invention. The user may select the parameters for re-pricing including the periodic re-pricing date. In a preferred embodiment, the user may define a formula for calculating a revised index-based price for the selected product. The user may also set the period for said periodic re-pricing. Preferably, the period is set to coincide with the period of the publication of the selected index.

Price Protection

One method of reducing the uncertainty of having a product's price tied to a potentially volatile index is to build in price protection to the original deal. Price protection guarantees that an index-based product price will remain the same for a selected period beyond the time when a new index is published. Price protection, in effect, allows the actual product price change to lag the index price change by the selected time period. The vendor may build price protection into a deal so that it is automatically applied by the integrated price management system.

Figure 32:
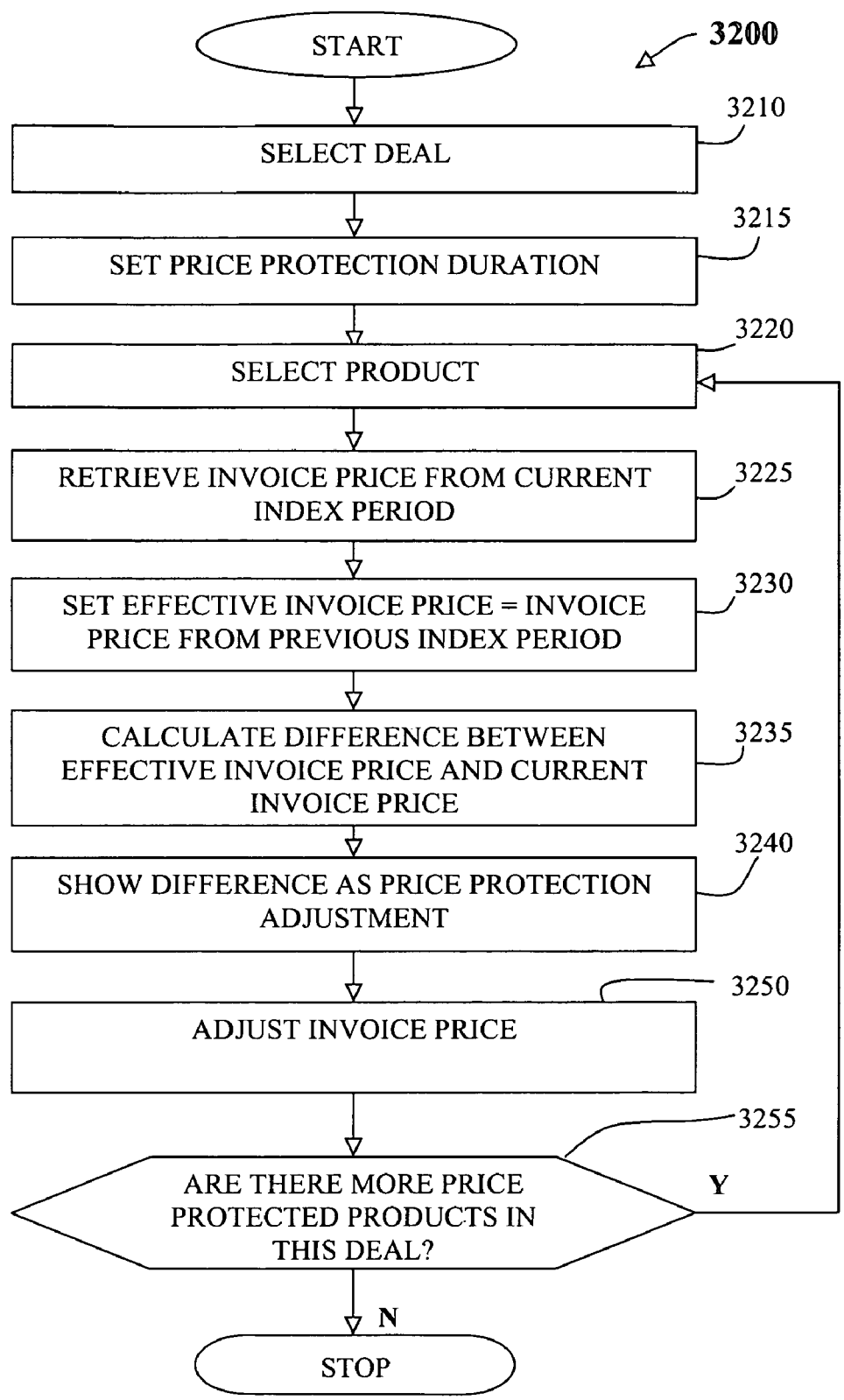
FIG. 32 is a flowchart illustrating a process for applying price protection in accordance with an embodiment of the invention.

FIG. 32 is a flowchart 3200 illustrating a process for applying a price protection attribute to a deal in accordance with an embodiment of the present invention. The user selects a deal at step 3210. The user then sets the price protection duration at step 3215. The method then selects a product in the deal at step 3220. The method then retrieves the invoice price for the selected product from the current period at step 3225. The effective invoice price is set to the invoice price from the previous period at step 3230. The method then calculates the difference between the effective invoice price and the current index price at step 3235. The calculated difference is shown as a price protection adjustment at step 3240. The method then determines if there are more products in the deal to which to apply price protection at step 3255. If so, the method returns to step 3220 and repeats the process until the price protection adjustment for all products in the deal is calculated. The method then adjusts the implicated invoiced prices accordingly at step 3250. Once all price protected deals have been adjusted in this manner, the method ends.

Figure 33:
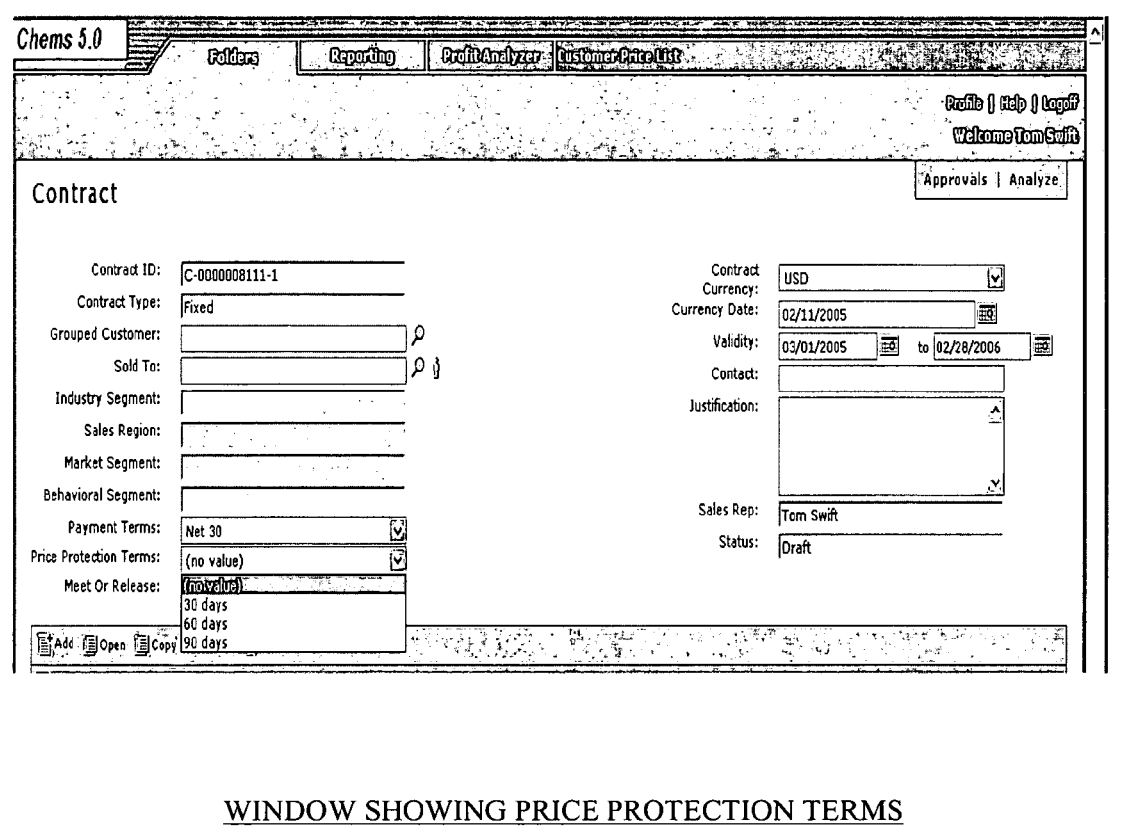

FIG. 33 shows a price protection terms window illustrating a user interface for setting price protection terms in accordance with an embodiment of the present invention. When in the contract form, the user may set price protection terms, such as price protection duration, by accessing the pull-down menu.

FIG. 34 shows a price protection calculations window illustrating a user interface for showing price protection calculations in accordance with an embodiment of the present invention. The user may see the impact of the price protection calculation for the life of the deal.

Raw Material Escape Clause

The present invention also allows a sales force to incorporate a raw material escape clause into a deal in accordance with an embodiment of the invention. Typically, a raw material escape clause is offered in the context of negotiating the sale of a product or products which are made up of more than one component. At least one of these components will be priced using index pricing. Often, only one or two components of a particular product will be of interest to the buyer and seller with respect to volatility. As such, the buyer may wish to build in price protection for the product to insulate said buyer from drastic market swings. However, the seller may not wish to guarantee the price beyond a certain threshold percentage change in price.

In a preferred embodiment of the present invention sales users may incorporate a raw material escape clause into the deal. The raw material escape clause gives the parties the option of selecting a particularly volatile or expensive raw material component of a product for limited price protection. While the product price may be protected for a set price protection period as discussed above, there is also a threshold percentage change in price above which price protection no longer applies. The raw material escape clause allows the parties to escape the price protection period and pass on significant price fluctuations immediately. Both upward and downward price fluctuations in excess of the threshold percentage may trigger the raw material escape clause.

Figure 35:
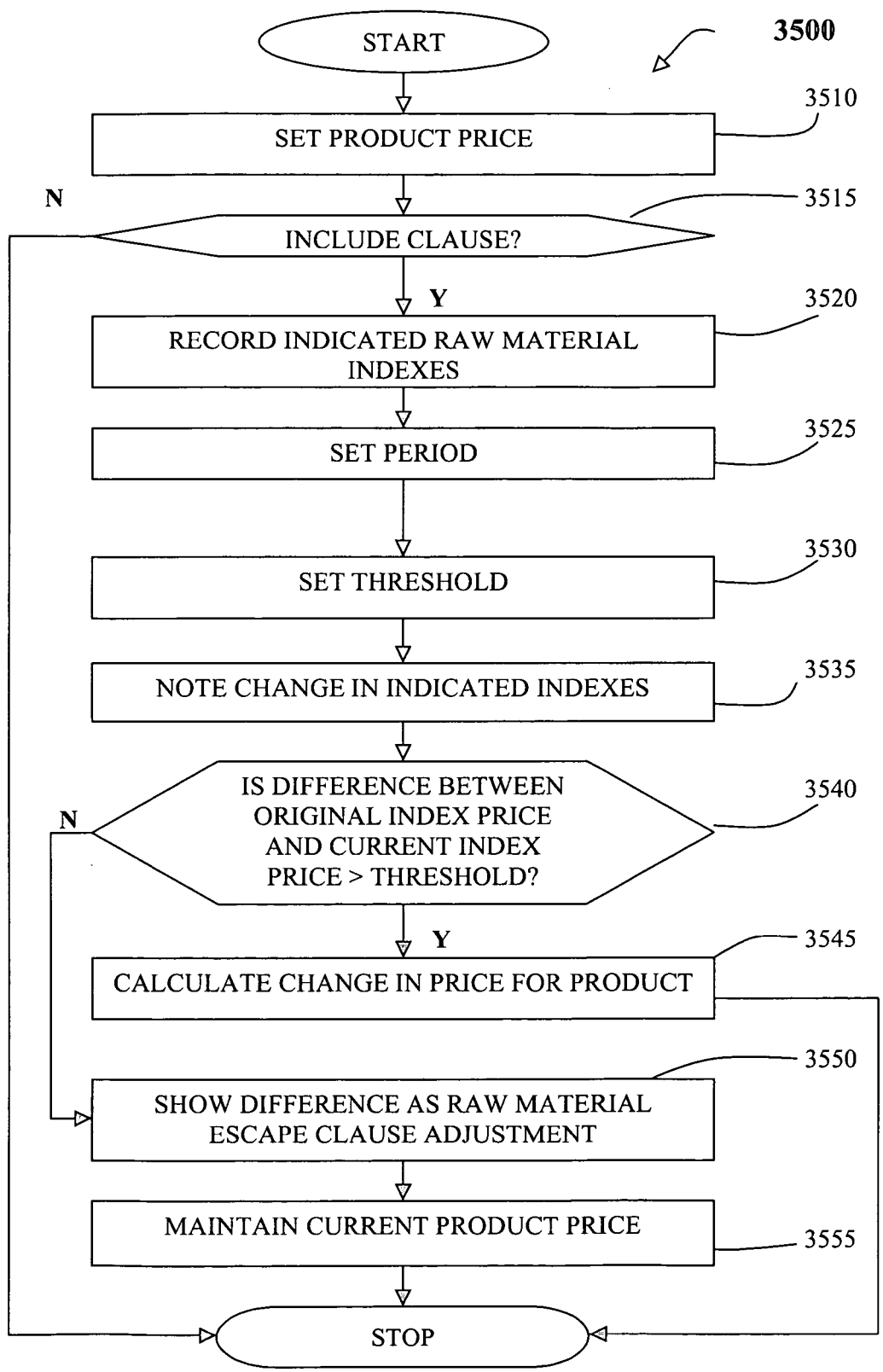
FIG. 35 is a flowchart illustrating a process for incorporating a raw material escape clause in accordance with an embodiment of the invention.

FIG. 35 is a flowchart 3500 illustrating a process for incorporating a raw material escape clause into a deal. A sales user first sets a product price at step 3510. The sales user must then decide whether or not to include a raw material escape clause in the deal at step 3515. If not, the method ends. If the clause is to be included, the index price of the particular raw material of interest should be recorded at step 3520. While other indexes may be used in computing the product price, the index or indexes for the particular component or components of interest is the critical index or indexes. Normally, the component(s) of interest is either highly volatile in price, very expensive, or makes up the bulk of the product in question.

Once a critical index has been recorded at step 3520, the period defining the length of time price protection shall be in effect may be set at step 3525. Preferably, price protection is structured as discussed above. Preferably, a threshold value corresponding to a percentage change in the critical index(s) is set at step 3530. Said critical index(s) are monitored at step 3535. Any change in the critical index(s) of a percentage greater than the threshold value set in step 3530 will trigger the raw material escape clause.

The method determines whether any new index price has changed percentage-wise an amount great enough to trigger the clause at step 3540. If the clause is not triggered, the product price remains the same, but the difference which would have resulted from applying the new index is captured and displayed as a raw material escape clause adjustment at step 3550. The current product price is maintained unchanged for the remainder of the price protection period at step 3555 in the same manner as discussed above.

If the change in the critical index(s) is of a magnitude sufficient to trigger the raw material escape clause at step 3540, a new price may be calculated for the product based on the new index at step 3545. In this manner, the parties are able to modify product prices in the case of large swings in raw material costs while maintaining price protection in all other cases.

As can be appreciated, the examples described herein detail tiered pricing, most favored nation clauses and index-based pricing in embodiments of the present invention. Other methods and uses that may be used in combination with tiered pricing, most favored nation clauses and index-based pricing are contemplated by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention. In addition, the use of subtitles in this application is for clarity only and should not be construed as limiting in any way.

What is claimed is:

1. In a computerized integrated price management system, a method of maintaining at least one deal with a lowest price status for at least one product in the price management system, said method comprising:

inputting a proposed price for the at least one product;

searching a transaction database of the price management system for the at least one deal having the at least one product with the lowest price status;

defining a current lowest price as equal to the price of the at least one product with lowest price status;

when said proposed price is less than said current lowest price, computing a potential revenue impact of lowering the price of said at least one product with said lowest price status to the proposed price; and displaying, on an output device of the computerized price management system, the potential revenue impact to a user.

2. The method of claim 1 wherein said revenue impact is equal to the cumulative difference between said current lowest price of each said existing deal and said proposed price.

3. The method of claim 1 wherein said revenue impact is computed for selected time intervals.

4. The method of claim 3 wherein said display comprises:

displaying total revenue impact for each said at least one deal; and displaying revenue impact for each said selected time interval of each said at least one deal.

5. The method of claim 1 wherein said method further comprises:

generating an alert warning triggered when said proposed price is less than said current lowest price.

6. The method of claim 5 wherein said method further comprises:

requiring an approval for said proposed price.

7. The method of claim 1 wherein said proposed price is proposed in the process of revising an existing deal.

8. A computerized integrated price management system configured to maintaining at least one deal with a lowest price status for at least one product, the integrated price management system comprising:

an interface configured to input a proposed price for the at least one product;

a transaction database configured to enable searching for the at least one deal having the at least one product with the lowest price status; and a most favored nation computing module configured to define a current lowest price as equal to the price of the at least one product with lowest price status, and the most favored nation computing module configured to compute a potential revenue impact of lowering the price of said at least one product with said lowest price status to the proposed price when said proposed price is less than said current lowest price.

9. The integrated price management system of claim 8 wherein said revenue impact is equal to the cumulative difference between said current lowest price of each said existing deal and said proposed price.

10. The integrated price management system of claim 8 further comprising:

a display configured to display said revenue impact.

11. The integrated price management system of claim 10 wherein said revenue impact is computed for selected time intervals.

12. The integrated price management system of claim 11 wherein said display is further configured to:

display total revenue impact for each said at least one deal; and display revenue impact for each said selected time interval of each said at least one deal.

13. The integrated price management system of claim 8 wherein the most favored nation computing module is further configured to generate an alert warning triggered when said proposed price is less than said current lowest price.

14. The integrated price management system of claim 13 wherein the most favored nation computing module is further configured to require an approval for said proposed price.

15. The integrated price management system of claim 8 wherein said proposed price is proposed in the process of revising an existing deal.

* * * * *